United States Patent
Bonalle et al.

(10) Patent No.: US 7,325,724 B2
(45) Date of Patent: *Feb. 5, 2008

(54) METHOD FOR REGISTERING A BIOMETRIC FOR USE WITH A SMARTCARD

(75) Inventors: David S. Bonalle, New Rochelle, NY (US); Glen Salow, Holmdel, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/710,332

(22) Filed: Jul. 1, 2004

(65) Prior Publication Data
US 2006/0016875 A1    Jan. 26, 2006

(51) Int. Cl.
| | |
|---|---|
| G06K 5/00 | (2006.01) |
| G06K 19/00 | (2006.01) |
| G06K 19/06 | (2006.01) |
| H04Q 5/22 | (2006.01) |
| H04Q 1/00 | (2006.01) |
| G08B 13/14 | (2006.01) |
| G05B 19/00 | (2006.01) |

(52) U.S. Cl. .................. 235/380; 235/487; 235/492; 340/572.1; 340/5.82; 340/5.4; 340/5.6; 340/10.1

(58) Field of Classification Search ................ 235/380, 235/487, 492; 340/5.4, 5.6, 572.1, 5.82, 340/5.1
See application file for complete search history.

(56) References Cited

U.S. PATENT DOCUMENTS

| | | | |
|---|---|---|---|
| 4,453,074 A | 6/1984 | Weinstein | |
| 4,582,985 A | 4/1986 | Lofberg | |
| 4,725,719 A | 2/1988 | Oncken et al. | |
| 4,747,147 A | 5/1988 | Sparrow | |
| 4,910,521 A * | 3/1990 | Mellon ...................... 342/45 |
| 4,993,068 A * | 2/1991 | Piosenka et al. ............ 713/186 |
| 5,175,416 A | 12/1992 | Mansvelt et al. | |
| 5,180,902 A | 1/1993 | Schick et al. | |
| 5,193,114 A | 3/1993 | Moseley | |

(Continued)

FOREIGN PATENT DOCUMENTS

DE      4339460      11/1993

(Continued)

OTHER PUBLICATIONS

"Biometrics: Speaker Verification", by Kulkarni, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.

(Continued)

Primary Examiner—Daniel Walsh
(74) Attorney, Agent, or Firm—Snell & Wilmer L.L.P.

(57) ABSTRACT

The present invention discloses a method for registering biometric information for use in a smartcard-reader system. The method comprises the steps of contacting an authorized sample receiver and submitting a biometric to a sensor to facilitates the sensor in obtaining a biometric sample. The method also includes providing user information and smartcard information to the smartcard-reader system to facilitate associating the biometric sample with the user and smartcard information.

25 Claims, 22 Drawing Sheets

U.S. PATENT DOCUMENTS

| | | | |
|---|---|---|---|
| 5,245,329 A | 9/1993 | Gokcebay | |
| 5,259,649 A * | 11/1993 | Shomron | 283/114 |
| 5,321,751 A | 6/1994 | Ray et al. | |
| 5,438,184 A | 8/1995 | Roberts et al. | |
| 5,461,217 A | 10/1995 | Claus | |
| 5,513,272 A | 4/1996 | Bogosian, Jr. | |
| 5,521,966 A | 5/1996 | Friedes et al. | |
| 5,534,857 A | 7/1996 | Laing et al. | |
| 5,539,825 A | 7/1996 | Akiyama | |
| 5,559,504 A | 9/1996 | Itsumi et al. | |
| 5,559,887 A | 9/1996 | Davis et al. | |
| 5,577,121 A | 11/1996 | Davis et al. | |
| 5,578,808 A * | 11/1996 | Taylor | 235/380 |
| 5,581,630 A | 12/1996 | Bonneau, Jr. | |
| 5,590,038 A | 12/1996 | Pitroda | |
| 5,590,197 A | 12/1996 | Chen et al. | |
| 5,602,918 A | 2/1997 | Chen et al. | |
| 5,604,801 A | 2/1997 | Dolan et al. | |
| 5,613,001 A | 3/1997 | Bakhoum | |
| 5,677,953 A | 10/1997 | Dolphin | |
| 5,721,781 A * | 2/1998 | Deo et al. | 705/67 |
| 5,737,439 A | 4/1998 | Lapsley et al. | |
| 5,739,512 A | 4/1998 | Toganazzini | |
| 5,742,756 A | 4/1998 | Dillaway et al. | |
| 5,742,845 A | 4/1998 | Wagner | |
| 5,757,917 A | 5/1998 | Rose et al. | |
| 5,764,789 A * | 6/1998 | Pare et al. | 382/115 |
| 5,778,173 A | 7/1998 | Apte | |
| 5,796,831 A | 8/1998 | Paradinas et al. | |
| 5,799,087 A | 8/1998 | Rosen | |
| 5,806,045 A | 9/1998 | Biorge et al. | |
| 5,815,252 A | 9/1998 | Price-Francis | |
| 5,815,657 A | 9/1998 | Williams et al. | |
| 5,826,241 A | 10/1998 | Stein et al. | |
| 5,826,243 A * | 10/1998 | Musmanno et al. | 705/35 |
| 5,835,894 A | 11/1998 | Adcock et al. | |
| 5,838,818 A | 11/1998 | Pare et al. | |
| 5,857,079 A | 1/1999 | Claus et al. | |
| 5,869,822 A * | 2/1999 | Meadows et al. | 235/380 |
| 5,875,432 A | 2/1999 | Sehr | |
| 5,884,271 A | 3/1999 | Pitroda | |
| 5,884,292 A | 3/1999 | Baker et al. | |
| 5,889,941 A | 3/1999 | Tushie et al. | |
| 5,892,211 A | 4/1999 | Davis et al. | |
| 5,898,838 A | 4/1999 | Wagner | |
| 5,901,239 A | 5/1999 | Kamei | |
| 5,905,908 A | 5/1999 | Wagner | |
| 5,907,620 A | 5/1999 | Klemba et al. | |
| 5,912,446 A | 6/1999 | Wong et al. | |
| 5,915,973 A | 6/1999 | Hoehn-Saric et al. | |
| 5,917,913 A | 6/1999 | Wang | |
| 5,917,925 A | 6/1999 | Moore | |
| 5,920,058 A | 7/1999 | Weber et al. | |
| 5,920,629 A | 7/1999 | Rosen | |
| 5,920,847 A | 7/1999 | Kolling et al. | |
| 5,930,767 A | 7/1999 | Reber et al. | |
| 5,931,917 A | 8/1999 | Nguyen et al. | |
| 5,936,226 A | 8/1999 | Aucsmith | |
| 5,942,761 A | 8/1999 | Tuli | |
| 5,987,155 A * | 11/1999 | Dunn et al. | 382/116 |
| 5,988,497 A | 11/1999 | Wallace | |
| 5,995,014 A | 11/1999 | DiMaria | |
| 6,012,039 A | 1/2000 | Hoffman et al. | |
| 6,012,636 A | 1/2000 | Smith | |
| 6,016,476 A | 1/2000 | Maes et al. | |
| RE36,580 E | 2/2000 | Bogosian, Jr. | |
| 6,041,410 A | 3/2000 | Hsu et al. | |
| 6,060,815 A * | 5/2000 | Nysen | 310/318 |
| 6,091,835 A | 7/2000 | Smithies et al. | |
| 6,095,413 A * | 8/2000 | Tetro et al. | 235/380 |
| 6,101,477 A * | 8/2000 | Hohle et al. | 705/1 |
| 6,104,311 A * | 8/2000 | Lastinger | 340/10.51 |
| 6,104,922 A | 8/2000 | Baumann | |
| 6,116,736 A | 9/2000 | Stark et al. | |
| 6,120,461 A | 9/2000 | Smyth | |
| 6,130,623 A * | 10/2000 | MacLellan et al. | 340/5.1 |
| 6,148,093 A | 11/2000 | McConnell et al. | |
| 6,154,879 A * | 11/2000 | Pare et al. | 705/35 |
| 6,199,079 B1 | 3/2001 | Gupta et al. | |
| 6,199,762 B1 | 3/2001 | Hohle | |
| 6,219,639 B1 | 4/2001 | Bakis et al. | |
| 6,223,984 B1 | 5/2001 | Renner et al. | |
| 6,233,348 B1 | 5/2001 | Fujii et al. | |
| 6,257,486 B1 | 7/2001 | Teicher et al. | |
| 6,257,620 B1 | 7/2001 | Kenney | |
| 6,263,446 B1 | 7/2001 | Kausik et al. | |
| 6,265,977 B1 * | 7/2001 | Vega et al. | 340/572.7 |
| 6,268,788 B1 | 7/2001 | Gray | |
| 6,269,348 B1 * | 7/2001 | Pare et al. | 705/39 |
| 6,307,956 B1 | 10/2001 | Black | |
| 6,325,285 B1 | 12/2001 | Baratelli | |
| 6,327,578 B1 | 12/2001 | Linehan | |
| 6,332,193 B1 | 12/2001 | Glass et al. | |
| 6,338,048 B1 | 1/2002 | Mori | |
| 6,360,953 B1 | 3/2002 | Lin et al. | |
| 6,424,249 B1 | 7/2002 | Houvener | |
| 6,446,862 B1 | 9/2002 | Mann | |
| 6,480,825 B1 | 11/2002 | Sharma et al. | |
| 6,483,929 B1 | 11/2002 | Murakami et al. | |
| 6,491,639 B1 | 12/2002 | Turcott | |
| 6,496,594 B1 | 12/2002 | Prokoski | |
| 6,507,662 B1 | 1/2003 | Brooks | |
| 6,519,565 B1 | 2/2003 | Clements et al. | |
| 6,539,101 B1 | 3/2003 | Black | |
| 6,560,581 B1 | 5/2003 | Fox et al. | |
| 6,588,660 B1 | 7/2003 | Buescher et al. | |
| 6,588,673 B1 | 7/2003 | Chan et al. | |
| 6,591,249 B2 * | 7/2003 | Zoka | 705/18 |
| 6,601,759 B2 | 8/2003 | Fife et al. | |
| 6,601,762 B2 | 8/2003 | Piotrowski | |
| 6,609,656 B1 * | 8/2003 | Elledge | 235/382 |
| 6,629,591 B1 | 10/2003 | Griswold et al. | |
| 6,636,620 B1 * | 10/2003 | Hoshino | 382/124 |
| 6,657,614 B1 | 12/2003 | Ito et al. | |
| 6,662,166 B2 | 12/2003 | Pare, Jr. et al. | |
| 6,669,086 B2 | 12/2003 | Abdi et al. | |
| 6,681,328 B1 | 1/2004 | Harris et al. | |
| 6,697,947 B1 | 2/2004 | Matyas, Jr. et al. | |
| 6,703,918 B1 | 3/2004 | Kita | |
| 6,732,919 B2 * | 5/2004 | Macklin et al. | 235/380 |
| 6,765,470 B2 * | 7/2004 | Shinzaki | 340/5.52 |
| 6,799,726 B2 | 10/2004 | Stockhammer | |
| 6,816,058 B2 | 11/2004 | McGregor et al. | |
| 6,819,219 B1 | 11/2004 | Bolle et al. | |
| 6,828,299 B2 | 12/2004 | Yang et al. | |
| 6,834,795 B1 * | 12/2004 | Rasmussen et al. | 235/380 |
| 6,873,974 B1 | 3/2005 | Schutzer | |
| 6,877,097 B2 | 4/2005 | Hamid et al. | |
| H2120 H | 7/2005 | Cudlitz | |
| 6,914,517 B2 | 7/2005 | Kinsella | |
| 6,925,439 B1 * | 8/2005 | Pitroda | 705/1 |
| 6,925,565 B2 | 8/2005 | Black | |
| 6,928,181 B2 | 8/2005 | Brooks | |
| 6,931,538 B1 | 8/2005 | Sawaguchi | |
| 6,934,861 B2 | 8/2005 | Haala | |
| 6,940,461 B2 * | 9/2005 | Nantz et al. | 343/713 |
| 6,944,768 B2 | 9/2005 | Siegel et al. | |
| 7,049,962 B2 * | 5/2006 | Atherton et al. | 340/572.1 |
| 7,051,925 B2 | 5/2006 | Schwartz, Jr. | |
| 7,059,159 B2 * | 6/2006 | Lanigan et al. | 70/280 |
| 7,102,523 B2 * | 9/2006 | Shanks et al. | 340/572.7 |
| 7,132,946 B2 * | 11/2006 | Waldner et al. | 340/572.1 |
| 7,171,662 B1 | 1/2007 | Misara et al. | |
| 2001/0013546 A1 | 8/2001 | Ross | |

| | | | |
|---|---|---|---|
| 2001/0013551 A1* | 8/2001 | Ramachandran ........ 235/472.02 |
| 2001/0017584 A1* | 8/2001 | Shinzaki .................... 340/5.52 |
| 2001/0018660 A1* | 8/2001 | Sehr ............................... 705/5 |
| 2001/0029493 A1* | 10/2001 | Pare et al. ...................... 705/64 |
| 2001/0036301 A1 | 11/2001 | Yamaguchi et al. |
| 2001/0036835 A1 | 11/2001 | Leedom, Jr. |
| 2001/0040507 A1* | 11/2001 | Eckstein et al. .......... 340/572.4 |
| 2001/0053239 A1* | 12/2001 | Takhar ........................ 382/124 |
| 2002/0014952 A1 | 2/2002 | Terranova |
| 2002/0030581 A1 | 3/2002 | Janiak et al. |
| 2002/0036237 A1* | 3/2002 | Atherton et al. ............. 235/492 |
| 2002/0043566 A1 | 4/2002 | Goodman et al. |
| 2002/0062249 A1 | 5/2002 | Iannacci |
| 2002/0062284 A1* | 5/2002 | Kawan .......................... 705/43 |
| 2002/0062291 A1 | 5/2002 | Zoka |
| 2002/0066784 A1 | 6/2002 | Segal et al. |
| 2002/0072349 A1 | 6/2002 | Geiselman et al. |
| 2002/0073025 A1* | 6/2002 | Tanner et al. .................. 705/39 |
| 2002/0083320 A1 | 6/2002 | Vatanen |
| 2002/0087869 A1 | 7/2002 | Kim |
| 2002/0095587 A1* | 7/2002 | Doyle et al. ................. 713/186 |
| 2002/0095588 A1 | 7/2002 | Shigematsu et al. |
| 2002/0097142 A1 | 7/2002 | Janiak et al. |
| 2002/0108062 A1 | 8/2002 | Nakajima et al. |
| 2002/0111917 A1 | 8/2002 | Hoffman et al. |
| 2002/0128977 A1 | 9/2002 | Nambiar et al. |
| 2002/0133725 A1 | 9/2002 | Roy et al. |
| 2002/0138351 A1 | 9/2002 | Houvener et al. |
| 2002/0139839 A1 | 10/2002 | Catan |
| 2002/0140542 A1* | 10/2002 | Prokoski et al. ............ 340/5.52 |
| 2002/0147002 A1 | 10/2002 | Trop et al. |
| 2002/0147600 A1* | 10/2002 | Waters et al. ................... 705/1 |
| 2002/0152123 A1* | 10/2002 | Giordano et al. .............. 705/14 |
| 2002/0153424 A1 | 10/2002 | Li |
| 2002/0154795 A1 | 10/2002 | Lee et al. |
| 2002/0163421 A1 | 11/2002 | Wang et al. |
| 2002/0169673 A1 | 11/2002 | Prorock et al. |
| 2002/0174067 A1* | 11/2002 | Hoffman et al. ............... 705/39 |
| 2002/0175805 A9* | 11/2002 | Armstrong et al. ....... 340/10.31 |
| 2002/0178063 A1 | 11/2002 | Gravelle et al. |
| 2002/0178124 A1 | 11/2002 | Lewis |
| 2002/0178369 A1 | 11/2002 | Black |
| 2002/0179704 A1 | 12/2002 | Deaton |
| 2002/0186133 A1 | 12/2002 | Loof |
| 2002/0186838 A1 | 12/2002 | Brandys |
| 2002/0188855 A1 | 12/2002 | Nakayama et al. |
| 2002/0190124 A1 | 12/2002 | Piotrowski |
| 2002/0191816 A1* | 12/2002 | Maritzen et al. ............. 382/115 |
| 2003/0001006 A1 | 1/2003 | Lee |
| 2003/0004866 A1 | 1/2003 | Huennekens et al. |
| 2003/0004881 A1 | 1/2003 | Shinzaki et al. |
| 2003/0006901 A1* | 1/2003 | Kim et al. ................. 340/572.5 |
| 2003/0009382 A1 | 1/2003 | D'Arbeloff et al. |
| 2003/0112120 A1 | 1/2003 | Seifert |
| 2003/0037264 A1 | 2/2003 | Ezaki et al. |
| 2003/0046237 A1 | 3/2003 | Uberti |
| 2003/0046540 A1 | 3/2003 | Nakamura et al. |
| 2003/0061172 A1* | 3/2003 | Robinson ....................... 705/67 |
| 2003/0074317 A1 | 4/2003 | Hofi |
| 2003/0086591 A1 | 5/2003 | Simon |
| 2003/0093187 A1 | 5/2003 | Walker |
| 2003/0097344 A1 | 5/2003 | Chaum et al. |
| 2003/0106935 A1* | 6/2003 | Burchette, Jr. ............... 235/380 |
| 2003/0120626 A1 | 6/2003 | Piotrowski |
| 2003/0122120 A1 | 7/2003 | Brazis et al. |
| 2003/0123714 A1 | 7/2003 | O'Gorman et al. |
| 2003/0125054 A1 | 7/2003 | Garcia |
| 2003/0132297 A1 | 7/2003 | McCall et al. |
| 2003/0149661 A1* | 8/2003 | Mitchell et al. ............... 705/39 |
| 2003/0150911 A1 | 8/2003 | Joseph |
| 2003/0152252 A1 | 8/2003 | Kondo et al. |
| 2003/0155416 A1* | 8/2003 | Macklin et al. .............. 235/380 |
| 2003/0159044 A1* | 8/2003 | Doyle et al. ................. 713/176 |
| 2003/0167207 A1 | 9/2003 | Berardi et al. |
| 2003/0173408 A1 | 9/2003 | Mosher, Jr. et al. |
| 2003/0177102 A1 | 9/2003 | Robinson |
| 2003/0191949 A1 | 10/2003 | Odagawa |
| 2003/0208439 A1 | 11/2003 | Rast |
| 2003/0223625 A1 | 12/2003 | Hillhouse et al. |
| 2003/0226041 A1* | 12/2003 | Palmer et al. ................ 713/202 |
| 2003/0229793 A1 | 12/2003 | McCall et al. |
| 2003/0236704 A1 | 12/2003 | Antonucci |
| 2004/0006497 A1 | 1/2004 | Nestor et al. |
| 2004/0014457 A1 | 1/2004 | Stevens |
| 2004/0017934 A1 | 1/2004 | Kocher |
| 2004/0020982 A1* | 2/2004 | Hoffman et al. ............. 235/379 |
| 2004/0021552 A1 | 2/2004 | Koo |
| 2004/0024694 A1 | 2/2004 | Lawrence et al. |
| 2004/0031856 A1 | 2/2004 | Atsmon et al. |
| 2004/0041021 A1 | 3/2004 | Nugent, Jr. |
| 2004/0041690 A1* | 3/2004 | Yamagishi .................. 340/5.52 |
| 2004/0049687 A1 | 3/2004 | Orsini |
| 2004/0050930 A1 | 3/2004 | Rowe |
| 2004/0052406 A1 | 3/2004 | Brooks |
| 2004/0059923 A1 | 3/2004 | ShamRao |
| 2004/0061593 A1 | 4/2004 | Lane |
| 2004/0062423 A1 | 4/2004 | Doi |
| 2004/0083380 A1 | 4/2004 | Janke |
| 2004/0084524 A1* | 5/2004 | Ramachandran ............. 235/380 |
| 2004/0084542 A1 | 5/2004 | DeYoe et al. |
| 2004/0098336 A1 | 5/2004 | Flink |
| 2004/0118930 A1 | 6/2004 | Berardi et al. |
| 2004/0129787 A1 | 7/2004 | Saito et al. |
| 2004/0131237 A1 | 7/2004 | Machida |
| 2004/0133787 A1* | 7/2004 | Doughty et al. ............. 713/186 |
| 2004/0136573 A1 | 7/2004 | Sato |
| 2004/0144841 A1 | 7/2004 | Tsukamoto et al. |
| 2004/0149287 A1 | 8/2004 | Zulli |
| 2004/0149820 A1 | 8/2004 | Zulli |
| 2004/0155101 A1* | 8/2004 | Royer et al. ................. 235/379 |
| 2004/0158723 A1 | 8/2004 | Root |
| 2004/0161135 A1 | 8/2004 | Sano et al. |
| 2004/0165753 A1 | 8/2004 | Takhiri et al. |
| 2004/0172541 A1 | 9/2004 | Ando et al. |
| 2004/0178063 A1* | 9/2004 | Mirchi et al. ................ 204/280 |
| 2004/0188519 A1 | 9/2004 | Cassone |
| 2004/0195314 A1* | 10/2004 | Lee ............................. 235/380 |
| 2004/0199469 A1* | 10/2004 | Barillova et al. .............. 705/44 |
| 2004/0202354 A1 | 10/2004 | Togino |
| 2004/0208343 A1* | 10/2004 | Golden et al. ............... 382/110 |
| 2004/0215575 A1 | 10/2004 | Garrity |
| 2004/0222803 A1 | 11/2004 | Tartagni |
| 2004/0230488 A1* | 11/2004 | Beenau et al. ................. 705/18 |
| 2004/0232220 A1* | 11/2004 | Beenau et al. ............... 235/380 |
| 2004/0232224 A1* | 11/2004 | Beenau et al. ............... 235/380 |
| 2004/0233039 A1* | 11/2004 | Beenau et al. .............. 340/5.83 |
| 2004/0236699 A1 | 11/2004 | Beenau et al. |
| 2004/0236701 A1* | 11/2004 | Beenau et al. ................. 705/64 |
| 2004/0239480 A1* | 12/2004 | Beenau et al. .............. 340/5.53 |
| 2004/0240711 A1 | 12/2004 | Hamza et al. |
| 2004/0255168 A1 | 12/2004 | Murashita et al. |
| 2004/0257196 A1 | 12/2004 | Kotzin |
| 2004/0258282 A1 | 12/2004 | Bjorn et al. |
| 2005/0001711 A1* | 1/2005 | Doughty et al. ............. 340/5.74 |
| 2005/0005172 A1* | 1/2005 | Haala ........................... 713/202 |
| 2005/0018658 A1* | 1/2005 | Ikeda et al. .................. 370/352 |
| 2005/0020304 A1 | 1/2005 | Shinzaki |
| 2005/0021457 A1 | 1/2005 | Johnson et al. |
| 2005/0033687 A1 | 2/2005 | Beenau et al. |
| 2005/0033688 A1 | 2/2005 | Peart et al. |
| 2005/0033992 A1* | 2/2005 | Inabe ........................... 713/202 |
| 2005/0036665 A1 | 2/2005 | Higuchi |
| 2005/0040221 A1 | 2/2005 | Schwarz, Jr. |
| 2005/0054438 A1* | 3/2005 | Rothschild et al. ........... 463/29 |
| 2005/0058262 A1 | 3/2005 | Timmins et al. |
| 2005/0065842 A1 | 3/2005 | Summers |

| | | | |
|---|---|---|---|
| 2005/0065872 A1* | 3/2005 | Moebs et al. | 705/38 |
| 2005/0087597 A1 | 4/2005 | Gotfried et al. | |
| 2005/0091325 A1* | 4/2005 | Kuwana et al. | 709/206 |
| 2005/0097038 A1 | 5/2005 | Yu et al. | |
| 2005/0098621 A1* | 5/2005 | de Sylva | 235/379 |
| 2005/0100199 A1 | 5/2005 | Boshra | |
| 2005/0102524 A1* | 5/2005 | Haala | 713/186 |
| 2005/0103839 A1 | 5/2005 | Hewel | |
| 2005/0116024 A1* | 6/2005 | Beenau et al. | 235/380 |
| 2005/0122209 A1* | 6/2005 | Black | 340/5.52 |
| 2005/0123137 A1 | 6/2005 | McCallum | |
| 2005/0125343 A1* | 6/2005 | Mendelovich | 705/39 |
| 2005/0137977 A1 | 6/2005 | Wankmueller | |
| 2005/0139669 A1 | 6/2005 | Arnouse | |
| 2005/0149926 A1 | 7/2005 | Saltz | |
| 2005/0160271 A9 | 7/2005 | Brundage et al. | |
| 2005/0160790 A1 | 7/2005 | Tanaka et al. | |
| 2005/0165684 A1* | 7/2005 | Jensen et al. | 705/44 |
| 2005/0166062 A1 | 7/2005 | Sanchez-Cifuentes | |
| 2005/0169504 A1 | 8/2005 | Black | |
| 2005/0171787 A1 | 8/2005 | Zagami | |
| 2005/0180618 A1 | 8/2005 | Black | |
| 2005/0187883 A1 | 8/2005 | Bishop et al. | |
| 2005/0197923 A1 | 9/2005 | Kilner et al. | |
| 2005/0211784 A1 | 9/2005 | Justin | |
| 2005/0212657 A1 | 9/2005 | Simon | |
| 2005/0216424 A1 | 9/2005 | Gandre et al. | |
| 2005/0232471 A1* | 10/2005 | Baer | 382/115 |
| 2005/0240778 A1 | 10/2005 | Saito | |
| 2005/0251688 A1 | 11/2005 | Nanavati et al. | |
| 2005/0261972 A1 | 11/2005 | Black | |
| 2005/0275505 A1 | 12/2005 | Himmelstein | |
| 2006/0005022 A1 | 1/2006 | Wakamori et al. | |
| 2006/0005042 A1 | 1/2006 | Black | |
| 2006/0033609 A1* | 2/2006 | Bridgelall | 340/10.42 |
| 2006/0034492 A1 | 2/2006 | Siegel et al. | |
| 2006/0066444 A1* | 3/2006 | Steeves | 340/10.5 |
| 2006/0071756 A1* | 4/2006 | Steeves | 340/10.1 |
| 2006/0080552 A1 | 4/2006 | Lauper | |
| 2006/0104485 A1 | 5/2006 | Miller et al. | |
| 2006/0158434 A1 | 7/2006 | Zank et al. | |
| 2006/0173291 A1 | 8/2006 | Glossop | |
| 2006/0173791 A1* | 8/2006 | Mann et al. | 705/74 |
| 2006/0177061 A1 | 8/2006 | Orsini et al. | |
| 2006/0190419 A1 | 8/2006 | Bunn et al. | |
| 2006/0202835 A1* | 9/2006 | Thibault et al. | 340/573.1 |
| 2006/0229988 A1 | 10/2006 | Oshima et al. | |
| 2007/0008131 A1* | 1/2007 | Doan et al. | 340/572.1 |
| 2007/0046468 A1* | 3/2007 | Davis | 340/572.1 |
| 2007/0057797 A1* | 3/2007 | Waldner et al. | 340/572.7 |
| 2007/0075841 A1* | 4/2007 | Maltsev et al. | 340/10.51 |

FOREIGN PATENT DOCUMENTS

| | | |
|---|---|---|
| EP | 0917120 | 5/1999 |
| EP | 0927945 | 7/1999 |
| EP | 1017030 | 7/2000 |
| JP | 2004-164347 | 6/2004 |
| JP | 2004348478 | 12/2004 |
| WO | WO 96/06409 | 2/1996 |
| WO | WO 98/21683 | 5/1998 |
| WO | WO 98/45778 | 10/1998 |
| WO | WO 99/21321 | 4/1999 |

OTHER PUBLICATIONS

"The Evolution of Mobile Payment", by McPherson, Financial Insights, Feb. 2, 2004, http://www.banktech.com/story/mews/showArticle/jhtml?article ID=17601432, 2 pages.

"RFID Take Priority With Wal-Mart", by DocMemory, http://www.simmtester.com/page/news/shownews.asp?num=6550, Feb. 9, 2004, 2 pages.

"Microsoft, IBM and Phillips Test RFID Technology", by Rohde, IDG New Service, http:www.computerweekly.com/Article127889.htm, Feb. 9, 2004, 3 pages.

"Pay By Touch Press Releases", http://www.paybytouch.com/press.html, Feb. 10, 2004, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.

"Putting Their Finger on It", by Wilson, http://sanfrancisco.bizjournals.com/sanfrancisco/stories/2003/10/20/story6.html?t=printable, Feb. 9, 2004, 2 pages.

"TI Embraces Prox Card Standard", by Roberti, Mar. 6, 2003, http://www.ti.com/tiris/docs/in-the-news/2003/3-6-03.shtml, 2 pages.

"Paying It By Ear", The Guardian, Jan. 18, 2003, http://money.guardian.co.uk/creditanddebt/creditcards/story/0,1456,876908,00.html, 3 pages.

Pay By Touch—Company, http://www.paybytouch.com/company.html.

"Identix Inc.—Empowering Identification™—Understanding Biometrics", http://www.identix.com/newsroom/news_biometrics_face.html, 1 page.

"International Biometric Group—Signature Biometrics: How It Works", http://www.ibgweb.com./reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"The Henry Classification System", International Biometric Group, 7 pages.

"Individual Biometrics—Hand Geometry", http://ctl.ncsc.dni.us/biomet%20web/BMHand.html, Feb. 18, 2004, 2 pages.

"Individual Biometrics—Retinal Scan", http:ctl.ncsc.dni.us/biomet%20web/BMRetinal.html, Feb. 18, 2004, 2 pages.

"Individual Biometrics—Iris Scan", http:ctl.ncsc.dni.us/biomet%20web/BMIris.html, Feb. 18, 2004, 2 pages.

"Individual Biometrics—Vascular Patterns", http:ctl.ncsc.dni.us/biomet%20web/BMVascular.html, Feb. 18, 2004, 1 page.

"Individual Biometrics—Fingerprint", http:ctl.ncsc.dni.us/biomet%20web/BMFingerprint.html, Feb. 18, 2004, 3 pages.

"Fingerprint Technology—Indentix Inc.—Empowering Identification™—Understanding Biometrics", http://www.identix.com/newsroom/news_biometrics_finger.html, Feb. 18, 2004, 1 page.

"Individual Biometrics—Facial Recognition", http:ctl.ncsc.dni.us/biomet%20web/BMfacial.html, Feb. 18, 2004, 2 pages.

"Fingerprint Analysis—The Basics", http://www.crimtrac.gov.au/fingerprintanalysis.htm, Feb. 18, 2004, 3 pages.

"Visual Speech and Speaker Recognition", by Luettin, Jun. 30, 2000, http://herens.idiap.ch/~luettin/luettin-thesis.bib.abs.html, 1 page.

"Automatic Ear Recognition by Force Field Transformations", by Hurley, et al., The Institution of Electrical Engineers, 2000, pp. 7/1-7/5.

"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.

"How Facial Recognition Systems Work", by Bonsor, http://computer.howstuffworks.com/facial-recognition.htm/printable, Feb. 18, 2004, 6 pages.

"Biometrics: Hand Geometry", by Ross, et al., http://biometrics.cse.msu.edu/hand_geometry.html, Feb. 26, 2004, 2 pages.

"Biometric Person Authentication: Odor", by Korotkaya, Department of Information Technology, Laboratory of Applied Mathematics, Lappeenranta University of Technology, 18 pages.

"ISO Magnetic Stripe Card Standards", http://www.cyberd.co.uk/support./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

"Smart Card Technology and Applications"; http://disc.cba.uh.edu/~rhirsch/fall96/lara.htm (8 pages).

Goldman, J., "Internet Security, The Next Generation, When Software Encryption is not Enough," Web Techniques, Nov. 1997, pp. 43-46.

Simmons, J., "Smart Cards Hold the Key to Secure Internet Commerce," EC World, Dec. 1998, pp. 36-38.

Wayner, P., "Digital Cash," AP Professional, 1996, pp. 76-83, 85-100.

"ISO Standards," available from http://www.iso.ch/projects/loading.html.

Turban, et al., "Using Smartcards in Electronic Commerce," Proc. 31st Annual Hawaii Inter. Conf. on System Sciences, vol. 4, 1998, pp. 62-69.

Dhem, et al., "SCALPS: Smart Card for Limited Payment Systems," IEEE Micro, Jun. 1996, pp. 42-51.

Smith, M.T., "Smart Cards: Integrating for Portable Complexity," COMPUTER-Integrated Engineering, Aug. 1998, pp. 110-115.

Geer, et al., "Token-Mediated Certification and Electronic Commerce," Proc. 2nd USENIX Workshop on Electronic Commerce, Nov. 18-21, 1996, pp. 13-22.

Gobioff, et al., "Smart Cards in Hostile Environments," Proc. 2nd USENIX Workshop in Electronic Commerce, Nov. 18-21, 1996, pp. 23-28.

Fancher, C.H., "In Your Pocket Smartcards," IEEE Spectrum, Feb. 1997, pp. 47-53.

Blythe, I., "Smarter, More Secure Smartcards," BYTE, Jun. 1997, pp. 63-64.

Leach, Dr. J., "Dynamic Authentication for Smartcards," Computers and Security, vol. 14, No. 5, 1995, pp. 385-389.

Wu, et al., "Authenticating Passwords Over an Insecure Channel," Computers and Security, vol. 15, No. 5, 1996, pp. 431-439.

Manninger, et al., "Adapting an Electronic Purse for Internet Payments," ACISP '98 Proceedings, Jul. 13-15, 1998, pp. 205-214.

Yan, et al., "Banking on the Internet and Its Applications," Proc. 13th Annual Hawaii International Conference on System Sciences, vol. 4, 1997, pp. 275-284.

Transport Layer Security Working Group, "The SSL Protocol, Version 3.0," Nov. 18, 1996 (also available at http://home.netscape.com/eng/ssl3/draft302.txt).

Business Wire (press release), "Master Card E-Wallet," Jul. 11, 2000.

Obongo.com Website, "Obongo," Aug. 8, 2000 (Description of wallet toolbar also available at http://www.obongo.com/chabi/website/index.htm).

PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.

* cited by examiner

| Field Name | Type | Max Length | Description |
|---|---|---|---|
| TPLOYALTY | 'C' | varies | Travel Partner-specific loyalty number (Frequent Flyer, Stayer, Renter, etc.) |
| PIN | 'C' | varies | Travel Partner-specific PIN associated with above loyalty number (Frequent Flyer, Stayer, Renter, etc.) |
| LASTNAME | 'C' | 30 | Last Name |
| FIRSTNAME | 'C' | 20 | First Name |
| MIDNAME | 'C' | 8 | Middle Name (or initial) |
| HONTITLE | 'C' | 8 | Honorary Title (Mr, Mrs, Ms, Dr, etc.) |
| NAMESUFX | 'C' | 4 | Name Suffix (Jr, Sr, etc.) |
| COMPNAME | 'C' | 30 | Company Name |
| HOMEADDRE1 | 'C' | 40 | Home Addres Line 1 |
| HOMEADDRE2 | 'C' | 40 | Home Addres Line 2 |
| HOMEADDRE3 | 'C' | 40 | Home Addres Line 3 |
| HOMECITY | 'C' | 25 | Home City |
| HOMESTATE | 'C' | 5 | Home State |
| HOMECOUNTR | 'C' | 2 | Home Country |
| HOMEZIP | 'C' | 10 | Home ZIP CODE (12345-1234) |
| HOMEPHONE | 'C' | 20 | Home Phone (No Punctuation; Numbers only; 7129991023) |
| HOMEFAX | 'C' | 20 | Home Fax; (No Punctuation; Numbers only; 7129991023) |
| HOMEEMAIL | 'C' | 40 | Home Email Address |
| BUSADDRES1 | 'C' | 40 | Business Addres Line 1 |
| BUSADDRES2 | 'C' | 40 | Business Addres Line 2 |
| BUSADDRES3 | 'C' | 40 | Business Addres Line 3 |
| BUSCITY | 'C' | 25 | Business City |
| BUSSTATE | 'C' | 5 | Business State |
| BUSCOUNTRY | 'C' | 2 | Business Country |
| BUSZIP | 'C' | 10 | Business ZIP code (12345-1234) |

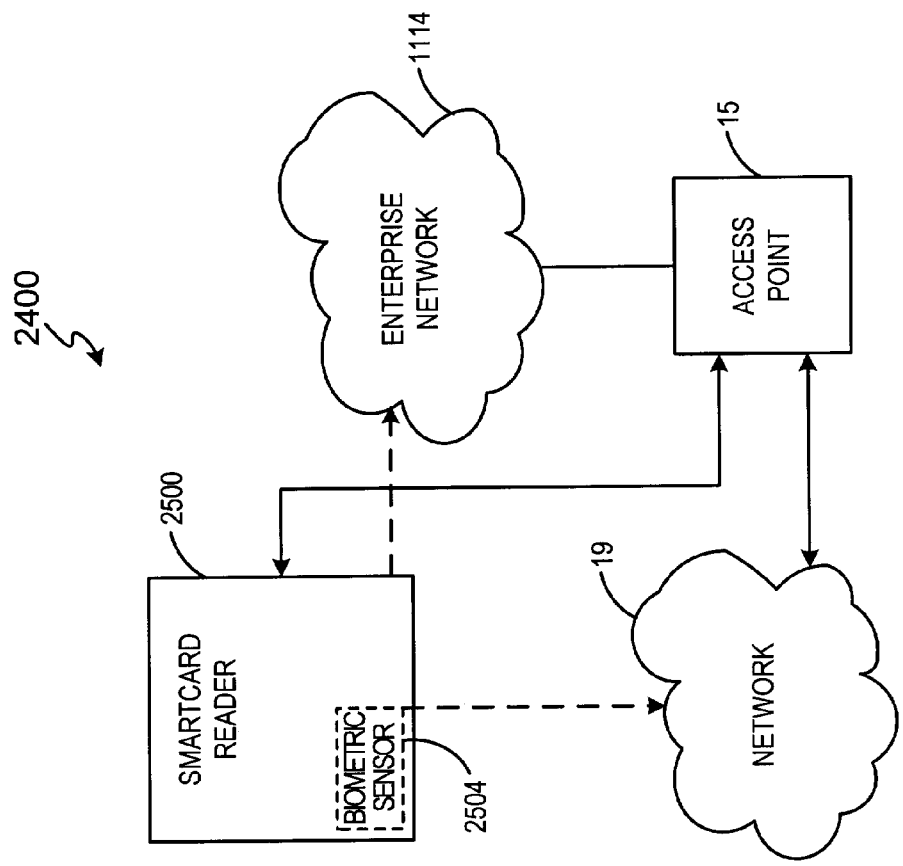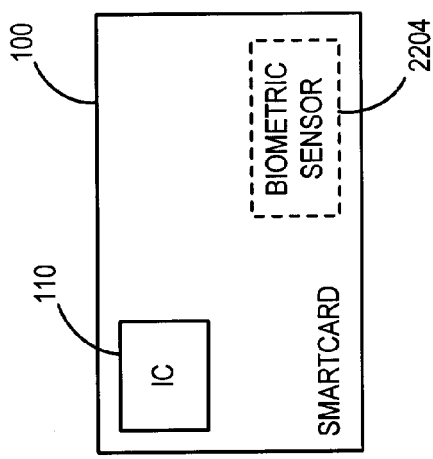
FIG. 24

\*\*\* Track 2 Layout: \*\*\* | SS | PAN | FS | Additional Data | ES | LRC |

FIG. 26

\*\*\*MasterCard Track Layout in Track 2\*\*\*

| SS | PAN | FS | ADDITIONAL DATA | ES | LRC |

METHOD FOR REGISTERING A BIOMETRIC FOR USE WITH A SMARTCARD

FIELD OF INVENTION

The present invention relates generally to the use of integrated circuit cards, or "smartcards," for commercial transactions and, more particularly, to methods and system for using biometrics with a smartcard in the context of a distributed transaction system.

BACKGROUND OF INVENTION

The term "smartcard" refers generally to wallet-sized or smaller cards incorporating a microprocessor or microcontroller to store and manage data within the card. More complex than magnetic-stripe and stored-value cards, smartcards may be characterized by sophisticated memory management and security features. A typical smartcard may include a microcontroller embedded within the card plastic which may be electrically connected to an array of external contacts provided on the card exterior. A smartcard microcontroller generally may include an electrically-erasable and programmable read only memory (EEPROM) for storing user data, random access memory (RAM) for scratch storage, and read only memory (ROM) for storing the card operating system. Relatively simple microcontrollers may be adequate to control these functions. Thus, it may be not unusual for smartcards to utilize 8-bit, 5 MHZ microcontrollers with about 8K of EEPROM memory (for example, the Motorola 6805 or Intel 8051 microcontrollers).

A number of standards have been developed to address general aspects of integrated circuit cards, e.g.: ISO 7816-1, Part 1: Physical characteristics (1987); ISO 7816-2, Part 2: Dimensions and location of the contacts (1988); ISO 7816-3, Part 3: Electronic signals and transmission protocols (1989, Amd. 1 1992, Amd. 2 1994); ISO 7816-4, Part 4: Inter-industry commands for interchange (1995); ISO 7816-5, Part 5: Numbering system and registration procedure for application identifiers (1994, Amd. 1 1995); ISO/IEC DIS 7816-6, Inter-industry data elements (1995); ISO/IEC WD 7816-7, Part 7: Enhanced inter-industry commands (1995); and ISO/IEC WD 7816-8, Part 8: Inter-industry security architecture (1995). These standards may be hereby incorporated by reference. Furthermore, general information regarding magnetic stripe cards and chip cards may be found in a number of standard texts, e.g., Zoreda & Oton, "Smart Cards" (1994), and Rankl & Effing, "Smart Card Handbook" (1997), the contents of which may be hereby incorporated by reference.

While some smartcard systems have streamlined the transaction process and provided a system for managing more information, smartcard technology has still not adequately addressed some of the authentication issues related to transactions. Moreover, while biometric technology exists with respect to certain access systems and limited financial systems, the use of biometric security in association with smartcards remains underdeveloped and scarce. As such, a need exists to integrate biometric technology advances with smartcard technology.

Additionally, despite advances in information technology and process streamlining with respect to travel arrangements, the modern traveler may be often subjected to unnecessary delays, petty inconveniences, and oppressive paperwork. These travel burdens may be most evident in the airline, hotel, and rental car industries, where arranging and paying for services and accommodations may involve significant time delays due to miscommunication, poor record-keeping, and a host of other administrative inefficiencies. As such, a need also exists to expand the use of smartcards into travel-related applications.

SUMMARY OF INVENTION

The smartcard system is configured with a biometric security system. The biometric security system includes a smartcard and a reader communicating with the system. The biometric security system also includes a biometric sensor that detects biometric samples and a device for verifying biometric samples. In yet another embodiment, the present invention discloses methods for proffering and processing biometric samples to facilitate authorization of transactions.

The present invention may provide methods and apparatus for a smartcard system which securely and conveniently integrates important travel-related applications with biometric security, thereby overcoming the limitations of the prior art. In accordance with one aspect of the present invention, a smartcard system may comprise a cardholder identification application and various additional applications useful in particular travel contexts; for example, airline, hotel, rental car, and payment-related applications. In accordance with another aspect of the present invention, a smartcard system further may comprise space and security features within specific applications which provide partnering organizations the ability to construct custom and secure file structures.

In accordance with one aspect of the present invention, a dynamic smartcard synchronization system comprises access points configured to initiate a transaction in conjunction with a smartcard, an enterprise data collection unit, and a card object database update system, along with a biometric security system. An exemplary dynamic synchronization system (DSS) preferably comprises various smartcard access points, a secure support client server, a card object database update system (CODUS), one or more enterprise data synchronization interfaces (EDSI), an update logic system, one or more enterprise data collection units (ED-CUs), and one or more smartcard access points configured to interoperably accept and interface with smartcards. In an exemplary embodiment, DSS comprises a personalization system and an account maintenance system configured to communicate with CODUS.

In accordance with a further aspect of the present invention, personalization of multi-function smartcards is accomplished using a biometric security system and a security server configured to generate and/or retrieve cryptographic key information from multiple enterprise key systems during the final phase of the smartcard issuance process.

These features and other advantages of the system and method, as well as the structure and operation of various exemplary embodiments of the system and method, are described below.

BRIEF DESCRIPTION OF DRAWINGS

The present invention may hereinafter be described in conjunction with the appended drawing figures, wherein like numerals denote like elements, and:

FIG. 21 is an exemplary transaction data structure suitable for use in a travel context;

FIG. 24 is a schematic illustration of an exemplary smartcard biometric system in accordance with the present invention;

FIG. 26 is an exemplary depiction of a Track 2 layout in accordance with the present invention; and FIG. 27 is an exemplary depiction of another Track 2 layout in accordance with the present invention.

DETAILED DESCRIPTION

Figure 1:
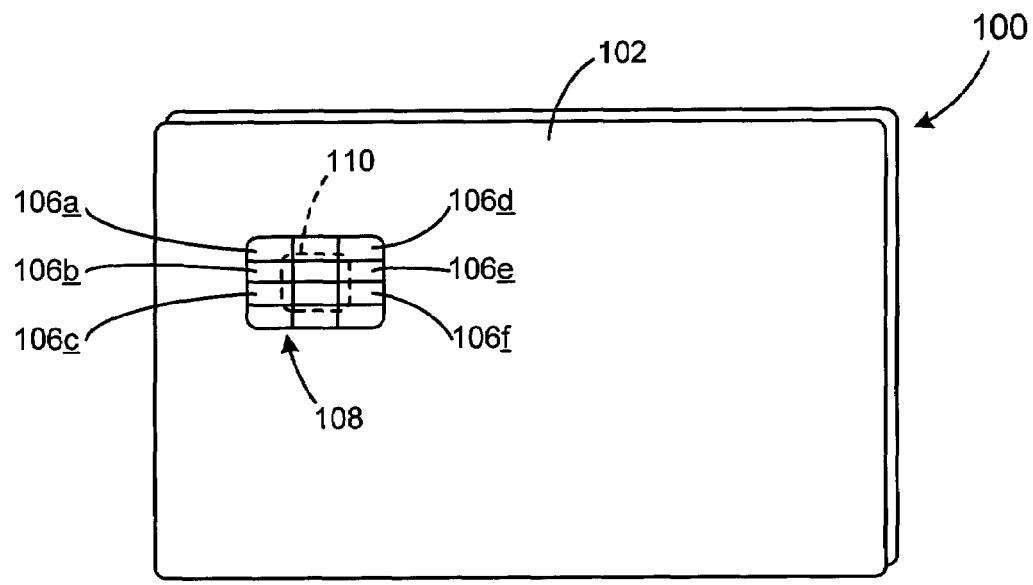
FIG. 1 illustrates an exemplary smartcard apparatus.
Figure 2:
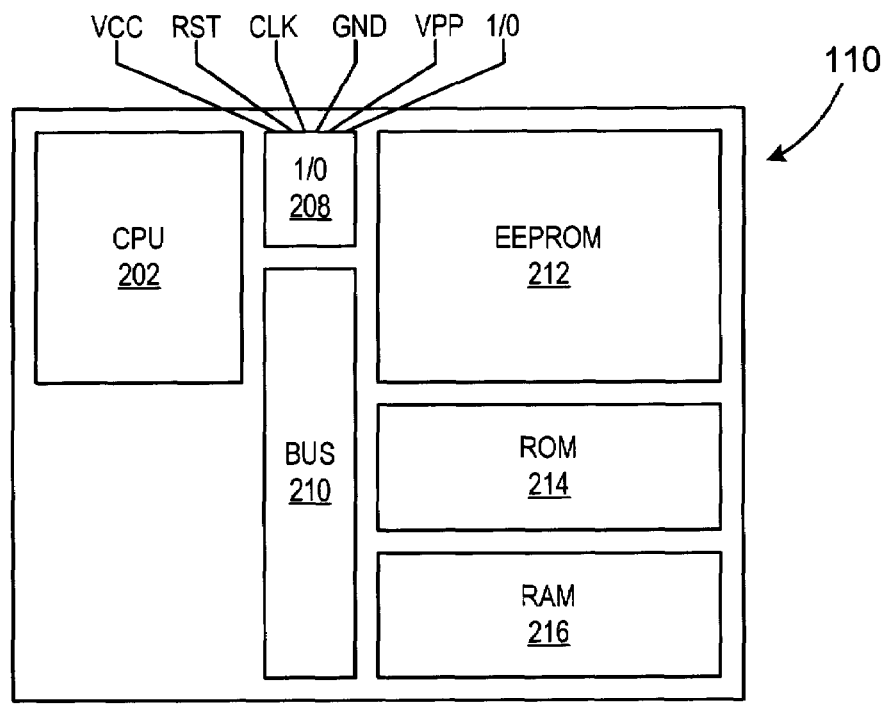
FIG. 2 is a schematic diagram of an exemplary smartcard integrated circuit, showing various functional blocks.

Referring now to FIGS. 1 and 2, an exemplary smartcard system suitable for practicing the present invention may now be described. A smartcard 100 generally may comprise a card body 102 having a communication region 108 for providing contact or non-contact communication between an external device (e.g., a card reader) and an integrated circuit 110 encapsulated within card body 102. Communication region 108 preferably may comprise six conductive pads 106 whose placement and size conform to ISO-7816-2. More particularly, a communication region 108 in conformance with ISO-7816-2 preferably may comprise VCC contact 106(a) (power supply), RST contact 106(b) (reset), CLK contact 106(c) (external clock), GND Contact 106(d) (ground), VPP contact 106(e) (programming voltage), and I/O contact 106(f) (data line).

VCC 106(a) may suitably provide power to IC 110 (typically 5.0 V+/−10%). CLK 106(c) may be suitably used to provide an external clock source which acts as a data transmission reference. RST 106(b) may be suitably used to transmit a reset signal to IC 110 during the booting sequence. VPP contact 106(e) may be used for programming of EEPROM 212 in IC 110. As may be known in the art, however, this contact may be generally not used since modern ICs typically incorporate a charge pump suitable for EEPROM programming which takes its power from the supply voltage (VCC 106(a)). I/O 106(f) may suitably provide a line for serial data communication with an external device, and GND 106(d) may be suitably used to provide a ground reference. Encapsulated integrated circuit 110 may be configured to communicate electrically with contacts 106 via any number of known packaging techniques, including, for example, thermosonically-bonded gold wires, tape automated bonding (TAB), and the like.

While an exemplary smartcard is discussed above in the context of a plurality of external contacts, it may be appreciated that contactless cards may also be utilized to practice this invention. That is, non-contact communication methods may be employed using such techniques as capacitive coupling, inductive coupling, and the like. As may be known in the art, capacitive coupling involves incorporating capacitive plates into the card body such that data transfer with a card reader may be provided through symmetric pairs of coupled surfaces, wherein capacitance values may be typically 10-50 Pico farads, and the working range may be typically less than one millimeter. Inductive coupling may employ coupling elements, or conductive loops, disposed in a weakly-coupled transformer configuration employing phase, frequency, or amplitude modulation. In this regard, it may be appreciated that the location of communication region 108 disposed on or within card 100 may vary depending on card configuration. For additional information regarding non-contact techniques, see, for example, contactless card standards ISO/IEC 10536 and ISO/IEC 14443, which are hereby incorporated by reference.

Smartcard body 102 may be preferably manufactured from a sufficiently rigid material which may be resistant to various environmental factors, e.g., physical deterioration, thermal extremes, and ESD (electrostatic discharge). Materials suitable in the context of the present invention may include, for example, PVC (polyvinyl chloride), ABS (acrylonitrile-butadiene-styrol), PET (polyethylene terephthalate), or the like. In an exemplary embodiment, chip card 100 may conform to the mechanical requirements set forth in ISO 7810, 7813, and 7816. Body 102 may comprise a variety of shapes, for example, the rectangular ID-1, ID-00, or ID-000 dimensions set forth in ISO-7810. In an exemplary embodiment, body 102 may be roughly the size and shape of a common credit card and substantially conforms to the ID-1 specification.

Referring now to FIG. 2, IC 110 preferably may comprise regions for Random Access Memory (RAM) 216, Read-Only Memory (ROM) 214, Central Processing Unit (CPU) 202, data bus 210, Input/Output (I/O) 208 and Electrically-Erasable and Programmable Read Only Memory (EEPROM) 212.

RAM 216 may comprise volatile memory which may be used by the card primarily for scratch memory, e.g., to store intermediate calculation results and data encryption processes. RAM 216 preferably may comprise at least 256 bytes.

EEPROM 212 may provide a non-volatile memory region which may be erasable and rewritable electrically, and which may be used to store, inter alia, user data, system data a smartcard identifier and application files. In the context of the present invention, EEPROM 212 may be suitably used to store a plurality of files related to cardholder information, including general cardholder information, payment information and/or other transaction information. In one exemplary embodiment in accordance with the present invention, EEPROM 212 may be suitably used to store travel-related information (discussed in greater detail below in conjunction with FIG. 3). EEPROM 212 preferably may comprise at least 8K bytes.

A smartcard identifier, as used herein, may include any account number, Card Production Life Cycle (CPLC) data, and/or identifier for an account (e.g., credit, charge debit, checking, savings, reward, loyalty, travel or the like) which may be maintained by a transaction account provider (e.g., payment authorization center) and which may be used to complete a transaction. The smartcard identifier may include financial transaction information, CPLC data, and or other information, such as, for example, a passport number, a driver's license number, a social security number, and/or any other indicator used to facilitate identification, access and/or any other type of transaction. A typical account number (e.g., account data) may be correlated to a credit or debit account, loyalty account, travel or rewards account maintained and serviced by such entities as American Express, Visa and/or MasterCard or the like. For ease in understanding, the present invention may be described with respect to a credit card account. However, it should be noted that the invention may be not so limited and other accounts permitting an exchange of goods and services for an account data value may be contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and etc. In this example, the last sixteenth digit may be used as a sum check for the sixteen-digit number. The intermediary eight-to-ten digits are used to uniquely identify the customer. The account number stored as Track 1 and Track 2 data as defined in ISO/IEC 7813, and further may be made unique to smart card 102. Track 1 and Track 2 data may be described in more detail below.

In an exemplary embodiment, CPU 202 may implement the instruction set stored in ROM 202, handles memory management (i.e., RAM 216 and EEPROM 212), and coordinates input/output activities (i.e., I/O 208).

ROM 214 preferably contains, or may be "masked" with, the smart card operating system (SCOS). That is, the SCOS may be preferably implemented as hard-wired logic in ROM 214 using standard mask design and semiconductor processing methods well known in the art (e.g., photolithography, diffusion, oxidation, ion implantation, etc.). Accordingly, ROM 214 cannot generally be altered after fabrication. The purpose of such an implementation may be to take advantage of the fast access times provided by masked ROMs. ROM 214 suitably may comprise about 4K-20K bytes of memory, preferably at least 16K bytes. In this regard, it may be appreciated that alternate memory devices may be used in place of ROM 214. Indeed, as semiconductor technology progresses, it may be advantageous to employ more compact forms of memory, for example, flash-EEPROMs.

The SCOS controls information flow to and from the card, and more particularly facilitates storage and retrieval of data stored within EEPROM 212. As with any operating system, the SCOS may operate according to a well-defined command set. In this regard, a variety of known smart card operating systems may be suitable for the purpose of this invention, for example, IBM's Multi-Function Card (MFC) Operating System 3.51, the specification of which are hereby incorporated by reference. While the IBM MFC operating system may employ the standard tree structure of files and directories substantially in accordance with ISO 7816-4 (as detailed below), it may be appreciated by those skilled in the art that other operating system models would be equally suitable for implementation of the present invention. Moreover, it may be advantageous to allow certain aspects of operating system functionality to exist outside the card, i.e., in the form of blocks of executable code which may be downloaded and executed by the smartcard during a transaction (for example, Java applets, ActiveX objects, and the like).

Given the general characteristics of smartcard 100 as outlined above, it may be apparent that a wide range of microcontrollers and contact-based smartcard products known in the art may be used to implement various embodiments of the present invention. Suitable smartcards may include, for example, the model ST16SF48 card, manufactured by SGS-Thomson Microelectronics, which incorporates a Motorola 6805 microcontroller with 16K ROM, 8K EEPROM, and 384 bytes of RAM. It may be appreciated, however, that particular embodiments of the present invention might require more advanced microcontrollers with greater EEPROM capacity (i.e., in the range of about 12-16K). Such systems may be well known in the art.

In accordance with another exemplary embodiment, the smartcard identifier and/or any other account number or data may be stored in magnetic stripe format. For example, where the account number may be in magnetic stripe format, the account number portions are governed by the International Standards Organization ISO/IEC 7811, et al. standard, which are hereby incorporated by reference. The standard requires the magnetic stripe information to be encoded in three "tracks" (i.e., track 1, track 2, and track 3).

Data stored in track 1 may be typically used to verify the user's identity. Track 1 may be reserved for encoding the transaction account identifier, the name of the accountholder and at least the expiration date of the transaction account or the transaction device. The information encoded in track 1 may be alpha-numeric and may be encoded at about 7 Bits/Character. In an exemplary layout of the data stored in track 1, track 1 may be segmented into several distinct predetermined portions (e.g., "fields") for encoding the various account identifying information. The following table may be useful for determining the field definitions of the information provided.

TABLE 1

Table of Field Codes for Track 1

SS = Start Sentinel "%"
FC = Format Code
PAN = Primary Acct. # (19 digits max)
FS = Field Separator "^"
Name = 26 alphanumeric characters max.
Additional Data = Expiration Date, offset, encrypted PIN, etc.
ES = End Sentinel "?"
LRC = Longitudinal Redundancy Check Track 2 may be the track most commonly used by the American Banking Association associated banking institutions. Track 2 may be typically reserved for a duplicate version of the transaction account identifier and the expiration date of the transaction account or the transaction device stored in track 1. In addition, track 2 may include an encrypted Personal Identification Code, and other discretionary data. However, the data in track 2 may be encoded at a lower Bit per Character density than the data encoded in track 1. The data in track 2 may be numeric only and may be encoded at about 5 Bits/Character. The lower density ratio in track 2 may be designed to ensure compatibility with older technology readers and to provide redundancy when reading with newer technology readers. FIG. 26 illustrates an exemplary layout of the data stored in track 2, wherein track 2 may be segmented into several distinct predetermined portions for encoding the various account identifying information. As shown, the following table may be useful for determining the definitions of the information provided. Table of Field Codes for Track 2.

TABLE 2

SS = Start Sentinel "%"
SS = Start Sentinel ";"
PAN = Primary Acct. # (19 digits max)
FS = Field Separator "="
Additional Data = Expiration Date, offset, encrypted PIN, etc.
ES = End Sentinel "?"
LRC = Longitudinal Redundancy Check Track 3 may be of similar description as Track 2. With the International Standards Organization adoption of standard ISO/IEC 4909, track 3 of the magnetic stripe format was no longer used by the banking industry. However, other transaction devices including a magnetic stripe, such as drivers licenses, use track 3, which may include both numeric only and alpha numeric characters. Track 3 may be unique in that track 3 was intended to have data read and WRITTEN on it. Cardholders would have account information UPDATED right on the magnetic stripe. The present invention anticipates that a smart card user's travel-related information profile and/or account information may be updated using track 3. Unfortunately, track 3 may be almost an orphaned standard, since most readers currently in operation are not configured to write data onto a magnetic stripe. The original design of track 3 was to control off-line ATM transactions by recording transaction data for later reference by the banking institution. But since ATMs are now on-line, the usage of track 3 has been drastically reduced.

The most common technique used to encode data in magnetic stripe format may be known as Aiken Biphase, or "two-frequency coherent-phase encoding." The American National Standards Institute (ANSI) and the International Standards Organization (ISO) have chosen two standards to guide the encoding process. The ISO encoding protocol specifies that each of tracks 1, 2 and 3 must begin and end with a length of all Zero bits, called CLOCKING BITS. These are used to synchronize the self-clocking feature of bi-phase decoding. In addition, most transaction devices which use magnetic stripe encoding protocol use either the ANSI/ISO ALPHA Data format or the ANSI/ISO BCD Data format. For example, track 1 may be typically encoded in ANSI/ISO ALPHA Data format which may be a 7 bit, 6 data bits +1 parity bit (odd) format, where the data may be read least significant bit first. The ANSI/ISO ALPHA format character set contains 64 characters, 43 alphanumeric, 3 framing/field characters and 18 control/special characters. On the other hand, tracks 2 and 3 are typically encoded in ANSI/ISO BCD Data format, which may be a 5 bit, 4 data bits +1 parity bit(odd) format. The character set for the ANSI/ISO BCD Data format character set contains 16 characters, 10 alphanumeric, 3 framing/field characters and 3 control/special characters.

Ordinarily, a proxy account number (e.g., a portion of the transaction account number) includes essential identifying information, such as, for example, any information that may be common to the account provider. The common information (also called "common character," herein) may include the account provider routing number, or common source indicator such as the character spaces reserved to indicate the identification of the issuing bank. Thus, where the proxy transaction account identifier corresponds to an American Express account, the proxy transaction account identifier may include the common character number 3, encoded the field location where such common character may be ordinarily encoded in traditional magnetic stripe format.

Figure 12:
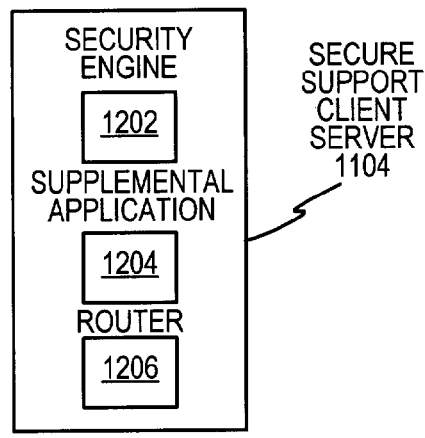
FIG. 12 is a schematic overview of an exemplary secure support client server.

FIG. 27 illustrates the encoding of which would ordinarily be done by an entity, such as, for example, MasterCard in track 2 format. FIG. 12 shows the encoding of a Mastercard account number 3111 2222 3333 4444 with expiration date 12/99 in traditional track 1 format. Since MasterCard uses the number 3 to identify its transaction accounts, the proxy account identifier will also use the number 3 so that the receiving system (e.g., reader 104 or merchant system 130, or account provider) further recognized that the proxy account identifier may be from a MasterCard transaction device. It should be noted that in this example, the "3" and the "101" may be common characters to all MasterCard transaction accounts. For a more detailed explanation of magnetic stripe format data exchange, see U.S. patent application Ser. No. 10/810,473 filed on Mar. 26, 2004, entitled SYSTEM AND METHOD FOR ENCODING INFORMATION IN MAGNETIC STRIPE FORMAT FOR USE IN RADIO FREQUENCY IDENTIFICATION TRANSACTIONS, incorporated herein by reference.

Figure 4:
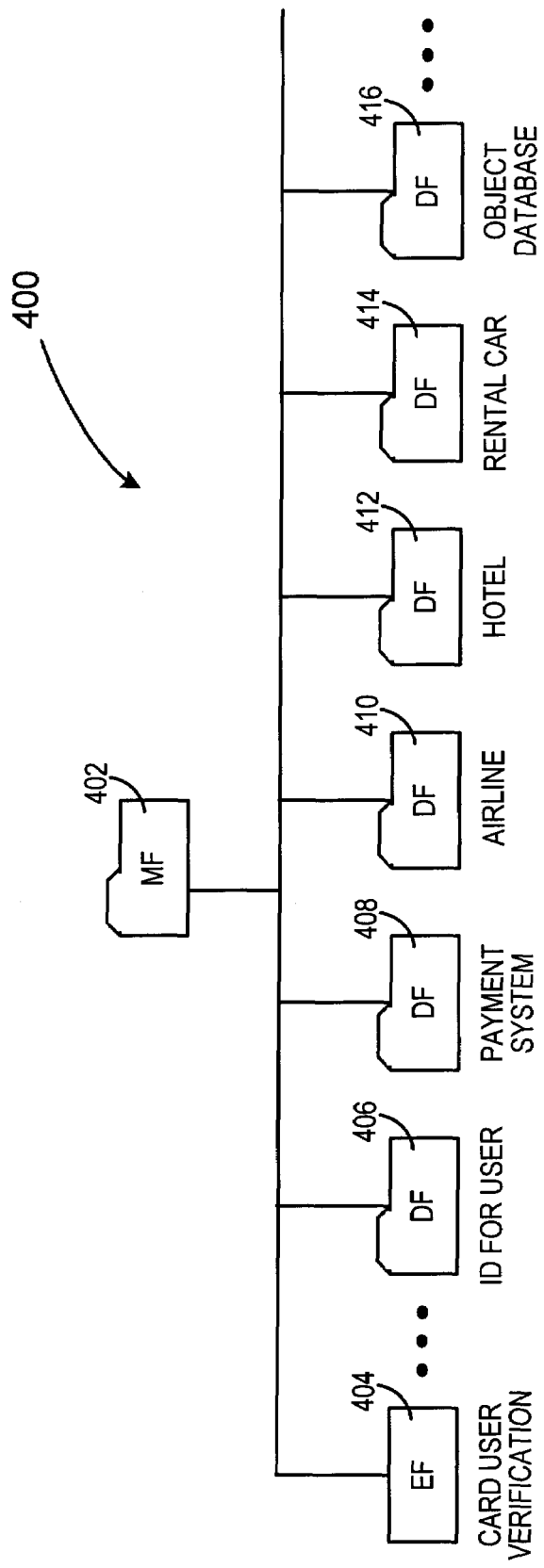
FIG. 4 sets forth an exemplary database structure in accordance with an exemplary embodiment of the present invention.

Having thus described an exemplary smartcard 100 and IC 110, an overview of a smartcard file structure in accordance with the present invention may now be described. Referring now to FIG. 4, file structure 400 may be preferably used to store information related to card-holder preferences and various data useful for securing and paying for air travel, rental cars, hotel reservations and the like. More particularly, file structure 400 preferably may comprise cardholder ID application 406, payment system application 408, airline application 410, hotel system application 412, rental car application 414, and cardholder verification data 404. It may be appreciated by those skilled in the art that the term "application" in this context refers to self-contained regions of data all directed at a particular function (e.g., airline, hotel, etc.) rather than a block of executable software code, although the use of executable modules as part of any particular application falls within the scope of the present invention.

Cardholder verification data 404 preferably houses data useful in verifying cardholder identity during a transaction. In an exemplary embodiment, cardholder verification data 404 may comprise two eight-byte cardholder verification numbers (i.e., PIN numbers) referred to as CHV1 and CHV2.

Cardholder ID application 406 suitably may comprise various files related to personal information of the cardholder (e.g., name, addresses, payment cards, driver's license, personal preferences and the like). Cardholder ID application 406 is described in greater detail below in conjunction with FIG. 5.

Payment system application 408 suitably may comprise information useful in effecting commercial transactions, e.g., account number and expiration date information traditionally stored on a magnetic-stripe credit card. Alternatively, Payment system application 408 may comprise a full EMV-compliant application suitable for a wide range of financial transactions. Payment system application 408 is described further below in conjunction with FIG. 6.

Airline application 410 suitably may comprise data helpful in streamlining commercial airline travel; for example, relevant personal preferences, electronic tickets, and frequent flier information. Airline application 410 is discussed in greater detail below in conjunction with FIG. 7.

Hotel application 412 suitably may comprise information useful for securing and paying for hotel reservations, including an array of information and preferences associated with a list of preferred hotels as well space for electronic keys. Hotel application 412 is discussed in greater detail below in conjunction with FIG. 9.

Rental car application 414 suitably may comprise data useful in expediting the process of car rental and return, including, for example, car preference and frequent rental information. Rental car application 414 is described in further detail below in conjunction with FIG. 8.

In each of the above mentioned applications, sophisticated access and encryption schemes may be, in one embodiment, utilized in order to allow multiple parties to make use of certain file structures while preventing unauthorized entry into others. More specifically, partnering organizations (e.g., hotel chains, airlines, and rental car agencies) may create their own tailor-made file structures (i.e., "partner file structures") within card 100. Details of the various security measures employed is described in further detail below in conjunction with Table 39.

Figure 10:
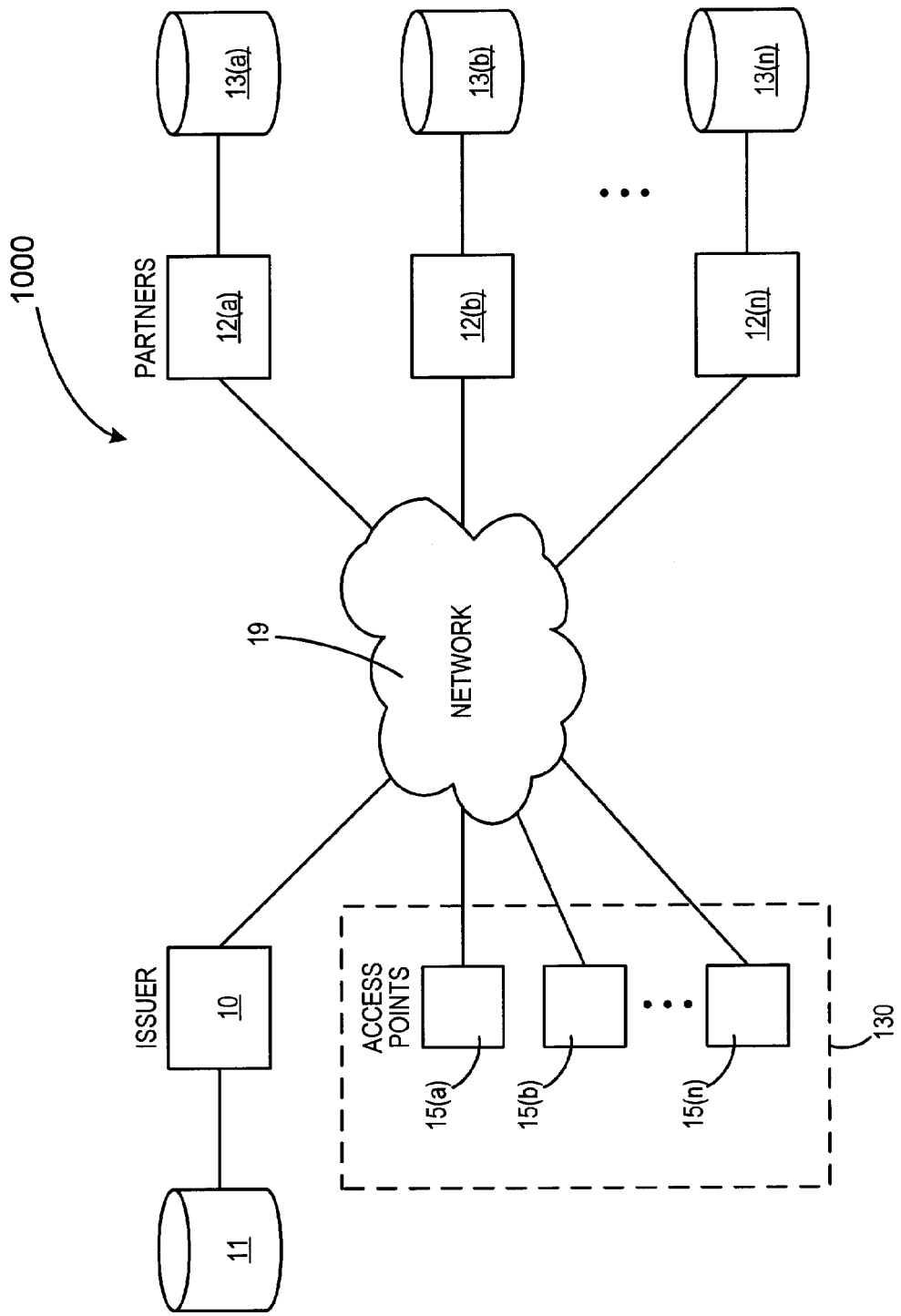
FIG. 10 illustrates an exemplary distributed transaction system useful in practicing the present invention.

Referring now to FIG. 10, smartcard 100 may be suitably used in the context of a distributed transaction system. Briefly, cardholder's may employ smartcard 100 at various access points 15 which may be connected via network 19 to an issuer 10 and at least one partnering organization 12. Issuer 10 suitably may comprise various hardware and software components suitable for client host communications as well as a database system 11. In this context, the term "issuer" refers to the organization that actually issues the smartcard and retains some high-level access to certain areas of file structure 400 (detailed below).

Partnering organizations 12(*a*), 12(*b*), and so on, comprise the various hotel chains, rental-car agencies, airlines, and the like, who have access to appropriate data regions within smartcard 100. Each partnering organization 12 suitably may comprise a database 13 and appropriate hardware and software components necessary for completing a transaction over network 19. Network 19 may comprise the various components, databases, modules, and apparatus described above connected via a suitable data communication network. Such a network may consist of various physical connections using a variety of conventional data protocols, for example, the TCP/IP protocol. It may be appreciated that the individual connections between components of the present system may differ. For example, network 19 may comprise a wireless PCS network, a Internet TCP/IP connection, a public switched telephone network (PSTN), a digital and analog wireless networks, and the like.

Those skilled in the art may appreciate that a variety of hardware systems may be suitable for implementing the present invention. Various modems, routers, CPU's, monitors, back-up systems, power-supplies, and peripherals may be employed to realize the benefits of the present system. In one embodiment, for example, a Compaq Prolinea computer operating in an OS/2 environment using IBM MQ Server software may be used to implement servers used for the present invention. Further a Compaq Prolinea computer operating in a Windows/NT environment running a suitable database software package may facilitate data exchanges in accordance with the present invention.

Each access point 15 suitably may comprise an appropriate card reader 104 for interfacing with smartcard 100 as well as hardware and software suitable for interfacing with a cardholder and performing a transaction over network 19. Smartcard access points 15 allow the cardholder to gain access to the distributed transactions system through a variety of means. Such access points may include, for example, standard home telephones, various PCS wireless systems, pay phones, palmtop computers, notebook computers, Internet workstations, automated teller machines (ATMs), point of sale terminals (POS) stand-alone kiosks, network computers (NCs), personal data assistants (PDAs), or any other suitably configured communication apparatus. Access points 15 may be portable (as in the case of PDAs and cellular phones) or centrally located, for example, in airline ticketing and gate areas, rental car facilities, hotel lobbies, travel agencies, and malls. In addition, businesses may see fit to host an access point 15 to streamline their employees' business travel. In an exemplary embodiment, various access points 15 may be configured to interface with contact-based smartcards 100 in accordance with the relevant portions of the ISO-7816 standard.

Figure 3:
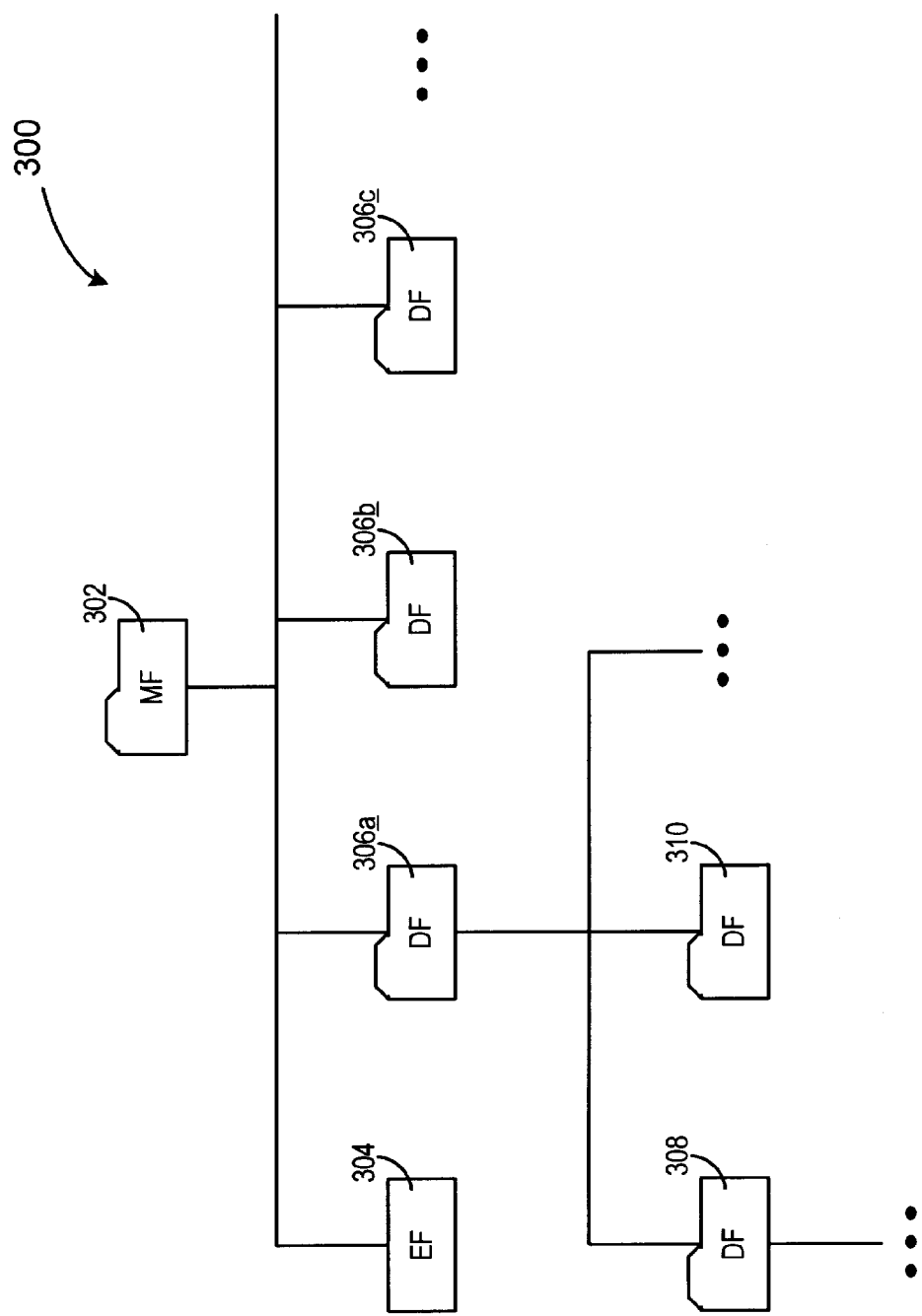
FIG. 3 is an exemplary diagram of files and directories arranged in a typical tree structure.

In an exemplary embodiment of the present invention, data files and directories may be stored in a "tree" structure as illustrated in FIG. 3. That is, the smartcard file structure may resemble the well known MS-DOS (Microsoft Disk Operating System) file structure wherein files may be logically organized within a hierarchy of directories. Specifically, three types of files may be defined in ISO 7816-4: dedicated files (DF), elementary files (EF), and a master file (MF). The master file may be analogous to the MS-DOS "root" directory, and contains all other files and directories. Dedicated files may be actually directories or "folders" for holding other DFs or EFs. Thus, MF 302 may contain an arbitrary number of DFs 306, and these DFs (e.g., DF 306(*a*)) may or may not contain other DFs (e.g., DF 308). Elementary files may be used to store user data, and may exist within a dedicated file (e.g., EF 310 within DF 306(*a*)), or within the master file (e.g., EF 304 within MF 302). Higher level DFs (i.e., DFs which house particular applications) may be often referred to as application dedicated files (ADFs).

The MF and each of the DFs and EFs may be assigned a unique two-byte file identifier (FID). By convention, the MF may be traditionally assigned an FID of "3F00" hex. Selection of an EF or DF by the operating system may then be performed by tracing its entire path starting at the MF. Thus, if the MF contains a DF with a FID "A100", and this DF in turn contains an EF with a FID "A101", then this EF could be referenced absolutely by successive selection of FIDs 3F00, A100, and A101. It may be appreciated that the FID may be essentially a file name used by the operating system to select directories and files; it may be not intended to indicate a physical address within EEPROM 212. As may be appreciated by those skilled in the art, low-level EEPROM addressing may be preferably handled by the SCOS in conjunction with CPU 202.

Each file preferably has an associated file header containing various indicia of the particular EF, DF, or MF. More particularly, the file header associated with a particular file preferably may include the file identifier (FID), file size, access conditions, and file structure. In this regard, smartcard 100 suitably may employ one of four file structures: transparent, linear fixed, linear variable, or cyclic. For the sake completeness, the nature of these file structures may be briefly reviewed.

A transparent file structure consists of a string of bytes accessed by specifying an offset and byte count. For example, with reference to Table 1 below, given a n-byte string of data, bytes 7 through 10 would be accessed using an offset of six and a length of four.

TABLE 1

Transparent file structure
byte#

| 1 | 2 | 3 | 4 | 5 | 6 | 7 | 8 | 9 | 10 | 11 | 12 | 13 | 14 | ... | ... | n |
|---|---|---|---|---|---|---|---|---|----|----|----|----|----|----|----|---|

-------------------- offset --------------------> <------- length ------->

A linear fixed file structure may comprise a plurality of records of equal length (e.g., a list of phone numbers), wherein access to an individual record may be achieved through reference to a record number. In addition, it may be possible to refer to the "next" or "previous" record relative to the "current" record (i.e., the most recently accessed record). In contrast, a linear variable file structure may comprise records of arbitrary but known length, and may be therefore typically more compact than linear fixed data structures.

A cyclic file structure may be a type of linear fixed file wherein a pointer may be used to point to the last data set written to. After the last data record may be written to, the pointer returns to the first record. That is, a cyclic file may comprise a series of records arranged in a "ring". A data structure particularly important with regard to storing records as well as secure messaging in smartcard applications may be the BER tag-length-value or "TLV" structure in accordance with ISO/IEC 8825, hereby incorporated by reference. In a TLV object, information regarding the type and length of the information may be included along with the actual data. Thus, a TLV object may comprise a tag which identifies the type of data (as called out by the appropriate specification), a length field which indicates the length in bytes of the data to follow, and a value field, which may comprise the primary data. For example, the TLV object illustrated in Table 2 below encodes the text "phoenix", which has a length of 7 bytes, and corresponds to a the "city" tag of "8C" hex (a hypothetical tag designation).

TABLE 2

Exemplary primitive TLV object

| Tag | Length | Value |
|-----|--------|-------|
| '8C' | '07' | p  h  o  e  n  i  x |

It may be appreciated that the meaning of the various tag values must be known to the system a priori. That is, in order for the tag field to be useful, the smartcard and any external systems communicating with the smartcard must conform to the same tag specification. In this regard, ISO/IEC 7816-6 defines a series of tags useful in the context of the present invention, as does the IBM MFC 3.2 specification. ISO/IEC 8825 sets forth the basic encoding rules for a TLV system and defines a "template" data object which may be used as a container for multiple TLV objects. That is, it may be often advantageous to encapsulate primitive TLV objects within a larger template which may be itself a TLV object.

Referring now to FIG. 4, an exemplary smartcard data structure in accordance with the present invention may now be described in detail. Data structure 400 preferably may comprise a MF 402 and five DFs: Cardholder ID application 406, Payment system application 408, Airline application 410, Hotel application 412, and Rental car application 414.

In the detailed description to follow, various acronyms and abbreviations may be used to refer to particular data types, formats, and the like. A key to these acronyms and abbreviations may be presented in Table 3 below.

TABLE 3

Key to acronyms

| AN | Alphanumeric |
| N | Numeric |
| B | Boolean |
| C | Convention |
| M | Matrix |
| D | Data |
| AR | Bits array |
| BIN | Binary |
| RJ | Right-justified |
| LJ | Left-justified |
| BCD | Binary coded decimal |

In the discussion that follows, the various features of an exemplary data structure may be in some cases described using particular file structure types (i.e., transparent, fixed, etc.). Those skilled in the art may realize, however, that any of the common smartcard file structure types may be typically suitable for implementing any particular data structure. For example, when a file structure is described as including "a plurality of records," it may be understood that such a structure may be designed, for example, using a list of records assembled in a linear fixed file wherein each record may be itself a transparent file (and offset values correspond to the various fields). Alternatively, such a structure may be designed using TLV strings assembled in a linear fixed file or within a larger template TLV. This may be the case notwithstanding the fact that particular tag values which may be for the most part arbitrary may not explicitly listed in the tables that follow.

Figure 5:
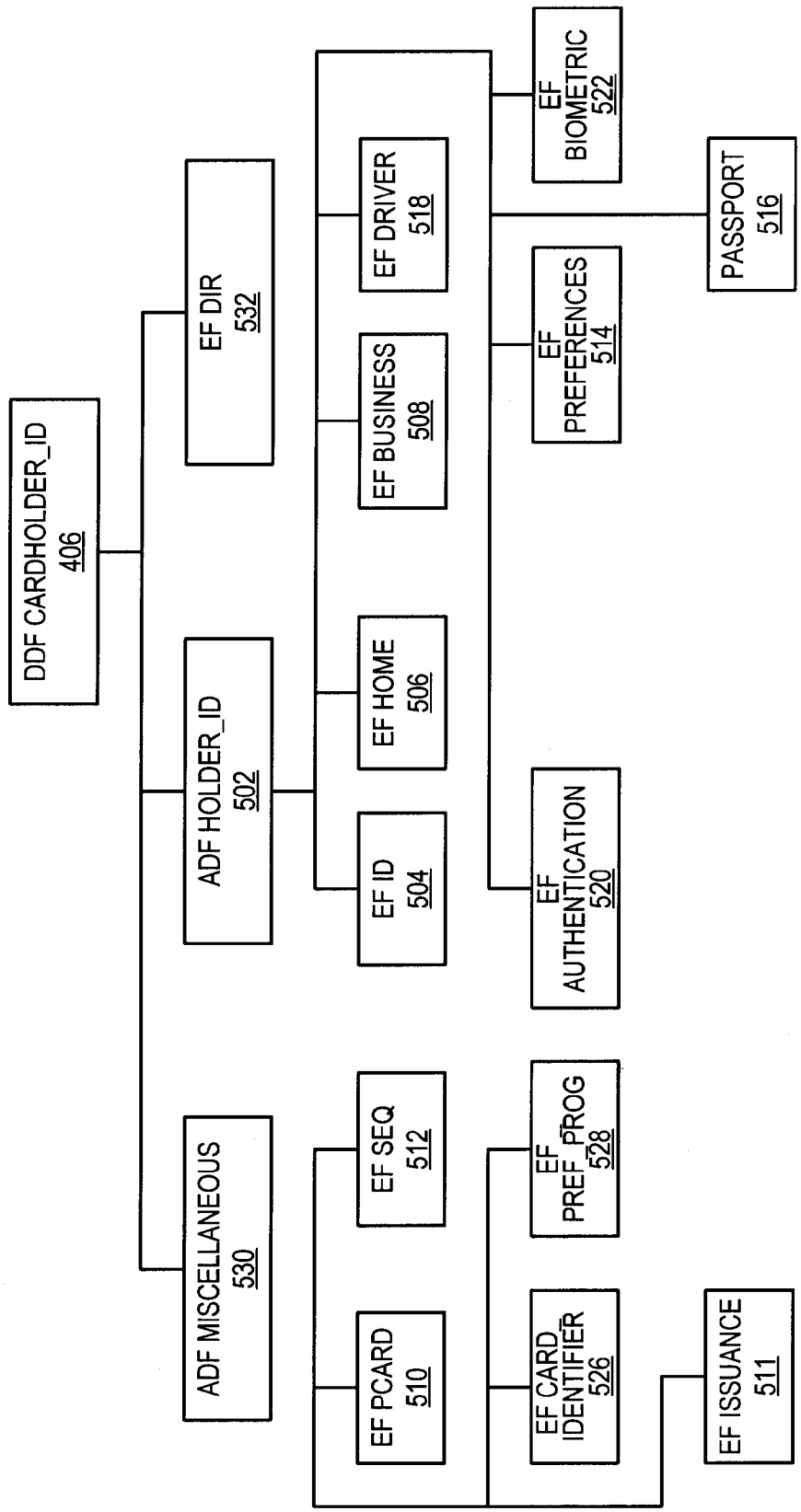
FIG. 5 sets forth an exemplary cardholder ID data structure in accordance with the present invention.

Referring now to FIG. 5, Cardholder ID application 406 may be used to store various information related to the cardholder. Portions of this information may be freely available to the partnering organizations, thereby preventing the storage of redundant information.

More particularly, cardholder ID application 406 preferably may comprise directory EF 532, holder_ID DF 502 and miscellaneous DF 530. Holder_ID DF 502 preferably may comprise ID EF 504, home EF 506, business EF 508, preferences EF 514, passport EF 516, authentication EF 520, biometric EF 522, and driver EF 518. Miscellaneous EF 530 preferably may comprise payment card EF 510, sequence EF 512, issuance EF 511, preferred programs EF 528, and card number EF 526. These files and their respective functions are discussed in detail below.

Directory EF 532 may provide a list of application identifiers and labels for the various high-level DF's existing under cardholder ID application 406. That is, this file serves the function of a high-level directory listing which specifies the location (i.e., FID) and application label for each DF in this case, holder_ID DF 502 and miscellaneous DF 530. In an exemplary embodiment, directory EF 532 may be structured in accordance with EMV 3.0 as shown in Table 4 below. In one embodiment, each major application (e.g., hotel, airline, etc.) has an associated directory file with a substantially same file structure.

TABLE 4

Exemplary cardholder ID directory EF

| Record description | External format | | Internal format (bytes) | |
|---|---|---|---|---|
| | Size | Type | Size | Type |
| Application ID for holder_ID DF | 16 | AN | 16 | ASCII |
| Application label | 16 | AN | 16 | ASCII |
| Application ID for miscellaneous DF | 16 | AN | 16 | ASCII |
| Application label | 16 | AN | 16 | ASCII |

ID EF 504 preferably may include personal information related to the cardholder, e.g., name, date of birth, emergency contact, general preferences, and the like. In an exemplary embodiment, member EF 504 may comprise the fields set forth in Table 5 below. Italicized field names indicate a subcategory within a particular field.

TABLE 5

Exemplary ID EF data structure

| | External format | | Internal format (bytes) | |
|---|---|---|---|---|
| | Size | Type | Size | Type |
| Record description | | | | |
| Last Name | 30 | AN | 30 | ASCII |
| First Name | 20 | AN | 20 | ASCII |
| Middle Name | 8 | AN | 8 | ASCII |

TABLE 5-continued

Exemplary ID EF data structure

| | External format | | Internal format (bytes) | |
|---|---|---|---|---|
| | Size | Type | Size | Type |
| Honorary Title | 8 | AN | 8 | ASCII |
| Name Suffix | 4 | AN | 4 | ASCII |
| Date of Birth | 8 | D | 4 | BCD |
| Social Security Number | 10 | AN | 10 | ASCII |
| Emergency Contact | | | | |
| Last Name | 20 | AN | 20 | ASCII |
| First Name | 10 | AN | 10 | ASCII |
| Relation | 1 | C | 1 | BIN |
| Phone | 20 | N | 10 | BCD |
| Gender | 1 | AN | 1 | ASCII |
| Special Personal Requirements | 12 | AN | 12 | M |
| Language Preference (ISO 639) | 2 | C | 2 | ASCII |

In the above table, and the tables to follow, both internal and external data formats may be listed. As the conservation of EEPROM space may be of paramount importance, the "internal" format of data (i.e., within EEPROM 212) may be different from the "external" format of the data (i.e., as read by the card reader at an access point 15). Thus, for example, a date field may consist of a four-byte BCD record within the card, but upon reading and processing by the terminal, this data may be converted to an eight-byte decimal value for more convenient processing.

Home EF 506 preferably may include data related to one or more of the cardholder's home addresses. In an exemplary embodiment, home EF 506 comprising the fields set forth in Table 6 below. The personal travel charge account pointer may be preferably used to designate an exemplary payment card, and may consists of a number corresponding to one of the payment card records within payment card EF 510 (detailed below).

TABLE 6

Exemplary home EF file structure

| Record description | External format | | Internal format (bytes) | |
|---|---|---|---|---|
| | Size | Type | Size | Type |
| Home Address 1 | 40 | AN | 40 | ASCII |
| Home Address 2 | 40 | AN | 40 | ASCII |
| Home Address City | 25 | AN | 25 | ASCII |
| Home Address State | 5 | AN | 5 | ASCII |
| Home Country (ISO 3166) | 2 | AN | 2 | ASCII |
| Home Address Zip Code | 10 | AN | 10 | ASCII |
| Home Address Telephone | 20 | N | 10 | BCD |
| Home Address FAX | 20 | N | 10 | BCD |
| Home E-mail address | 40 | AN | 40 | ASCII |
| Personal travel charge account number pointer | 2 | N | 1 | BCD |

Business EF 508 preferably may include various data related to the cardholder's business (i.e., addresses, phone numbers, and the like). In an exemplary embodiment, business EF 508 comprising the fields set forth in Table 7 below. In this regard, the credit card pointer field may be preferably used to point to a payment card record within payment card EF 510 (detailed below). The cost center, dept., division, and employee ID fields may be employer-specific, and may or may not apply in a given case.

TABLE 7

Exemplary business EF file structure

| Record description | External format Size | External format Type | Internal format (bytes) Size | Internal format (bytes) Type |
|---|---|---|---|---|
| Business Address 1 | 40 | AN | 40 | ACSII |
| Business Address 2 | 40 | AN | 40 | ASCII |
| Business Address City | 25 | AN | 25 | ASCII |
| Business Address State | 5 | AN | 5 | ASCII |
| Business Country (ISO 3166) | 2 | AN | 2 | ASCII |
| Business Address Zip Code | 10 | AN | 10 | ASCII |
| Business Telephone No. | 20 | N | 10 | BCD |
| Business Address Fax | 20 | N | 10 | BCD |
| Business E-mail Address | 40 | AN | 40 | ASCII |
| Professional Title | 10 | AN | 10 | ASCII |
| Employee ID | 10 | AN | 10 | ASCII |
| Division | 20 | AN | 20 | ASCII |
| Dept | 20 | AN | 20 | ASCII |
| Cost Center | 12 | AN | 12 | ASCII |
| Professional travel account number pointer | 2 | N | 2 | BCD |
| Professional license data | 20 | AN | 20 | ASCII |
| Credit Card pointer | 2 | N | 1 | BCD |
| Company Name | 20 | AN | 20 | ASCII |

Preferences EF 514 preferably may comprise data related to the cardholder's default personal preferences. In an exemplary embodiment, preferences EF 514 may include a field comprising an array of preferences as set forth in Table 8 below. Preference values may be preferably chosen from a list of preference tags as set forth in Table 39.

TABLE 8

Exemplary preferences EF file structure

| Record description | External format Size | External format Type | Internal format (bytes) Size | Internal format (bytes) Type |
|---|---|---|---|---|
| Preferences Array | 20 | C | 20 | C |

Passport EF 516 may be preferably used to store cardholder passport information. In an exemplary embodiment, passport EF 516 may comprise the fields set forth in Table 9 below.

TABLE 9

Exemplary passport EF file structure

| Record description | External format Size | External format Type | Internal format (bytes) Size | Internal format (bytes) Type |
|---|---|---|---|---|
| Passport Number | 20 | AN | 20 | ASCII |
| Passport Country - ISO 3166 | 2 | AN | 2 | ASCII |
| Issuance Date | 8 | D | 4 | BCD |
| City of Issuance | 20 | AN | 20 | AN |
| Expiration Date | 8 | D | 4 | BCD |
| Restrictions (glasses, disability, etc.) | 20 | AN | 20 | ASCII |

Driver EF 516 preferably may comprise cardholder driver license data. In an exemplary embodiment, driver EF 518 comprising the fields set forth in Table 10 below.

TABLE 10

Exemplary driver EF file structure

| Record description | External format Size | External format Type | Internal format (bytes) Size | Internal format (bytes) Type |
|---|---|---|---|---|
| Driver's License No. | 20 | a | 20 | ASCII |
| Driver's License Issuing State/Country | 2 | a | 2 | BCD |
| License Expiration Date | 8 | D | 4 | ASCII |
| License Type | 2 | C | 4 | BCD |

Biometric EF 522 may be used to store biometric data (preferably encoded) such as fingerprint data, retina scan data, or any other sufficiently unique indicia the cardholder's physical or behavioral characteristics. Information related to biometric data stored on biometric EF 522 is discussed in further detail below. In an exemplary embodiment, biometric EF 522 may comprise a single data string as set forth in Table 11 below.

TABLE 11

Exemplary biometric EF file structure

| Record description | External format Size | External format Type | Internal format(bytes) Size | Internal format(bytes) Type |
|---|---|---|---|---|
| Biometrics template | 100 | AN | 100 | BIN |

Authentication EF 520 preferably may comprise information for static authentication of the cardholder ID 406 application. This data may be unique for each card, and may be sufficiently complex such that counterfeit values cannot feasibly be created. This prevents creation of "new" counterfeit cards (i.e., cards with new authentication data), but does not prevent creation of multiple copies of the current card.

In an exemplary embodiment, authentication EF 520 may include public key certificate fields as shown in Table 12 below, wherein the external format may be identical to the internal format. Preferably, the issuer RSA key may be 640 bits long, and the CA key may be 768 bits long.

TABLE 12

Exemplary authentication EF

| Record description | Internal format(bytes) Size | Internal format(bytes) Type |
|---|---|---|
| Signed Static Application Data | 80 | B |
| Static Data Authentication Tag List | 16 | B |
| Issuer Public Key Certificate | 96 | B |
| Issuer Public Key Exponent | 1 | B |
| Issuer Public Key Remainder | 20 | B |

Turning now to files under miscellaneous DF 530, preferred programs EF 528 preferably may comprise data related to the cardholder's preferences as to airline companies, hotels, and rental car agencies. Specifically, this EF, in an exemplary embodiment, may comprise a plurality of records (e.g., three) indicating preferred companies for each type of travel partner as shown in Table 13. The actual data values conform to an arbitrary convention; That is, each airline, hotel, and rental car agency may be assigned an arbitrary three-byte code.

TABLE 13

Exemplary programs EF

| Record description | External format | | Internal format(bytes) | |
|---|---|---|---|---|
| | Size | Type | Size | Type |
| Preferred Airlines | 9 (3 × 3) | C | 9 | C |
| Preferred Hotels | 9 | C | 9 | C |
| Preferred Rental Cars | 9 | C | 9 | C |

Payment card EF 510 may be preferably used to catalog information related to the cardholder's various payment cards, i.e., debit cards, charge cards, and the like. In an exemplary embodiment, payment card EF may comprise card numbers and expiration dates for two cards as shown in Table 14. The "ISO" and "non-ISO" designations refer to ISO-7813, which specifies a particular payment card number format. Thus, in an exemplary embodiment, either an ISO or non-ISO card number scheme may be used. Moreover, it may be appreciated that this data set may be sufficient only for "card not present" transactions, for example, transactions taking place remotely where only the card number and expiration date may be required to effect a transaction. Data stored within payment system application 408 (described below) must be used to effect a "card present" transaction.

TABLE 14

Exemplary payment card EF file structure

| Record description | External format | | Internal format(bytes) | |
|---|---|---|---|---|
| | Size | Type | Size | Type |
| First Payment Card # (ISO) | 19 | N | 10 | BCD |
| First Payment Card Expiration Date | 8 | D | 4 | BCD |
| Second Payment Card # (non-ISO) | 20 | AN | 20 | ASCII |
| Second Payment Card Expiration Date | 8 | D | 4 | BCD |

Sequence EF 512 preferably may include information used to provide synchronization of the host and smartcard databases. In an exemplary embodiment, sequence EF 512 may comprise a plurality of records comprising the field set forth in Table 15 below. This number may be analogous to a "version" number for the data stored in the application.

TABLE 15

Exemplary sequence EF file structure

| Record description | External format | | Internal format(bytes) | |
|---|---|---|---|---|
| | Size | Type | Size | Type |
| Sequence Number | 16 | AN | 16 | ASCII |

Card number EF 526 may be used to record a unique number identifying the smartcard, and may also be used for key derivation (as described in further detail below). Preferably, card number EF 526 may comprise a eight-byte string as set forth in Table 16 below.

TABLE 16

Exemplary card number EF

| Record description | External format | | Internal format(bytes) | |
|---|---|---|---|---|
| | Size | Type | Size | Type |
| Card Number | 8 | HEX | 8 | HEX |

Issuance EF 511 may be used to record various details related to the manner in which the application (i.e., cardholder ID DF 406) was created. This file may include information related to the identity of the organization that created the application, as well as information related to the application itself. In an exemplary embodiment, issuance EF 511 may comprise fields as set forth in Table 17 below.

TABLE 17

Exemplary issuance EF file structure

| Field | External format | | Internal format(bytes) | |
|---|---|---|---|---|
| | Size | Type | Size | Type |
| Country Authority | | ISO 3166 | 2 | |
| Issuer Authority | 10 | RID - ISO 7816-5 | 5 | HEX |
| Application version | 5 | XX.YY | 2 | BCD |
| Application expiration date | 8 | YYYYMMDD | 4 | BCD |
| Application effective date | 8 | YYYYMMDD | 4 | BCD |
| Personalizer Code | 1 | AN | 1 | ASCII |
| Personalization Location | 1 | AN | 1 | ASCII |

The personalizer code field shown in Table 17 refers to the organization that actually "personalizes" the file. That is, before a smartcard may be issued to the cardholder, the database structure must be created within EEPROM 212 (FIG. 2), and the initial data values (i.e., default preferences, cardholder name, pin numbers, etc.) must be placed in the appropriate fields within the various EFs. It may be appreciated that, given the nature of the present invention, the smartcard "issuer" and "personalizer" for any given application may not be the same. Therefore, it may be advantageous to record various details of the personalization process within smartcard 100 itself. Similar issuance file structures may be provided for the other major applications. A method and system for personalization are described in greater detail herein.

Figure 6:
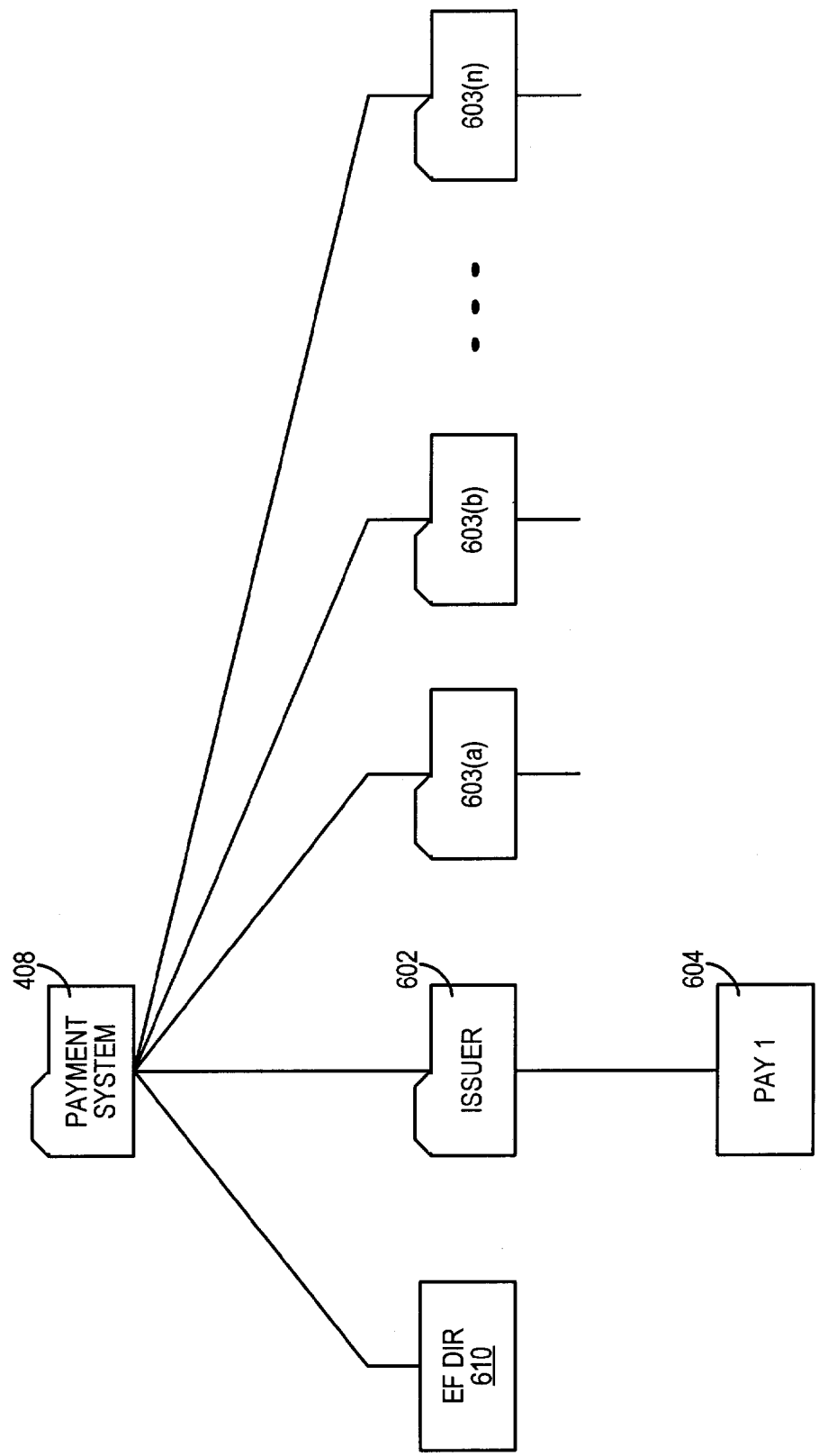
FIG. 6 sets forth an exemplary payment system data structure in accordance with the present invention.

Referring now to FIG. 6, payment system application 408 preferably may comprise a directory EF 610, issuer DF 602, and a number of optional DFs 603(*a*)-(*n*) for use by partnering financial organizations.

Directory EF 610 preferably may include a list of application identifiers and labels as described above in the context of cardholder ID application 406.

Issuer DF 602 may comprise pay1 DF 604, which may include data that would traditionally be stored within a track on a magnetic stripe card (i.e., debit cards, charge cards, and the like). Track 1 and Track 2 storage is described in greater detail above.

In an exemplary embodiment, pay1 DF 604 may comprise a plurality of records having commonly known magnetic-stripe fields as specified in Table 18 below.

TABLE 18

Exemplary Pay1 EF file structure

| Record description | External format | | Internal format(bytes) | |
|---|---|---|---|---|
|  | Size | Type | Size | Type |
| Format Code (Track 1) | 1 | AN | 1 | ASCII |
| PAN (Track 2) | 15 | N | 8 | BCDF right padding |
| Expiration date (Track 1 or 2) | 4 | YYMM | 2 | BCD |
| Effective date (Track 1 or 2) | 4 | YYMM | 2 | BCD |
| Discretionary data (Track 1 or 2) | 5 | N | 3 | BCDF right padding |
| Name (Track 1) | 26 | AN | 26 | ASCII, LJ blank padding |

Figure 7:
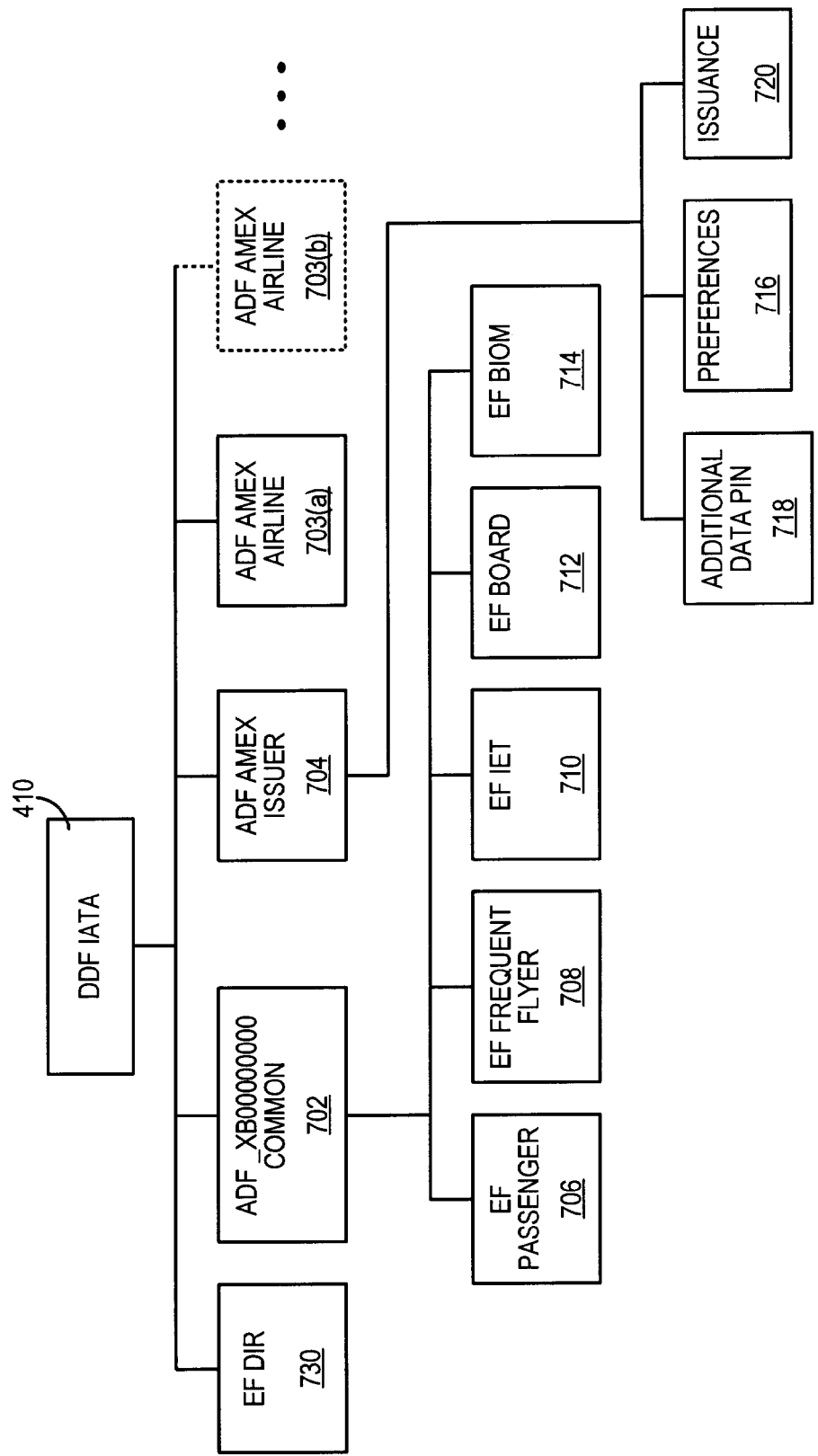
FIG. 7 sets forth an exemplary airline data structure in accordance with the present invention.

Referring now to FIG. 7, airline application 410 preferably may comprise directory EF 730, common DF 702, and issuer DF 704, and additional airline applications 703(*a*), 703(*b*), and so on.

Directory EF 730 preferably may include a list of application identifiers and labels as described above in the context of cardholder ID application 406.

Common DF 702 generally may include data accessible to all participating airlines, while issuer DF 704 generally may include data which may only be read or written to by the smartcard issuer. Airline application 410 preferably further may comprise at least one (preferably three) additional DF 703 for use by airline partnering organizations. That is, one airline partner may have access to and specify the structure of data stored within DF 703(*a*) (as well as common EF 702), while another airline may have similar access to DF 703(*b*). These partner DFs preferably conform to the relevant portions of the IATA specification.

Common DF 702 suitably may comprise common data which would be of use to any of the various partnering airlines, i.e., passenger EF 706, frequent flier EF 708, IET EF 710, boarding EF 712, and biometric EF 714.

Issuer DF 704, in contrast, may comprise information readable by all, but updateable only by the card issuer, i.e., preferences EF 716, PIN EF 718, and issuance EF 720.

Referring now to information stored within common EF 702, passenger EF 706 preferably may comprise various records related to the passenger as specified in Table 19 below.

TABLE 19

Exemplary passenger EF file structure

| Record description | External format | | Internal format(bytes) | |
|---|---|---|---|---|
|  | Size | Type | Size | Type |
| Passenger Name | 49 | AN | 49 | ASCII |
| Gender | 1 | A | 1 | BIN |
| Language Preference | 2 | AN | 2 | ASCII |
| Unique ID | 24 | AN | 24 | ASCII |

TABLE 19-continued

Exemplary passenger EF file structure

| Record description | External format | | Internal format(bytes) | |
|---|---|---|---|---|
|  | Size | Type | Size | Type |
| Airline ID (3 letters code) | 3 | AN | 3 | ASCII |
| Type code (2 letters) | 2 | AN | 2 | ASCII |
| Unique ID | 19 | AN | 19 | ASCII |
| Application version | 2 | N | 2 | BIN |

In an exemplary embodiment, frequent flyer EF 708 may comprise a plurality of frequent flier numbers (e.g., ten numbers) having the structure specified in Table 20 below.

TABLE 20

Exemplary frequent flyer EF file structure

| Record description | External format | | Internal format(bytes) | |
|---|---|---|---|---|
|  | Size | Type | Size | Type |
| Airline Customer ID | 22 | AN | 22 | ASCII |

IET EF 710 preferably may comprise a plurality of electronic ticket records as set forth in Table 21 below. The format of these electronic tickets preferably conforms to the IATA standard.

TABLE 21

Exemplary IET file structure

| Description of the Records | External format | | Internal format(bytes) | |
|---|---|---|---|---|
|  | Size | Type | Size | Type |
| IET 1 | 14 | AN | 14 | BIN |
| IET 2 | 14 | AN | 14 | BIN |
| IET 3 | 14 | AN | 14 | BIN |
| IET 4 | 14 | AN | 14 | BIN |
| IET 5 | 14 | AN | 14 | BIN |

In an exemplary embodiment, boarding EF 712 may comprise boarding data to be used during check in as specified in Table 22. The format of this data preferably conforms to the IATA specification.

TABLE 22

Exemplary boarding EF file structure

| Record description | External format | | Internal format(bytes) | |
|---|---|---|---|---|
|  | Size | Type | Size | Type |
| Boarding data | 40 | AN | 40 | ASCII |

Biometric EF 714 may be suitably used to store biometric data associated with the cardholder, e.g., retina scan data, fingerprint data, or any other sufficiently unique indicia of the cardholder's physical or behavioral characteristics. Information related to biometric data stored on biometric EF 522 is discussed in further detail below. In an exemplary embodiment, biometric EF 714 may comprise data as specified in Table 23 below.

TABLE 23

Exemplary biometric EF file structure

| Record description | External format | | Internal format(bytes) | |
|---|---|---|---|---|
| | Size | Type | Size | Type |
| Biometrics data | 100 | AN | 100 | BIN |

Issuance EF 720 may be suitably used to hold data related to the issuance of the various applications. In an exemplary embodiment, issuance EF 720 may comprise a data structure as specified in Table 24 below.

TABLE 24

Exemplary issuance EF file structure

| Field | External format | | Internal format(bytes) | |
|---|---|---|---|---|
| | Size | Type | Size | Type |
| Country Authority (2 letters) | | ISO 3166 | 2 | |
| Issuer Authority | 10 | RID - ISO 7816-5 | 5 | HEX |
| Application version | 5 | XX.YY | 2 | BCD |
| Application expiration date | 8 | YYYYMM DD | 4 | BCD |
| Application effective date | 8 | YYYYMM DD | 4 | BCD |
| Personalizer Code | 1 | AN | 1 | ASCII |
| Personalization Location (custom code) | 1 | AN | 1 | ASCII |

PIN EF 718 may be suitably used to store PIN values corresponding to each of the participating airline partners. In an exemplary embodiment, PIN EF 718 may comprise a plurality of records having the structure specified in Table 25 below, wherein each record may be related to the corresponding entry in frequent flyer EF 708 (i.e., record one in EF 718 corresponds to record one in EF 708, and so on.)

TABLE 25

Exemplary PIN EF file structure

| Record description | External format | | Internal format(bytes) | |
|---|---|---|---|---|
| | Size | Type | Size | Type |
| PIN | 8 | AN | 8 | BIN |
| Expiration date | 8 | D | 4 | BCD |

Preferences EF 716, in an exemplary embodiment, may comprise a preferences array as shown in Table 26 below. The preference values stored in this file correspond to those discussed below in conjunction with Table 38.

TABLE 26

Exemplary preferences EF 716 file structure

| Record description | External format | | Internal format(bytes) | |
|---|---|---|---|---|
| | Size | Type | Size | Type |
| Preferences Array | 8 | C | 8 | BIN |

Figure 8:
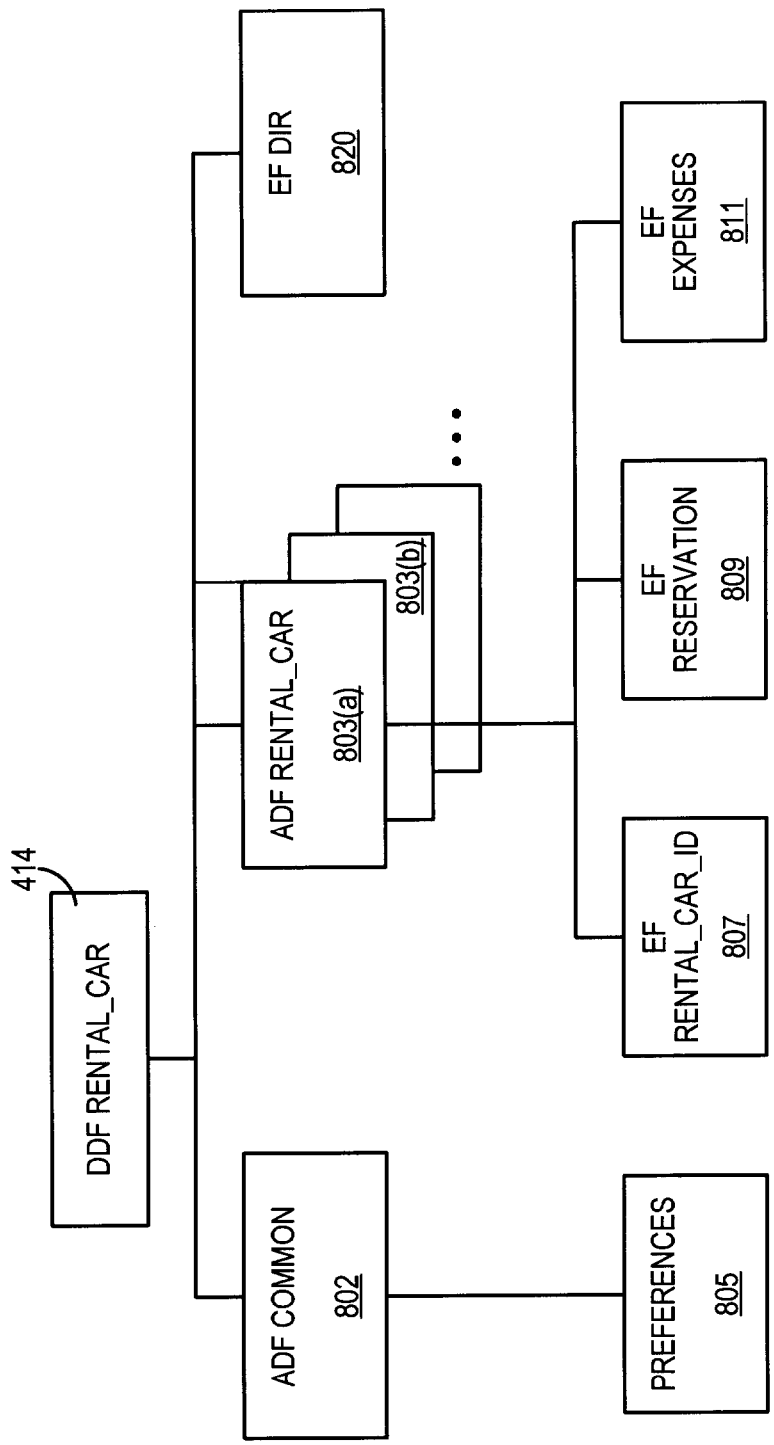
FIG. 8 sets forth an exemplary rental car data structure in accordance with the present invention.

Referring now to FIG. 8, rental car application 414 preferably may comprise common DF 802, directory EF 820, and one or more rental_car DFs 803 (i.e., 803(*a*), 803(*b*), and so on) corresponding to individual rental car agencies.

Common DF may comprise preferences EF 805, which is described in detail below. Rental_car DFs 803 each comprise a rental_car_id EF 807, reservation EF 809, and expenses EF 811.

Directory EF 820 may include a list of application identifiers and labels for the various DFs under rental_car application 414. The structure of this EF preferably conforms to that described above in the context of cardholder ID application 406.

In an exemplary embodiment, preferences EF 805 may comprise a set of preferences arrays file structure as shown in Table 27 below. An exemplary list of preference codes for use in each of these arrays are described below in conjunction with Table 38.

TABLE 27

Exemplary preferences EF

| Record description | External format | | Internal format(bytes) | |
|---|---|---|---|---|
| Preferences Array (Default) | 8 | C | 8 | BIN |
| Preferences Array (No. 2) | 8 | C | 8 | BIN |
| Preferences Array (No. 3) | 8 | C | 8 | BIN |
| Preferred limousine company | 12 | AN | 12 | ASCII |

Rental_car_id 807 may be used to store frequent rental information, upgrade information, insurance information, and the like. In an exemplary embodiment, rental_car_id 807 may comprise a file structure as shown in Table 28 below.

TABLE 28

Exemplary rental_car_id EF

| Record description | External format | | Internal format (bytes) | |
|---|---|---|---|---|
| Frequent Rental ID# | 22 | A | 22 | ASCII |
| Company name | 3 | A | 3 | ASCII |
| Unique Customer ID | 19 | A | 19 | ASCII |
| CDP (Contract Disc. Program) | 10 | A | 10 | ASCII |
| Accumulated points | 8 | N | 3 | BIN |
| Rental features | | AR | 2 | BIN |
| Car Type Upgrade | | B | 1 bit | B |
| Week-end/Vacation Special | | B | 1 bit | B |
| Guaranteed Late Reservation | | B | 1 bit | B |
| Insurance | | Array | 2 | BIN |
| Loss Damage Waiver (LDW) | | B | 1 bit | B |
| Personal Automobile Insurance | | B | 1 bit | B |
| Personal Effects Coverage | | B | 1 bit | B |
| Personal Insurance | | B | 1 bit | B |
| Corporate Insurance | | B | 1 bit | B |

Reservation EF 809 may be used to store confirmation numbers corresponding to one or more rental car reservations. In an exemplary embodiment, reservation EF 809 may comprise a plurality of records (e.g., two) having a file structure as shown in Table 29 below.

TABLE 29

Exemplary reservation EF

| Record description | External format | | Internal format(bytes) | |
|---|---|---|---|---|
| Rental Car Company | 3 | A | 3 | ASCII |
| Location | 3 | A | 3 | ASCII |
| Date | 8 | D | 4 | BCD |
| Time | 4 | T | 2 | BCD |
| Reservation Number | 15 | A | 15 | ASCII |
| Flight Number | 5 | M | 5 | BIN |
| Airlines | 3 | AN | 3 | ASCII(RJ) |
| Flight number | 4 | N | 2 | BCD |
| Preferred profile | 1 | C | 1 | ASCII |

Expenses EF 811 may be used to record expenses incurred by the cardholder during car rental (e.g., the total rental charge). In an exemplary embodiment, expenses EF 811 may comprise a plurality of records (e.g., five) having a file structure as shown in Table 30 below.

TABLE 30

Exemplary expenses EF

| Record description | External format | | Internal format(bytes) | |
|---|---|---|---|---|
| Type of expense | 1 | C | 1 | ASCII |
| Date | 8 | D | 4 | BCD |
| Location code | 3 | AN | 3 | ASCII |
| Amount | 7 | N | 3 | BIN |

Figure 9:
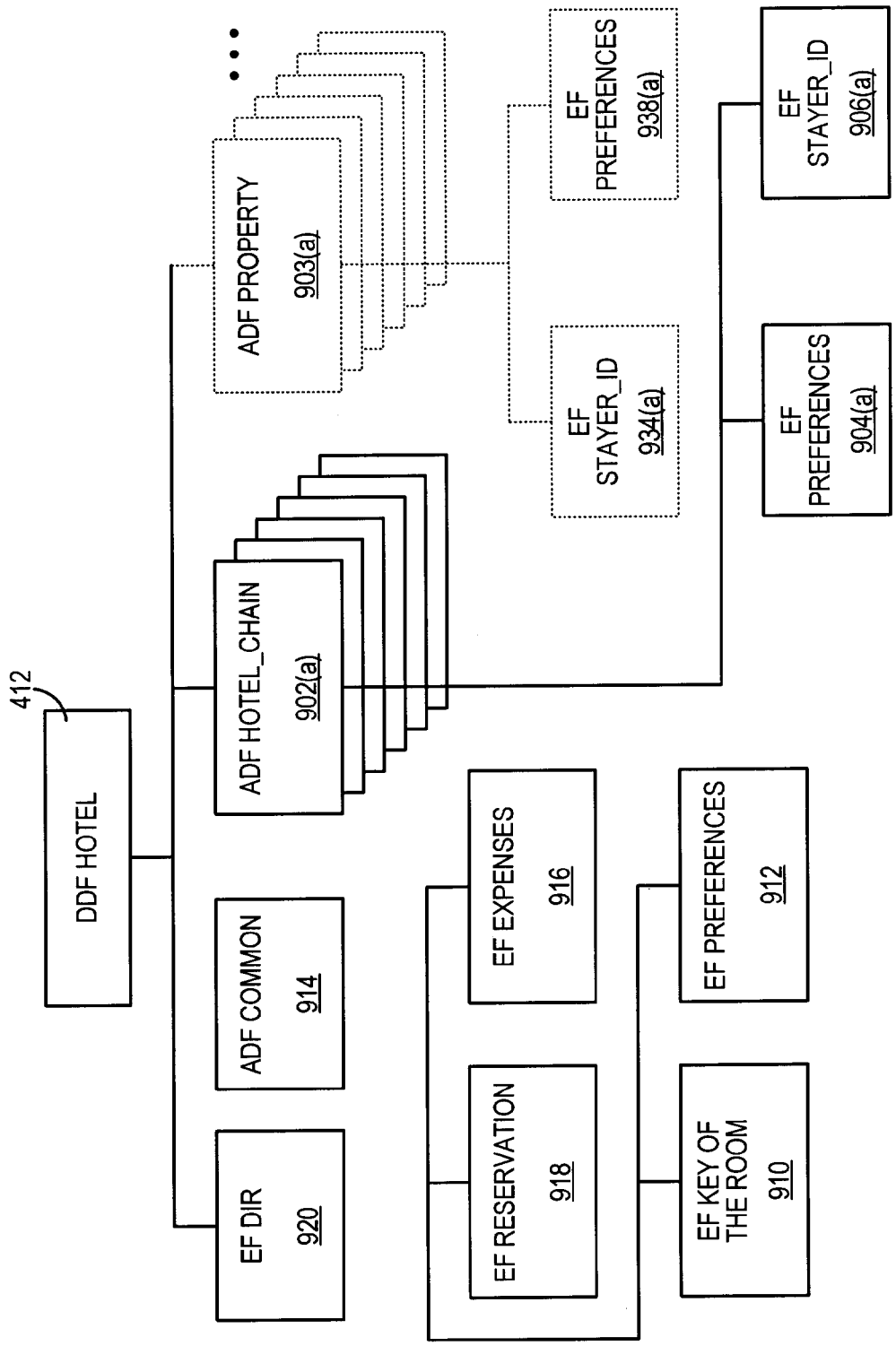
FIG. 9 sets forth an exemplary hotel system data structure in accordance with the present invention.

Referring now to FIG. 9, hotel system application 412 preferably may comprise directory EF 920, common DF 914, one or more hotel chain DFs 902, and one or more property DFs 903.

Common DF 914 may comprise reservation EF 918, expenses EF 916, key-of-the-room EF 910, and preferences EF 912.

Hotel chain EFs 902(a), 902(b), and so on, comprise preferences EF 904 and stayer ID EF 906 associated with individual hotel chains. In contrast, property EFs 903(a), 903(b), and so on, comprise a similar file structure associated with individual hotel properties (i.e., independent of whether the particular hotel may be a member of a nationwide chain).

In an exemplary embodiment, reservation EF 918 may comprise a plurality of records having the structure shown in Table 31 below. In general, this EF may be used to store confirmation numbers transmitted to smartcard 100 when the cardholder makes a reservation at a given hotel (designated in the property code field). The date field stores the date on which the confirmation number was dispensed.

TABLE 31

Exemplary reservation EF

| Record description | External format | | Internal format (bytes) | |
|---|---|---|---|---|
| | Size | Type | Size | Type |
| Property Code | 3 | AN | 3 | ASCII |
| Date | 8 | D | 4 | BCD |
| Confirmation Number | 15 | AN | 15 | ASCII |

Preferences EF 912 preferably may comprise three sets of array preferences. The particular codes used in these arrays are discussed below in conjunction with Table 38.

TABLE 32

Exemplary preferences EF

| Record description | External format | | Internal format (bytes) | |
|---|---|---|---|---|
| | Size | Type | Size | Type |
| Preferences Array (default) | 8 | C | 8 | BIN |
| Preferences Array (number 2) | 8 | C | 8 | BIN |
| Preferences Array (number 3) | 8 | C | 8 | BIN |

Expenses EF 916 preferably may comprise a list of recent hotel expenses, for example, room costs, dinner expenses, and the like. In an exemplary embodiment, expenses EF 916 may comprise a plurality of records (for example, fifteen) arranged in a cyclic file structure and comprising the fields shown in Table 33 below. Thus, the cardholder may be able to examine and print a list of recently incurred expenses by type (a code fixed by convention), date, amount, and property code.

TABLE 33

Exemplary expenses EF

| Record description | External format | | Internal format (bytes) | |
|---|---|---|---|---|
| | Size | Type | Size | Type |
| Type | 1 | C | 1 | ASCII |
| Date | 8 | D | 4 | BCD |
| Property Code | 3 | AN | 3 | ASCII |
| Amount | 7 | N | 3 | BIN |

Key-of-the-room EF 910 preferably may comprise electronic key values that may be used in conjunction with card readers to provide access to particular hotel rooms. In an exemplary embodiment, key-of-the-room EF 910 may comprise a plurality of alphanumeric key values as shown in Table 34 below.

TABLE 34

Exemplary key-of-the-room EF

| Record description | External format | | Internal format (bytes) | |
|---|---|---|---|---|
| | Size | Type | Size | Type |
| Key value | 40 | AN | 40 | BIN |

Stayer ID EF 906 preferably may comprise frequent stayer data for a particular hotel chain. In an exemplary embodiment, Stayer ID EF 906 may comprise frequent stayer information as shown in Table 35 below.

TABLE 35

Exemplary stayer ID EF

| Record description | External format | | Internal format (bytes) | |
|---|---|---|---|---|
| | Size | Type | Size | Type |
| Frequent stayer number | 19 | AN | 19 | ASCII |
| Frequent Stayer Level Code | 1 | AN | 1 | ASCII |
| Frequent Stayer Level Expiration Date | 6 | YYYYMM | 3 | BCD |
| CDP | 10 | AN | 10 | ASCII |
| Event Counter | 3 | N | 1 | BIN |
| Hotel Frequent Stayer PIN | 8 | AN | 8 | BIN |

Preferences EF 904 preferably may comprise three sets of array preferences as shown in Table 36. The particular codes used in these arrays are discussed below in conjunction with Table 38.

TABLE 36

Exemplary preferences EF

| Record description | External format | | Internal format (bytes) | |
|---|---|---|---|---|
| | Size | Type | Size | Type |
| Preferences Array (default) | 8 | C | 8 | BIN |
| Preferences Array (number 2) | 8 | C | 8 | BIN |
| Preferences Array (number 3) | 8 | C | 8 | BIN |

Property DFs 903(*a*), 903(*b*), etc., may be used in cases where the partnering hotel may be not part of a major chain, or when the hotel chooses to employ its own data set independent of its affiliation. In one embodiment, these property DFs may be identical in structure to hotel chain DFs 902, except that much of the frequent stayer ID information may be removed. More specifically, a typical property DF 903 may comprise a preferences EF 938 identical to preferences 904 described above, along with a stayer ID EF 934 which may include only the CDP, event counter, and hotel frequent stayer PIN fields described in conjunction with Table 33 above. Alternatively, a particular hotel chain or property may choose to implement a different file structure than that described above.

As mentioned briefly above, an exemplary embodiment may be configured such that preferences may be located in several files distributed throughout smartcard 100; i.e., in preferences EF 514, airline preferences EF 716, hotel preferences EF 912 and 904, and car preferences EF 810. This allows apparently conflicting preferences to coexist within the card depending on context. For example, it may be possible to opt for non-smoking in the cardholder ID application while choosing the smoking option within the hotel application. In the case of conflict, preferences may be read from the top level to the bottom level, and each level supersedes the previous one.

An exemplary set of codification rules may be set forth in Table 37 below:

TABLE 37

Exemplary Preferences Code Ranges

| 0-49 | General purpose (Cardholder ID 406) |
|---|---|
| 50-99 | Hotel application 412 |
| 100-149 | Rental car application 414 |
| 150-199 | Airline application 410 |
| 200-255 | Other |

More specifically, in an exemplary embodiment, preference flags may be coded as set forth in Table 38 below.

TABLE 38

Exemplary preference codes

| Preference | Code (decimal) |
|---|---|
| GENERAL PURPOSE | |
| Smoking | 00 |
| Non-smoking | 01 |
| Home as preferred address | 02 |
| Work as preferred address | 03 |
| Handicapped | 04 |
| Home as preferred e-mail address | 05 |
| Work as preferred e-mail address | 06 |
| HOTEL PREFERENCES | |
| King-size bed | 50 |
| Queen-size bed | 51 |
| Double bed | 52 |
| High floor room | 53 |
| Low floor room | 54 |
| Near elevator room | 55 |
| Away from elevator room | 56 |
| RENTAL CAR PREFERENCES | |
| Compact car | 100 |
| Standard car | 101 |
| Mid-size car | 102 |
| Luxury car | 103 |
| AIRLINE PREFERENCES | |
| Window seat preferred | 150 |
| Aisle seat preferred | 151 |
| Low calorie | 152 |
| Vegetarian | 153 |
| Diabetic | 154 |
| Low sodium | 155 |
| Kosher | 156 |

In the context of smartcard transactions, data security has five primary dimensions: 1) data confidentiality, 2) data integrity, 3) access control, 4) authentication, and 5) non-repudiation. Each of these dimensions may be addressed through a variety of security mechanisms. Data confidentiality, which deals with keeping information secret (i.e., unreadable to those without access to a key), may be substantially ensured using encryption technology. Data integrity (and data source verification) focuses on ensuring that data remains unchanged during transfer, and typically may employ message authentication techniques. Access control involves card holder verification and other requirements necessary in order for a party to read or update a particular file. Authentication involves ensuring that the card and/or the external device may be what it purports to be, and non-repudiation deals with the related task of ensuring that the source of the data or message may be authentic, i.e., that a consumer may not repudiate a transaction by claiming that it was "signed" by an unauthorized party. Cardholder verification using a biometric security system is described in greater detail below.

Authentication may be preferably performed using a "challenge/response" algorithm. In general, authentication through a challenge/response system involves: 1) generation of a random number by a first party; 2) transmission of the random number to a second party (the "challenge", 3) encryption of the random number by the second party in accordance with a key known to both parties, 4) transmission of the encrypted random number to the first party (the "response"), 5) encryption of the random number by the first party, and 6) comparison by the first party of the two resulting numbers. In the case where the two numbers match, authentication may be successful; if not, the authentication may be unsuccessful. Note that authentication may work both ways: the external world may request authentication of a smartcard (internal authentication), and a smartcard may request authentication of the external world (external authentication) a more detailed account of an exemplary challenge/response algorithm may be found in the IBM MFC specification.

In an exemplary embodiment, the DES algorithm (Data Encryption Standard) may be employed for the various security functions; however, it may be appreciated that any number of other symmetrical or asymmetrical techniques may be used in the context of the present invention. More particularly, there may be two general categories of encryption algorithms: symmetric and asymmetric. Symmetric algorithms use the same key for encryption and decryption, for example, DEA (data encryption algorithm) which uses a 56-bit key to encrypt 64-bit blocks of data. Asymmetric algorithms, in contrast, use two different keys: one secret key and one public key. The RSA algorithm, for example, uses two such keys and exploits the computational complexity of factoring very large prime numbers. Additional information these and other cryptographic principles may be found in a number of standard texts, for example: Seberry & Pieprzyk, "Cryptography: An Introduction to Computer Security" (1989); Rhee, "Cryptography and Secure Communications" (1994); Stinson, "Cryptography: Theory and Practice" (1995); "Contemporary Cryptography: The Science of Information Integrity" (1992); and Schneier, "Applied Cryptography" (2d ed. 1996), the contents of which are hereby incorporated by reference.

Access control may be suitably provided by including access conditions within the header of each EF and DF. This prevents a particular operation (e.g., reading or updating) from being performed on a file unless the required access conditions have been fulfilled. Many different access conditions may be appropriate in a smart card context. For example, the smartcard may require cardholder verification (i.e., request that the cardholder enter a PIN) before a file operation may be allowed. Similarly, internal and/or external authentication as described above may be required.

Another important access condition (referred to herein as the SIGN condition) corresponds to the case where a particular file may be "protected" and where updating of a record requires "signing" of the data using a message authentication code (MAC). A MAC may be thought of as a form of electronic seal used to authenticate the content of the message. In a paradigmatic signing procedure, a shortened, encrypted representation of the message (the MAC) may be created using a message authentication algorithm (MAA) in conjunction with a key known to both the card and external device. The MAC may be then appended onto the message and sent to the card (or external device, depending on context), and the card itself generates a MAC based on the received message and the known key. The card then compares the received MAC with the its own internally-generated MAC. If either the message or MAC was altered during transmission, or the sending party did not use the correct key, then the two MACs may not match, and the access condition may not be fulfilled. If the two MACs correspond, then the access condition may be fulfilled, and the particular file operation may proceed.

A MAC may be generated using a variety of MAAs, for example, the ANSI X9.9 method using an eight-byte key, or the ANSI X9.19 method using a sixteen-byte key. Furthermore, the actual key may be "diversified" through encryption with a random number or other appropriate value. These and other details regarding MAC generation may be found in the references cited above as well as the IBM MFC specification.

Two other important access conditions may be the NEVER and FREE conditions. The NEVER condition corresponds to the case where a certain file operation (typically updating) may be never allowed. The FREE condition, on the other hand, corresponds to the case where either updating or reading a file record may be always allowed, without any additional preconditions for access.

In contrast to the MAC techniques discussed briefly above, non-repudiation may be necessarily performed using asymmetrical techniques. That is, as symmetrical techniques such as MAC "sealing" use a key known to more than one party, such techniques may not be used by a third-party to ascertain whether the source of the message may be correct. Thus, non-repudiation typically may employ a public key encryption scheme (e.g., the Zimmerman's PGP system), wherein the sender uses a secret key to "sign" the message, and the receiving party uses the corresponding public key to authenticate the signature. In the context of the present invention, this function may be suitably performed by allocating an EF for public and secret key rings, which may be well known in the art, along with suitable encryption software resident in the card for assembling the signed message.

Having thus given a brief overview of typical smartcard security procedures, an exemplary set of access conditions may be set forth below in Table 39. In this regard, the various access conditions for each EF may be tabulated with regard to whether the file may be being read or updated. In each case, the access condition (FREE, SIGN, etc.), key "owner" (issuer, partner, user, etc.), and key name may be listed. In this regard, it may be appreciated that the key name may be arbitrary, and may be listed here for the sake of completeness.

TABLE 39

Exemplary access conditions

| | READING | | | UPDATING | | |
|---|---|---|---|---|---|---|
| | Access condition | Owner | Key | Access condition | Owner | Key |
| MF | | | | | | |
| DF Cardholder ID 406 | | | | | | |
| DF Holder_ID 502 | | | | | | |
| EF ID 504 | FREE | | | SIGN | ISSUER | KEY1 |
| EF Home 506 | FREE | | | SIGN | ISSUER | KEY1 |

TABLE 39-continued

| | Exemplary access conditions | | | | | |
|---|---|---|---|---|---|---|
| | READING | | | UPDATING | | |
| | Access condition | Owner | Key | Access condition | Owner | Key |
| EF Business 508 | FREE | | | SIGN | ISSUER | KEY1 |
| EF Preferences 514 | FREE | | | SIGN | ISSUER | KEY1 |
| EF Passport 516 | FREE | | | SIGN | ISSUER | KEY1 |
| EF Biometrics 522 | FREE | | | SIGN | ISSUER | KEY1 |
| EF Driver 518 | FREE | | | SIGN | ISSUER | KEY1 |
| DF Miscellaneous | | | | | | |
| EF Payment card 510 | FREE | | | SIGN | ISSUER | KEY1 |
| EF Sequence 512 | FREE | | | FREE | | |
| EF Card Number 526 | FREE | | | SIGN | ISSUER | KEY1 |
| DF Payment System 408 | | | | | | |
| DF Issuer 602 | | | | | | |
| EF Pay1 604 | FREE | | | FREE | | |
| DF Airline 410 | | | | | | |
| DF Common 702 | | | | | | |
| EF Passenger 706 | FREE | | | SIGN | ISSUER | KEY2 |
| EF Frequent flier 708 | FREE | | | SIGN | ISSUER | KEY2 |
| EF IET 710 | FREE | | | FREE | | |
| EF Boarding 712 | FREE | | | FREE | | |
| EF Biometric 714 | FREE | | | FREE | | |
| DF Issuer 704 | | | | | | |
| EF Preferences 716 | FREE | | | SIGN | ISSUER | KEY2 |
| EF PIN 718 | FREE | | | SIGN | ISSUER | KEY2 |
| EF Issuance 720 | FREE | | | SIGN | ISSUER | KEY2 |
| DF Rental car 414 | | | | | | |
| DF Common 802 | | | | | | |
| EF Preferences 805 | FREE | | | USER | IDENT | PIN |
| DF Rental_car 803 | | | | | | |
| EF Rental_car_ID 807 | FREE | | | SIGN | RENTCAR | KEY6 |
| EF Reservation 809 | FREE | | | FREE | | |
| EF Expenses 811 | FREE | | | SIGN (append) IDENT (erase) | RENTCAR (append) USER (erase) | KEY6 (append) PIN (erase) |
| DF Hotel system 412 | | | | | | |
| DF Common 914 | | | | | | |
| EF Reservation 918 | FREE | | | FREE | | |
| EF Expenses 916 | FREE | | | FREE (append) IDENT (erase) | USER (erase) | PIN (erase) |
| EF Key-of-the-room 910 | FREE | | | FREE | | |
| EF Preferences 912 | FREE | | | SIGN | ISSUER | KEY1 |
| DF Hotel_chain 902 | | | | | | |
| EF Preferences 904 | FREE | | | SIGN | ISSUER | KEY1 |
| EF Stayer ID 906 | FREE | | | SIGN | HOTEL | KEY5 |

Having thus given a detailed description of an exemplary smartcard 100 and an exemplary data structure 400, the various details related to transactions involving smartcard 100 may now be described. In general, a typical smartcard session involves: (1) activation of the contacts (or comparable non-contact means); (2) card reset; (3) Answer to reset (ATR) by card; (4) Information exchange between card and host; and, at the conclusion of a session, (5) deactivation of contacts.

First, card 100 may communicate with a card reader provided at an access point 15, and suitable connections may be made between communication region 108 on card 100 and the card reader. By "may communicate," a user may swipe card 100, insert card 100 into access point 15 and/or a reader associated with access point 15, and interact with access point 15 via communication region 108 by any suitable communication channels, such as, for example, a telephone network, an extranet, an intranet, Internet, point of interaction device, online communications, off-line communications, wireless communications, transponder communications, local area network (LAN), wide area network (WAN), networked or linked devices and/or the like. Communication may entail the use of one or more biometric security systems described in greater detail herein.

In an exemplary embodiment, physical contacts (contacts 106 in FIG. 1) may be used, and DATA, CLOCK, RESET, VDD, and GND connections may be made. These contacts may be electrically activated in a particular sequence, preferably in accordance with ISO 7816-3 (RST to low state, VDD powered, DATA to reception mode, then CLK applied).

The card reader then initiates a reset (i.e., RST to high state), and the card returns an answer to reset string (ATR) on the DATA line, preferably in conformance with the content and timing details specified in the appropriate parts of ISO 7816. In an exemplary embodiment, the interface characters may be chosen to reflect a T=1 protocol (asynchronous, half-duplex, block-oriented mode). Further in accordance with ISO-7816-3, after the card sends an ATR string and the proper protocol may be selected (in an exemplary embodiment, the T=1 mode), host 314 and card 100 begin the exchange of commands and responses that comprise a particular transaction. The nature of these commands is discussed in further detail below.

At the end of a smartcard session, contacts 106 may be deactivated. Deactivation of contacts 106 may be preferably performed in the order specified in ISO 7816-3 (i.e., RST to low state, CLK to low state, DATA to low state, VDD to inactive state). As mentioned above, the VPP contact may be not utilized in an exemplary embodiment.

In the context of the present invention, command classes and instructions may be provided for 1) working with application data (i.e., files stored within the various applications), 2) ensuring data security, 3) card management, and 4) performing miscellaneous functions.

Application data commands may be suitably directed at selecting, reading, and updating individual records or groups of records within files. Security commands may suitably include commands for performing the challenge/response authentication process, generating random numbers, loading or updating cryptographic keys, and changing and verifying the card-holder verification codes (CHV1 and CHV2). Card management commands may suitably include commands which allow for the creation and deletion of directories (DFs) and elementary files (EFs). Miscellaneous commands may be suitably provided for modifying the baud rate and reading various card statistics (e.g., data logged during production of the card.) It may be appreciated that many different command sets could be designed for implementing these basic functions. One such command set may be provided by the IBM Multifunction Card Operating System 3.51, hereby incorporated by reference.

Referring again to FIG. 10, access point 15 preferably may comprise software which may provide a user interface (for example, a graphical user interface) and may be capable of executing the appropriate SCOS commands in accordance with the particular transaction being effected. For example, consider the case where a cardholder wishes to add a preference in car preferences EF 810 within rental car application 414 (shown in FIG. 8). In this instance, a cardholder would locate a convenient access point 15 (for example, a stand-alone kiosk in a mall) and insert card 100 in a provided card reader in order to initiate a transaction. After suitable handshaking between card 100 and the card reader has taken place, and after the cardholder has been properly authenticated (i.e., the correct access conditions for updating car preferences EF 810 have been fulfilled), the application program at access point 15 queries the user with a choice of preference codes (for example, those listed in Table 39 above). The user then indicates a choice through textual or graphical means, and the appropriate value may be sent to card 100 by the application program as part of a command string. This value may then be sent to the appropriate partnering organization 12 (i.e., a rental car partner) and issuer 10 over network 19 to be stored in their respective databases 13 and 11. Alternatively, this data may be sent later as part of a card/database synchronization procedure, e.g., when the original transaction proceeds off-line.

Consider, as another example, the typical hotel transaction. As detailed above, the cardholder inserts card 100 into a card reader deployed at a suitable access point 15. After appropriate initialization procedures take place, the cardholder may be presented, through the use of a graphical user interface, the option to make a hotel reservation. Upon choosing this option, the software may interrogate the hotel preferences field in exemplary programs EF 524 in cardholder ID application 406 and display these hotels first within the list of possible choices.

After the cardholder selects a specific hotel property, the software contacts the appropriate partner 12 over network 19 and requests a hotel room for a particular set of dates. This step may involve an interrogation of the various files within hotel system application 412 to which the particular hotel has access (i.e., a hotel chain DF 902 or property DF 903), or this step may be deferred until check-in (as described below).

Once a reservation has been made, the associated confirmation number supplied by the hotel may be downloaded into the confirmation number field in reservation EF 918 along with the date and the property code of the hotel. This step may require the cardholder to transmit appropriate credit card information, which may be suitably retrieved from pay1 EF 604.

Upon arrival at the hotel, the cardholder may use smartcard 100 to access a kiosk or other convenient access point provided for check-in. Thus, check-in may take place unassisted by hotel personnel, or may involve a more traditional person-to-person interaction where card 100 may be used primarily to streamline the check-in process initiated by personnel at the front desk.

At check-in, the confirmation number information may be retrieved from reservation EF 918, and a particular room may be assigned (if not assigned previously). This step may typically involve retrieving, from the appropriate preference file (i.e., preferences EF 904 or 912), a list of preferences regarding bed size, room type, and the like. This list may be matched against the hotel's database of available rooms, thereby helping to streamline the room assignment process.

Once a room may be assigned, a digital key corresponding to the assigned room (e.g., a numeric value or alphanumeric string) may be stored in key-of-the-room EF 910. Card readers may be then employed as part of the door lock apparatus for each room, which may be configured to open only upon receiving the correct key.

At check-out time, payment may take place using payment card information stored in payment card EF 510 and pay1 EF 604. Again, a suitable smartcard reader (i.e., a reader configured with access point 15), may be provided in any location convenient for check out, e.g., the hotel lobby or within the individual hotel rooms themselves. The cardholder may then acquire frequent stayer points, which would involve updating one of the stayer ID EFs 906 (or 936). During the course of his stay at the hotel, the cardholder may have incurred any number of expenses related to room-service, on-site dining, film viewing, and the like. These expenses, or a subset thereof, may be conveniently downloaded into expenses EF 916 for later retrieval, printout, or archiving.

Use of card 100 in a rental car context would necessarily involve many of the same steps described above. The task of assigning a car would involve retrieving car preferences stored within preferences EF 805 and comparing them to a database of available automobiles. Upon returning the automobile, the cardholder may then be awarded frequent rental points (through update of frequent renter EF 807), and an expense record may be stored within expenses EF 811.

In the airline context, card 100 could be used to make reservations, record preferences, and provide a payment means as described above. In addition, electronic tickets may be downloaded (EF IET 710), and boarding information may be supplied via boarding EF 712. Frequent flyer EF 708 may then be used to update the cardholder's frequent flyer miles.

The system in accordance with various aspects of the present invention may include methods and apparatus for personalizing and dynamically synchronizing smartcards and associated databases in the context of a distributed transaction system. More particularly, referring now to FIG. 11, an exemplary dynamic synchronization system (DSS) preferably may comprise a secure support client server 1104, a card object database update system 1106 (CODUS), one or more enterprise data synchronization may interface 1108 (EDSI), an update logic system 1110, one or more enterprise data collection units 1112 (EDCUs), and one or more smartcard access points 15 configured to interoperably accept and interface with smartcards 100. In an exemplary embodiment, DSS also suitably may comprise a personalization system 1140 and an account maintenance system 1142 configured to communicate with CODUS 1106.

More particularly, in an exemplary embodiment, secure support client server 1104 may be connected over a suitable network to EDSIs 1108 through enterprise network 1114. EDSIs 1108 may be linked to update logic system 1110, which itself may be linked to enterprise data collection units 1112. Enterprise data collection units 1112 may be linked to CODUS 1106 and secure support client server 1104. In general, as described in further detail below, each enterprise (e.g., airline partner, hotel partner, travel agency, etc.) may be preferably associated with a corresponding EDSI 1108, enterprise network 1114, and EDCU 1112. That is, EDCU 1112(*a*) corresponds to EDSI 1108 (*a*) and enterprise network 1114(*a*), EDCU 1112(*b*) corresponds to EDSI 1108 (*b*) and enterprise network 1114(*b*), and so on. The DSS may include an arbitrary number of such functional blocks in accordance with the number of enterprises represented.

Personalization system 1140 may suitably function as the issuing source of smartcards 100. That is, personalization system 1140 may create and issue smartcards for use by the consumer by providing a predetermined file structure populated with initialization data (e.g., account numbers, serial numbers, smartcard identifiers, default preferences, and the like). In this regard, CODUS 1106 may interface with personalization system 1140 in order to facilitate reissuance of the card by providing updated data in the event a card may be destroyed, lost, or stolen. Personalization system 1140 is described in detail below in conjunction with FIG. 19.

Account maintenance system 1142 may be provided for customer service purposes and, in this capacity, acts as the point of entry for cardholder complaints, questions, and other customer input. CODUS 1106 suitably may communicate with account maintenance system 1142 in order to assist customer service representatives and/or automated systems in addressing cardholder issues.

Enterprise network 1114 may be configured similarly to network 19 described above. Those skilled in the art will appreciate that a variety of hardware systems are suitable for implementing the present invention. Various modems, routers, CPU's, monitors, back-up systems, power-supplies, and peripherals may be employed to realize the benefits of the present system. In one embodiment, for example, a Compaq Prolinea computer operating in an OS/2 environment using IBM MQ Server software is used to implement secure support client server 1108, wherein the various access points comprise stand-alone smartcard kiosks, an EDCU 1112 and CODUS 1116 is then implemented on a Compaq Prolinea computer operating in a Windows/NT environment running a suitable database software package.

Secure support client server 1104 may provide, where appropriate, any functionality missing from the individual access point 15 used during a transaction. Server 1104 also may suitably handle routing of messages from access points 15 to the appropriate EDSI 1108 and/or EDCU 1112.

Figure 11:
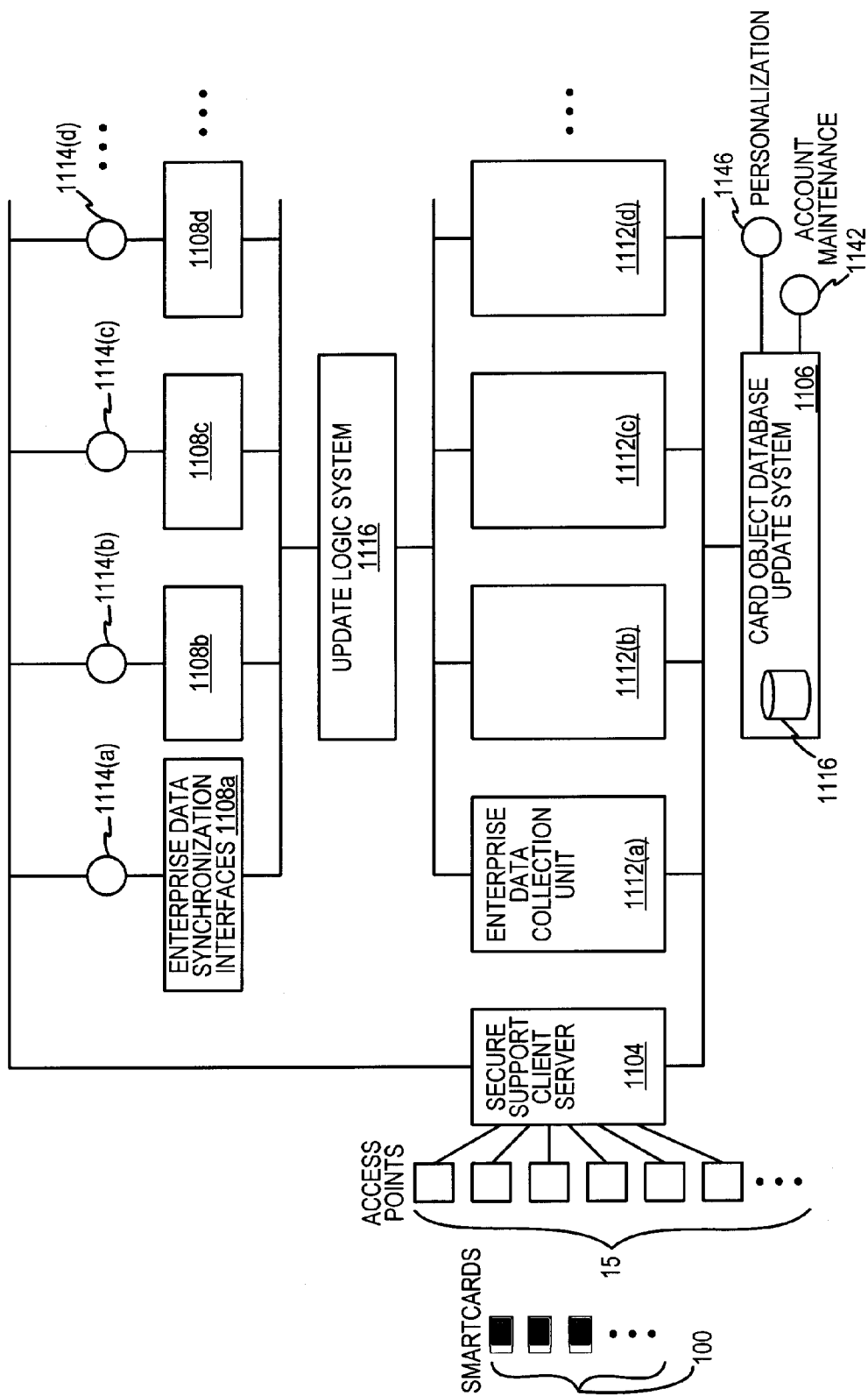
FIG. 11 is a schematic overview of an exemplary dynamic synchronization system in accordance with various aspects of the present invention.

Referring now to FIGS. 11 and 12, an exemplary secure support client server 1104 may comprise a security engine 1202, a supplemental application support 1204, and a router 1206. Security engine 1202 may comprise suitable hardware and/or software to provide secure messaging between server 1104, EDSUs 1112, and enterprise network 1114. More specifically, security engine 1202 may utilize authentication, data encryption, and digital signature techniques in connection with incoming and outgoing message packets. A variety of conventional security algorithms may be suitable in the context of the present invention, including, for example, DES encryption, RSA authentication, and a variety of other symmetrical and non-symmetrical cryptographic techniques.

Supplemental application support 1204 preferably may comprise suitable hardware and/or software components related to a specific access point 15 functionality. More particularly, server 1104 may suitably determine the nature of access point 15 utilized during a transaction. If access point 15 does not include the appropriate software for effecting the requested transaction, then server 1104 supplies the functionality (i.e., software modules) which completes the transaction with respective EDSIs 1108 and/or EDCUs 1112. The supplemental functionality may include, inter alia, software modules for properly formatting message packets (described in further detail below) sent out over the various networks comprising the DSS. For example, where a transaction takes place via an access point 15 which may consists entirely of a stand-alone smartcard reader 2500, then nearly all functionality may be supplied by server 1104 because the smartcard reader, by itself, may be only capable of transferring messages to and from smartcard 100 in a "dumb" manner. However, when a suitably configured PC may be included for access point 15, most necessary functionality may be supplied by various software modules residing in the PC. In such a case, server 1104 may need only transfer the various message packets to and from access point 15 without supplying additional software. Added functionality may be supplied through any suitable method, for example, through the use of portable software code (e.g., Java, ActiveX, and the like), or distributed software residing within access points 15, cards 100, and/or server 1104.

Router 1206 may suitably handle routing of messages to the appropriate EDCUs 1112, enterprise network 1114, and access points 15. That is, router 1206 may be configured to identify the appropriate functional blocks within the DSS to which a given message packet should be sent. The identification of the appropriate functional blocks may take place in a number of ways. In an exemplary embodiment, the identification may be accomplished through the use of a look-up table comprising a list of appropriate destinations keyed to information extracted from requests received from access points 15.

In an alternate embodiment of the present invention, a secure support client server 1104 may be not used, and the functionality of access points 15 may be suitably specified in order to obviate the need for server 1104. Alternatively, the functions of server 1104 may be allocated and distributed throughout the DSS components in any advantageous manner.

It may be appreciated by those skilled in the art that the term "transaction" refers, generally, to any message communicated over the system for effecting a particular goal, for example, debit/charge authorization, preference changes, reservation requests, ticket requests, and the like. FIG. 21, for example, shows an exemplary transaction data structure useful in the context of performing an online transaction with a travel partner, wherein the field name 2102, data type 2104 ("C" for character), maximum byte-length 2106, and description 2108 may be listed in tabular form. In this example, the transaction messages may suitably comprise comma delimited data packets, although other data structures may be employed.

Figure 16:
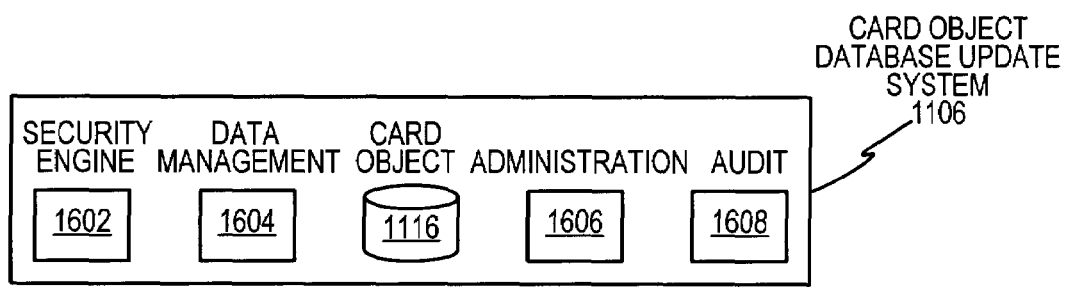
FIG. 16 is a schematic overview of an exemplary card object database update system (CODUS)

CODUS 1106 may suitably securely store information related to the state of the various issued smartcards 100. Referring now to FIGS. 11 and 16, in an exemplary embodiment, CODUS 1106 may comprise a security engine 1602, a data management module 1604, a object database 1616, a card object administration module 1606, and an audit file 1608.

Security engine 1602 may provide suitable security for, inter alia, the information stored within object database 1616. In this regard, security engine 1602 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical cryptographic techniques.

Data management module 1604 may suitably act as a data interface between CODUS 1106 and account maintenance 1142 as well as between CODUS 1106 and the various ED-CUs 1112. More specifically, module 1604 converts and translates between the data format used in these systems. For example, data stored within object database 1616 may not be stored in a format which may be easily used by EDCUs 1112 or account maintenance 142. Accordingly, data management module 1604 may comprise suitable routines for effecting conversion and formatting of both incoming and outgoing data.

Card object administration module 1606 preferably may provide suitable database software to edit, update, delete, synchronize, and ensure non-corruption of data stored within object database 106. A variety of database packages may be suitable for this task, including, for example, various conventional fourth-generation relational database management systems (4GL RDBMS).

Audit file 1608 suitably may track changes to object database 1616, thereby helping to ensure the integrity of card data stored within CODUS 1106. More particularly, when changes to object database 1616 take place as a result of preference updates, transactions, application structure changes, and the like, audit file 1608 may track suitable information related to these changes, e.g., time, date, and nature and content of the change.

Object database 1616, may be used to store the known state of the various smartcards 100. In general, the state of a smartcard may be characterized by a suitable set of card indicia. In an exemplary embodiment, wherein a data structure in accordance with ISO-7816 may be employed, object database 1616 stores information related to the individual applications present on the various smartcards 100 (i.e., the overall file structure) as well as the individual fields, directories, and data that comprise those applications. A file structure for object database 1616 may be chosen such that it may include a suitable set of data fields for a given smartcard 100.

Figure 13:
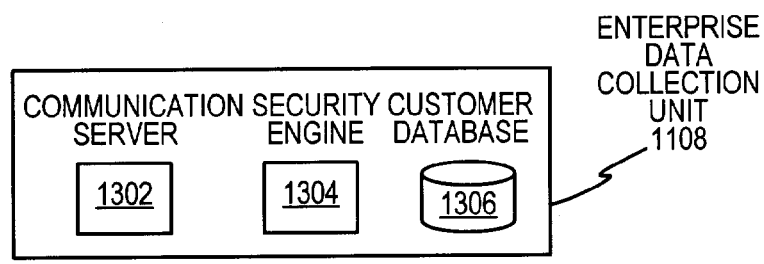
FIG. 13 is a schematic overview of an exemplary enterprise data synchronization interface.

In an exemplary embodiment, the various EDSIs 1108 track changes to smartcard data and/or applications corresponding to individual enterprises. With reference to FIGS. 11 and 13, in an exemplary embodiment, EDSI 1108 may comprise a communication server 1302, a security engine 1304, and a file structure 400.

Communication server 1302 may suitably facilitate communication with enterprise network 1114 and update logic system 1110. In this regard, server 1302 may be configured to translate between various formats, media, and communication protocols as may be necessary given the particular choice of components employed.

Security engine 1304 may provide suitable security measures with respect to the access and storage of information with file structure 400. Security engine 1304 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical cryptographic techniques.

File structure 400, described in greater detail above, may comprise a single database or a set of distributed databases and may suitably provide a means for storing smartcard information related to individual partners or enterprises. During synchronization (as described in further detail below) any changes to file structure 400 may be propagated through the system and, visa-versa, changes elsewhere in the system may be communicated to file structure 400. This communication may be preferably done securely (using security engine 1304) in conjunction with communication server 1302.

In an alternate embodiment, the functionality provided by the EDSIs 1108 may be folded into the corresponding EDCU 1112. That is, while an illustrated embodiment may employ one or more physically separate EDSIs 1108, it may be advantageous to further streamline the DSS by incorporating this functionality into the corresponding EDCU 1112 functional block.

Figure 14:
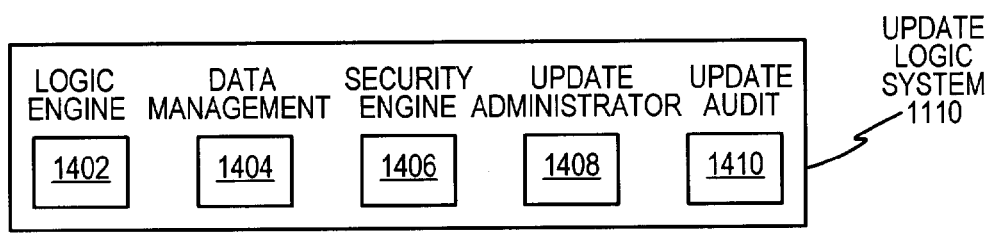
FIG. 14 is a schematic overview of an exemplary update logic system.

In an exemplary embodiment, update logic system 1110 formats and securely routes card data received from and transmitted to EDCUs 1112 and EDSIs 1108. Referring now to FIG. 14, in an exemplary embodiment, update logic system 1110 may include a logic engine 1402, a data management module 1404, a security engine 1406, an enterprise update administrator 1408, and an enterprise update audit module 1410.

Logic engine 1402 may suitably function to direct and distribute information changes across the system. Thus, logic engine 1402 may be able to determine which modules (i.e., which EDCUs 1112 and EDSIs 1108 ) need to reflect the change Data management module 1404 may suitably act as a data interface between EDSIs 1108 and EDCUs 1112. More specifically, module 1404 may be able to convert and translate between data format used in these systems. Accordingly, data management module 1604 may comprise suitable routines for effecting conversion and formatting of both incoming and outgoing data.

Security engine 1406 may be used to provide suitable security measures with respect to data flowing through update logic system 1110. Security engine 1406 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical cryptographic techniques.

Enterprise update administrator 1408 suitably may comprise overhead software necessary to maintain data transfer between EDSIs 1108 and EDCUs 1112.

Enterprise update audit module 1410 suitably may track update information flowing through update logic system 1110. More particularly, when information may be communicated across update logic system 1110, (as a result of preference updates, transactions, application structure changes, and the like), audit module 1410 may track suitable indicia of this information, e.g., time, date, and nature and content of the communication.

Figure 15:
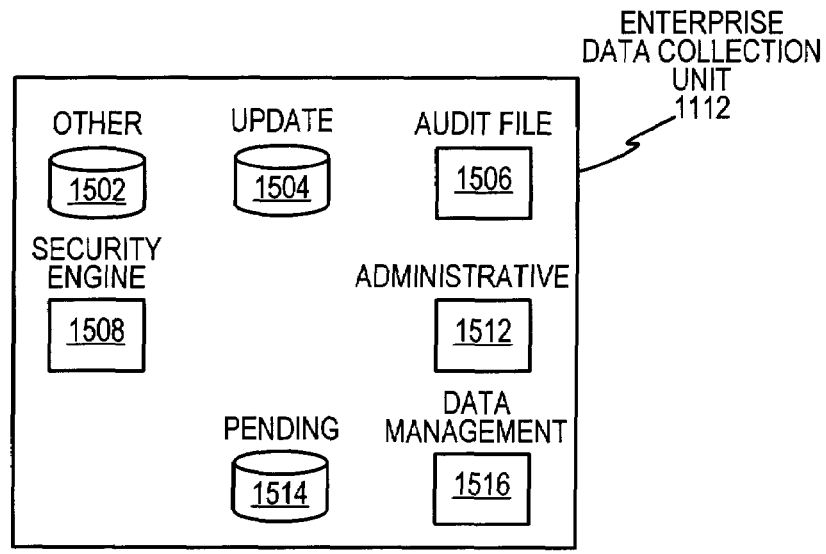
FIG. 15 is a schematic overview of an exemplary enterprise data collection unit.

EDCUs 1112 preferably store and coordinate the transfer of synchronization data corresponding to a particular enterprise. With reference to FIG. 15, in an exemplary embodiment, enterprise data collection unit 1112 may include a security engine 1508, a customer update transaction database 1504, a customer pending transaction database 1514, an update database 1502, an EDCU audit file 1506, an EDCU administrative file 1512, and an EDCU data management module 1516.

Security engine 1508 may be used to provide suitable security measures with respect to data flowing through EDCU 1112. Toward this end, security engine 1406 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical conventional cryptographic techniques.

Customer update transaction database 1504 may be used to store information which has been updated on a smartcard 100, but which has not yet propagated to the various databases and networks that require updating. For example, smartcard 100 may be used to change cardholder preferences in the course of a transaction with a particular enterprise. This information would, in the short term, be stored in database 1504 (for the particular enterprise) until it could be fanned-out to CODUS 1106 and the appropriate EDCUs 1112 and EDSIs 1108. This type of transaction is described in further detail below.

Customer pending transaction database 1514 may be suitably used to store information related to transactions which have taken place without direct use of the smartcard 100. More particularly, some transactions, such as preference changes and the like, may be initiated by a cardholder through a channel which does not involve use of the card, for example, through a verbal request over a standard telephone. In such a case, and as detailed further below, this data may be suitably stored in pending transaction database 1514. The transaction data remains in database 1514 until the corresponding smartcard 100 may be used in conjunction with an access point 15, whereupon smartcard 100 itself (as well as CODUS 1106) may be updated with this new information.

Update database 1502 may be suitably used to store other types of transactions, i.e., transactions which may not be classifiable as update, loyalty or pending. For example, update database 1502 may be employed to store file structure updates as detailed below.

Audit file 1506 may be used to track changes to update database 1504, pending database 1514, and database 1502. Audit file 1506 therefore helps to ensure the integrity of data in the respective files.

Administrative file 1512 may provide suitable database software necessary to edit, update, delete, synchronize, and ensure non-corruption of data stored within the various databases that comprise EDCU 1112 i.e., databases 1502, 1504, and 1514.

Data management module 1516 may provide data management capabilities to facilitate data transfer between smartcards 100 and databases 1504, 1514, and 1502 as well as between these databases and the other systems i.e., update logic system 1110 and CODUS 1106. Thus, data management module 1516 acts as interface to ensure seamless transfer of data between the various systems.

Figure 19:
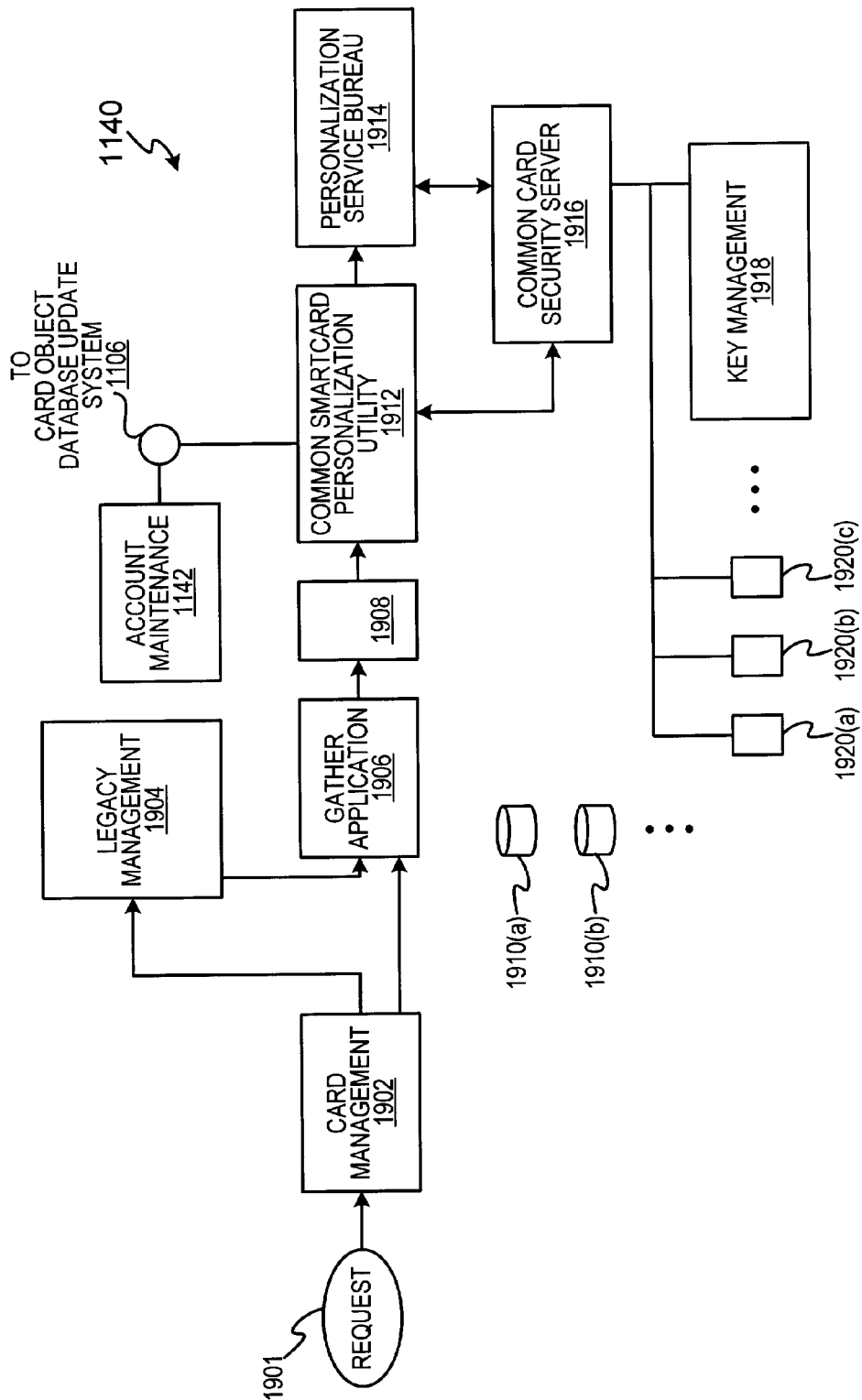
FIG. 19 is a schematic overview of an exemplary personalization system.

Referring now to FIG. 19, in an exemplary embodiment, personalization system 1140 suitably may comprise a card management system 1902, a legacy management system 1904, a gather application module 1906, one or more databases 1910, an activation block 1908, a common card personalization utility 1912 (CCP), a service bureau 1914, a common card security server 1916, a key management system 1918, and one or more key systems 1920. Key management system 1918 suitably may comprise a database module 1922, CID replace module 1924, key system 1926, and key system 1928.

CCP 1912 suitably may communicate with CODUS 1106 (shown in FIG. 11), and legacy management system 1904 suitably may communicate with account maintenance 1142 which may be also configured to communicate with CODUS 1106.

Card management system 1902 may suitably receive the card request 1901 and initiates the gathering of information from various sources. Generally, card request 1901 may consists of various request information intended to specify a desired group of card characteristics. Such characteristics may include, for example: a smartcard identifier (a serial number, account number, and/or any other identifier of a particular smartcard 100), a list of desired applications (airline, hotel, rental car, etc.); a designation of whether the card may be new, a renewal, or a replacement; a list of default cardmember preferences corresponding to the desired applications; personal information related to the cardmember (name, address, etc.); and required security levels.

Card management system 1902 may suitably parse the card request and, for information already stored by the issuer, sends a request to legacy card management system 1904. For information not available as legacy data, card management system 1902 forwards the relevant components of card request 1901 to gather application module 1906. In an exemplary embodiment, card management system 1902 chooses the optimum smartcard physical characteristics for a particular card request 1901. That is, card management system 1902 may suitably determine the appropriate type of smartcard chip to be used based on a number of factors, for example, memory requirements and computational complexity of the desired security functions. Similarly, the optimum smartcard operating system (SCOS) may be chosen. In an alternate embodiment, the smartcard chip, operating system, and the like, may be specified in card request 1901.

Legacy management system 1904 acts as a suitable repository of information related to the cardholder's past relationship if any with the card issuing organization. For example, a cardholder may have a long-standing credit or debit account with issuing organization (based on a standard embossed mag-stripe card) and this information may be advantageously incorporated into the issued card.

Gather application module 1906 may be suitably configured to receive information from card management system 1902 and legacy management system 1904 and then interface with the various databases 1910 to gather all remaining application information specified in card request 1901. Preferably, databases 1910 correspond to and may be associated with the individual partnering enterprises which offer smartcard applications for use in smartcard 100 (e.g., enterprise network 1114 in FIG. 11). Thus, for example, a card request 1901 which included a request for a hotel application would trigger gather application 1906 to initiate data communication with the appropriate hotel database 910. Hotel database 910 would then return information specifying the correct file structure, access conditions (security), default values, and other data necessary to configure smartcard 100 with the requested application. Communication with the various databases 1910 may take place through any suitable means, for example, data communication over the Internet, PSTN, and the like, or through other channels, such as simple phone requests.

Activation block 1908 may be suitably used to provide a means for the cardmember to activate the card once it has been issued. For example, it may be common for credit cards and the like to be sent to the cardmember unactivated, requiring that the cardmember call (or otherwise contact) an automated system at the issuer in order to activate the card. This may be typically accomplished via entry of the card number and other suitable ID using a touch-tone phone. In this regard, activation block 1908 may be used to facilitate this function for the requested smartcard, i.e., to specify whether such activation may be necessary for a particular card.

CCP 1912 may be used to create a correctly formatted card "object" i.e., the operating system, file structure 400 and all other available card data to be downloaded to card 100 then transfer this information to service bureau 1914 (for creation of the smartcard) and CODUS 1106 (for recording the card's state as issued). CCP 1912 may be preferably configured to tailor the format of the card object to the specific card issuance system to be used (described below). Thus, gather application system 1906 may deliver a relatively high-level functionality request, and CCP 1912 may create the specific "object" to be used in the implementation.

Personalization Service Bureau 1914 may comprise suitable hardware and software components to complete production of the smartcards for issuance to the respective cardmembers. In this regard, service bureau 1914 may include a suitable smartcard "printer" to handle the transfer of information to the smartcard chip as well as any conventional embossing or mag-stripe writing that may take place. Suitably smartcard printers may include, for example, any of the series 9000 and series 150i smartcard issuance systems manufactured by Datacard Corporation of Minnetonka, Minn.

Common card security server 1916 (CCSS) suitably may comprise software and hardware components necessary to retrieve cryptographic key information from various enterprise key systems 1920. In an exemplary embodiment, this information may be accessed by service bureau 1914 in order to complete the personalization process. More particularly, it may typically be the case that a smartcard 100 contains a number of different applications associated with a wide range of enterprise organizations. One in the art may appreciate that the writing, updating, and reading of these files may be advantageously restricted to particular parties in accordance with a set of access condition rules. These access conditions may be suitably implemented using cryptographic keys which may be known by the appropriate parties. Thus, service bureau 1914 whose task it may be to create and populate the card file structure may not, ab initio, have access to the keys necessary to perform this function. As mentioned briefly above, known systems have attempted to solve this problem by accumulating key data in a central repository used in the issuance process, thereby creating an unacceptable security risk. Methods in accordance with the present invention, however, allow for communication between the smartcard and the individual key systems 1920 as the card may be being issued, thus allowing key information to be securely downloaded to the smartcard without the intervention of a third party. CCSS 916 may be suitably used to facilitate this process by receiving information from CCP 1912 regarding the identity of the various applications to be created in the various cards, then, when prompted by service bureau 1914 (or, alternatively, prior to issuance by service bureau 1914), contacting the appropriate key system 920 to request a key to be transmitted to service bureau 1914 during personalization.

Key systems 1920 comprise suitable database systems capable of storing, generating, and securely transmitting cryptographic keys associated with a particular enterprise. Key management system 1918 may be, in this context, a system comparable to key systems 1920, but which may be "owned" by the party implementing the personalization system. The key-generating function may be distributed between CCSS and key systems 1920. That is, the keys may be generated in real time at CCSS 1916 (in accordance with algorithms and key information received from the particular enterprises), rather than being generated at key systems 1920.

It may be appreciated to one skilled in the art that the functional blocks illustrated in FIG. 19 may be implemented using a variety of hardware and software components, both off-the-shelf and/or custom-developed. Database-intensive functions performed, for example, by card management system 1902, may be implemented using any suitable database package, e.g., Codebase, dBase, or the like.

A personalization system as described above in conjunction with FIG. 19 may be suitably used to efficiently issue a large number of smartcards with a wide range of functionality levels. This task involves obtaining and coordinating, in a timely fashion, accurate data for individual cardmembers across the various partnering enterprises supported by the system. In this regard, it may be the case that certain partnering enterprises desire to limit the dissemination of proprietary data. This data may include, for example, private keys used in connection with smartcard access conditions as well as file structure and cardmember member personal data.

Figure 20:
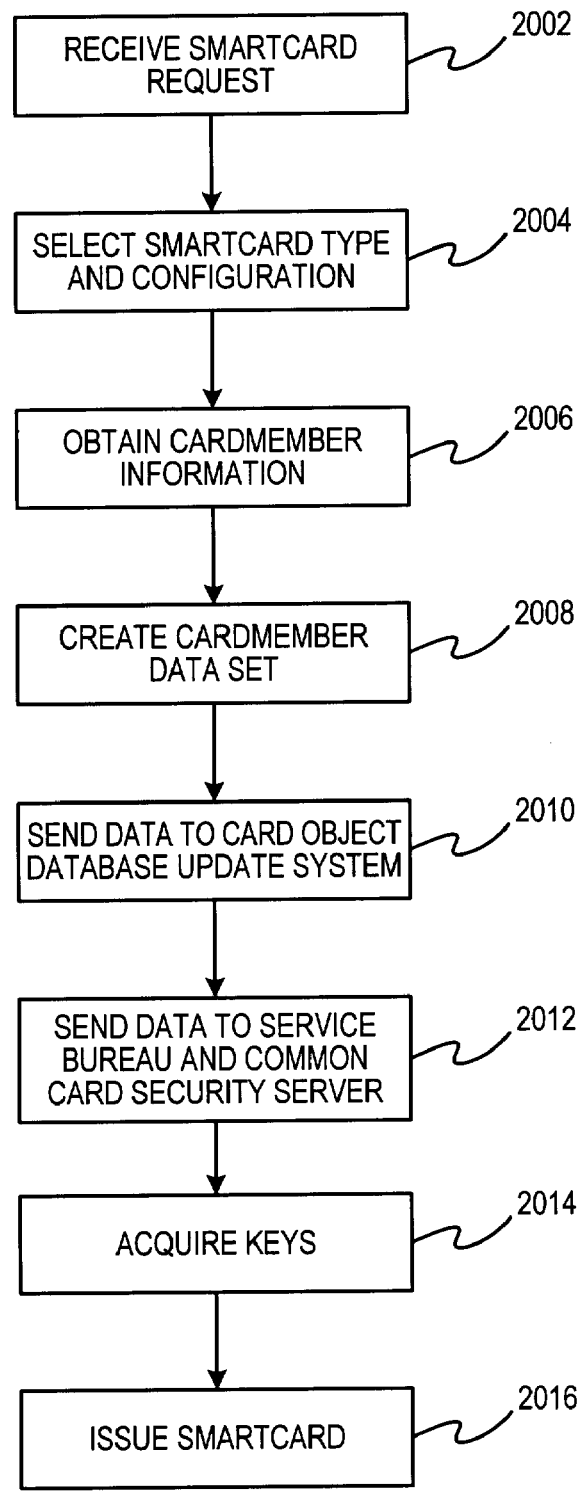
FIG. 20 is a flowchart depicting an exemplary method of smartcard personalization.

Referring now to FIGS. 19 and 20, an exemplary smartcard personalization process may now be described. First, the system receives a smartcard request (step 2002). As mentioned above, card management system 1902 may be suitably used to receive the card request and initiate the gathering of information from various sources. Card request 1901 suitably may consists of request information intended to specify a desired group of card characteristics. Such characteristics may include, for example: a smartcard identifier, a list of desired applications (airline, hotel, rental car, etc.); a designation of whether the card may be new, a renewal, or a replacement; a list of default cardmember preferences corresponding to the desired applications; personal information related to the cardmember (name, address, etc.); and required security levels.

Next, the system selects the smartcard type and configuration appropriate for the given card request 1901 (step 2004). This step may be suitably performed by card management system 1902. Thus, card management system 1902 examines a number of factors in light of information received in card request 1901 (e.g., memory requirements, desired security functions, and the like), then selects an appropriate smartcard chip from a library of available chips. In the same way, the optimum smartcard operating system (SCOS) may also be selected.

Cardmember information may then be obtained (step 2006). This step may be suitably performed by gather application module 1906 operating in conjunction with databases 1910 and legacy management system 1904. More particularly, cardmember-specific information may be preferably classified in two groups: information known to the personalization system, and information not known by the personalization system. Known information generally may consists of data acquired through a past relationship with the organization hosting the personalization system. In such a case, certain data such as cardholder name, exemplary billing address, title, company, etc., may most likely already be known, as may certain application data. Such information may be suitably stored in, and may be retrieved from, one or more databases comprising legacy management system 1904. As part of step 2006, the system (specifically, module 1908) preferably determines whether the card should require activation. That is, as mentioned briefly above, it may be common to apply a sticker or the like to a card that notifies the cardmember that activation of the card may be required prior to use. Activation typically involves the use of an automated phone system). The choice of whether a particular card requires activation may be based on a number of factors, for example, demographics, crime-rate numbers, or mail fraud statistics associated with the cardmember's zip-code code number.

For data not included in legacy management system 1904, gather application module 1906 suitably may communicate with databases 1910 to retrieve the information needed to satisfy card request 1901. This information may typically consist of file structure 400 information, e.g., the DF and EF hierarchy, data types and lengths, and access condition specifications for the particular enterprise-sponsored application. For example, in the case where card request 1901 may include a request for an airline application, gather application module 1906 would contact the database corresponding to the enterprise hosting the airline application, then download all necessary file structure information. This process would continue in turn for each new or modified application to be incorporated into the smartcard.

A full cardmember data set may then be created (step 2008) suitably using CCP 1912. This data set, or "card object", may ultimately be used by service bureau 1914 to create the physical smartcard. The form of the card object may vary. In one embodiment, the card object may comprise what has been termed a Binary Large Object ("BLOB"). The card object may be preferably tailored to the selected smartcard configuration (e.g., chip type and operating system as specified in step 2004), the content of cardmember information data (gathered in step 2006), and the intended smartcard "printer" (i.e., the apparatus used to create the finished card within service bureau 1914). This allows the system, in the preceding steps, to specify file structures, data types, and the like, without concerning itself with how this structure may be encoded onto the smartcard or how the data may be accessed. Up until step 2008, the system need only develop a relatively high-level model of the intended smartcard data structure; the specifics may be substantially invisible to all but CCP 1912.

In an alternate embodiment, various details of the smartcard data object may be determined at a prior point in the system. That is, the functionality of CCP 1912 may be distributed among various components of the system.

Having created the cardmember data set, or card object, in step 2008, this data may be then sent to CODUS 1106 (step 2010). This ensures that the DSS (particularly CODUS 1106) has a record of the smartcard state at the time of personalization. This information may be then immediately available to account maintenance system 1142.

The card object may be then sent to service bureau 1914 and (if required) CCSS 1916 (step 2012). The necessary keys may be acquired to allow service bureau 1914 to create the finished smartcard (step 2014). As mentioned above, step 2014 may be suitably performed by CCSS 1916 concurrently or serially with the issuance process. In one embodiment, as each individual card may be being created using an issuance system suitably located at service bureau 1914, service bureau 1914 interrogates CCSS 1916 for the appropriate cryptographic keys. These keys have either been retrieved from key systems 1920 and 1918 earlier (i.e., after step 2012), or may be retrieved in real-time in response to the request from service bureau 1914. Alternatively, the keys may be retrieved by CCSS 1916 and transmitted to CCP 1912 prior to transmission of the card object to service bureau 1914. In either case, the key or keys may be then retrieved for inclusion in the card object created in step 2008.

The actual card may be issued (step 1016). Service bureau 1914 may suitably download the card object into the correct smartcard hardware using the correct cryptographic keys. The initialized smartcard may then be packaged and distributed to the appropriate cardmember in accordance with conventional methods.

A dynamic synchronization system as described above in various embodiments may be used to track the "state" of the consumer's smartcard. The state of the smartcard may be suitably characterized by the structure of applications used in the smartcard and the various pieces of data that may be stored within these applications.

A number of synchronization issues may arise in the multi-function smartcard context; indeed, three paradigmatic cases reoccur with some frequency, and relate to: 1) update transactions, 2) pending transactions, and 3) file structure changes. Each of these cases may now be described in turn with respect to the present invention.

It may be quite common for a cardholder to make a local change to smartcard 100 which may be not immediately reflected in all the databases which could advantageously make use of this information. For example, suppose that upon initialization (i.e., when the card was originally issued via personalization system 1140) the cardholder's smartcard 100 was configured to reflect a general preference for smoking (e.g., one file contains a Boolean field keyed to smoking/non-smoking), but the cardholder now wishes to change this general preference file to reflect a non-smoking preference.

Figure 18:
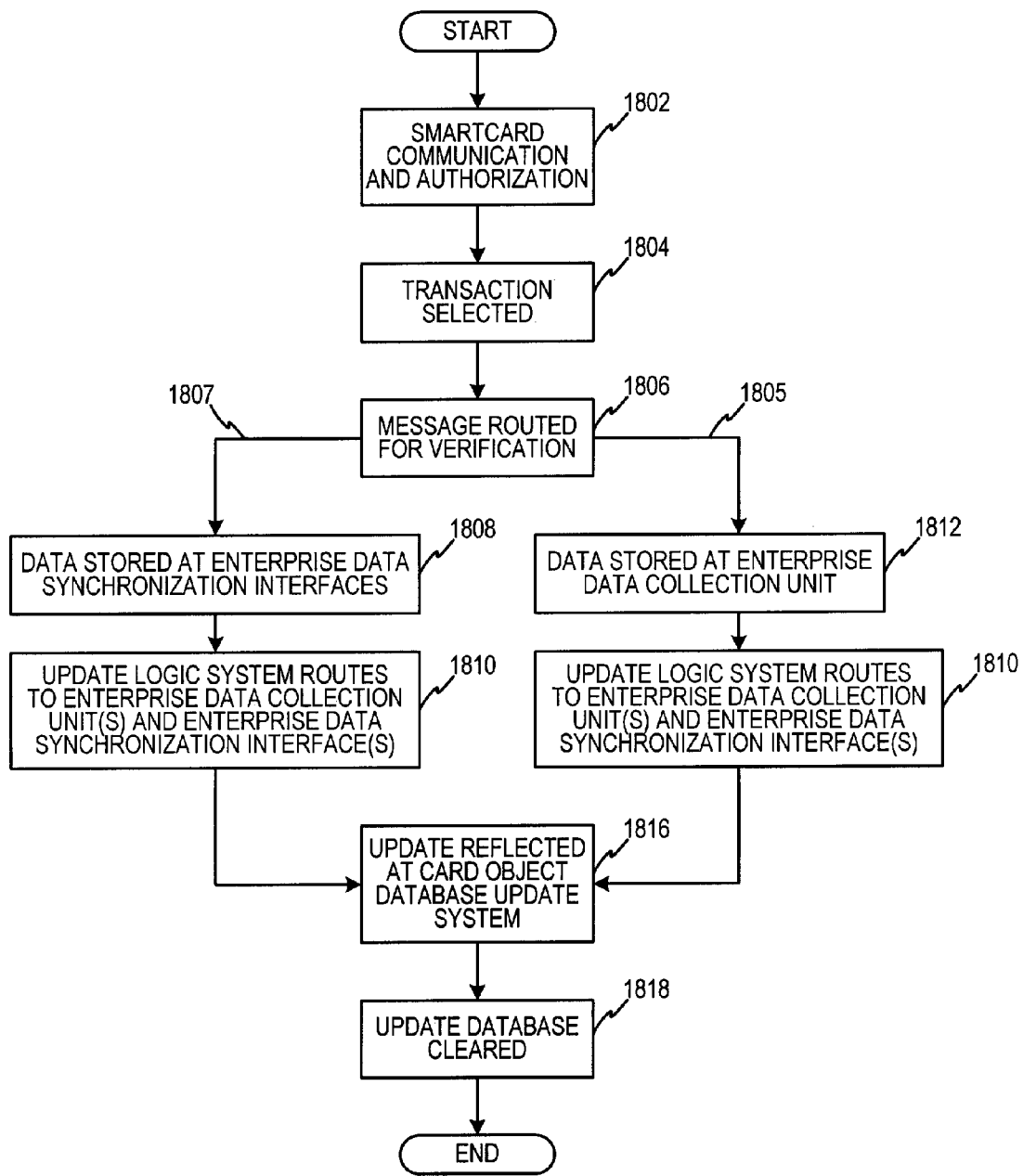
FIG. 18 is a flowchart depicting an exemplary method for synchronizing update transaction information.

In this case, referring now to FIGS. 11, 18 with respect to an exemplary embodiment of the present invention, the cardholder may suitably insert card 100 into a conveniently located access point 15, whereupon authentication of the card and/or card-reader takes place (step 1802). In an exemplary embodiment, authentication takes place in accordance with relevant sections of the ISO 7816 standard.

Next, the cardholder uses a suitable user interface (supplied by access point 15 working in conjunction with server 1104) in order to perform a transaction i.e., to request a change to the preferences file (step 1804). This change would typically be reflected at the smartcard 100 immediately. That is, access point 15 and/or server 1104 would include the functionality necessary to access and update the appropriate files within smartcard 100.

Communication router 1206 in server 1104 then routes the transaction to the appropriate party, i.e., an EDSI 1108 or an EDCU 1112, corresponding to branches 1807 and 1812 respectively. That is, depending on the system configuration, the file to be changed may be associated with a particular enterprise or, alternatively, may be associated with the organization hosting the DSS. These two cases will be described in turn.

Following branch 1807 in FIG. 18, the change data may be sent to and stored in the appropriate EDSI 1108 (step 1808). Update logic system 1110 then transfers this change request to the appropriate EDCU 1112 i.e., the EDCU 1112 corresponding to the particular EDSI (step 1810). This information may be suitably stored in the corresponding update database 1504. The information may be also distributed to other EDSIs. In the instant example, update logic system 1110 would identify those systems that would benefit from knowing the cardholder's smoking status. Such systems may include, for example, various hotels, rental car agencies, and the like.

Alternatively, following branch 1805 in FIG. 18, the data may first be stored at the appropriate EDCU (step 1812), then distributed to other EDCUs 1112 and EDSIs 1108 as described above.

The card data change may be then transferred to CODUS 1106. Specifically, the various fields and files associated with the smartcard 100 may be updated to reflect the change stored in update database 1504. Thus, the information within CODUS 1106 conforms to that contained within smartcard 100 and the various EDCUs 1112 and EDSIs 1108. After this transfer, the corresponding change data in update database 1504 may be cleared (step 1818).

Figure 17:
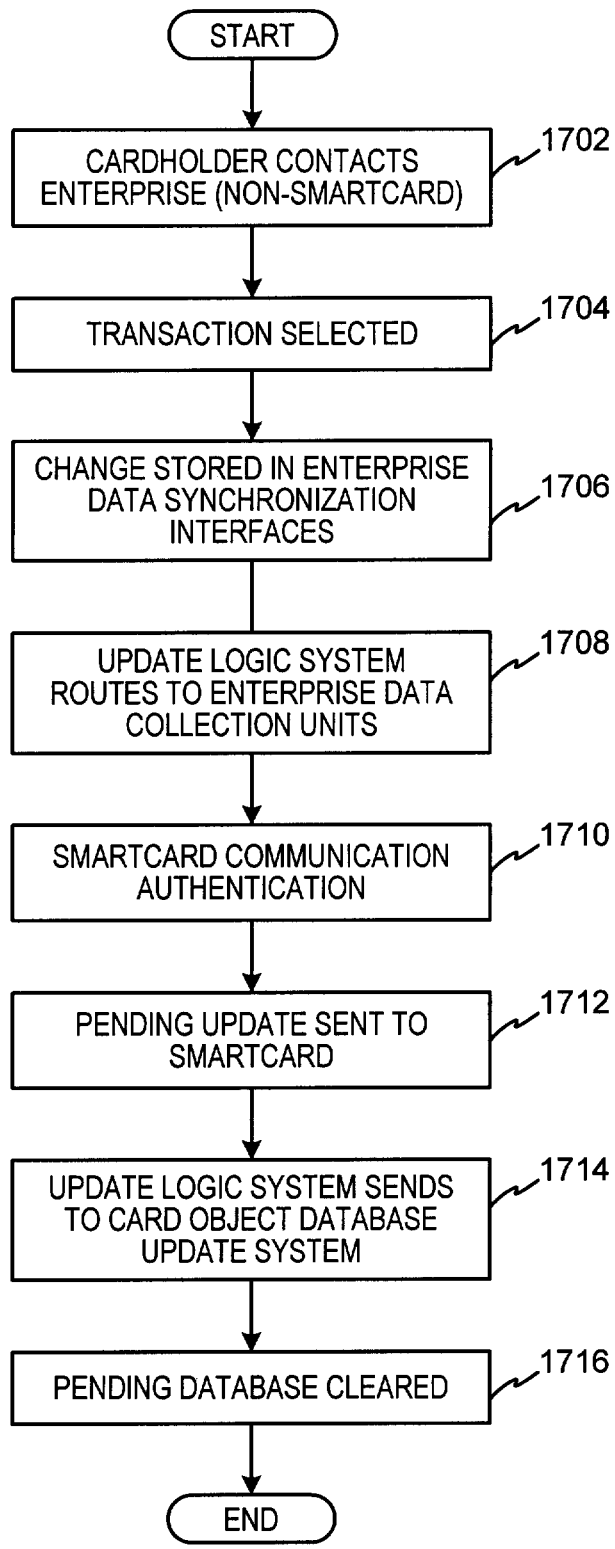
FIG. 17 is a flowchart depicting an exemplary method for synchronizing pending transaction information.

The cardholder may make a change or perform a transaction through a channel that does not directly involve smartcard 100, thus creating an inconsistency between the data in smartcard 100 and the data in various databases throughout the DSS. Such a case may arise, for example, when the cardholder calls a hotel to make a reservation (rather than performing the transaction on line using smartcard 100) and makes an oral request to change his preferences from smoking to non-smoking. Referring now to FIGS. 11 and 17, in this case, with respect to an exemplary embodiment of the present invention, the cardholder first contacts an enterprise through a means that does not include smartcard 100 i.e., a "smartcard not present" transaction (step 1702). Using an appropriate interface (voice, keypad, etc.), a change or transaction may be selected (step 1704). This change may be then stored locally within a particular enterprise network 1114 and/or may be stored within an EDSI 1108 (step 1706).

Next, update logic system 1110 routes this information to the corresponding EDCU 1112 (step 1708), where it resides in pending database 1514. At this point, smartcard 100 itself may be oblivious to the change. As a result, if the cardholder were to initiate a smartcard-present transaction, the corresponding enterprise would likely look first to the data structure in smartcard 100 for preferences, and as just stated, would most likely arrive at the wrong conclusion (e.g., a smoking room may be assigned notwithstanding the cardholder's expressed preference).

In order to remedy this situation, the present invention may provide a method by which the smartcard may be updated upon its next use (steps 1710-1712). That is, after the smartcard may be inserted at an access point 15 and may be suitably authenticated (step 1710), the system interrogates pending database 1514 to determine whether any changes have been made. If so, the appropriate information may be downloaded to smartcard 100 (step 1712).

After the above information transfer may be successfully completed, the change data may be transferred to CODUS 1106, where it may be stored within object database 1616. Finally, the respective information within pending database 1514 may be cleared (step 1716).

In addition to the data-related modifications detailed above, changes to the structure of data stored in smartcard 100 may also be desirable in certain contexts. That is, during the life of a smartcard, it may be likely that the card issuer, a partnering enterprise, or the cardholder himself may desire to extend the card's functionality by augmenting the suite of applications housed within the card. For example, a cardholder who uses a smartcard for rental car and airline reservations may also wish to use the card for acquiring and paying for hotel reservations. In such a case, the appropriate hotel partner may process the cardholder's request and arrange for addition of a hotel application to be added to the smartcard file structure. In another example, the smartcard issuer may authorize the addition of a new application on its own, for example, a credit and/or debit application. Conversely, it may also be appropriate in some instances to remove applications from the card.

In an exemplary embodiment, the types of file structure changes described above may be handled in a manner analogous to the procedure set forth in FIG. 17, depending, to some extent, upon which party originates the file structure change. That is, as in step 1712, the appropriate file structure change information may be stored in EDCU 1112 (for example, in database 1502), and then transferred to smartcard 100 when the card may be used in conjunction with an on-line transaction (steps 1710 and 1712). After the file structure on smartcard 100 may be augmented or otherwise modified, CODUS 1106 (specifically, database 1116) may be similarly modified to reflect the change. The change information may be then cleared from database 1502 (step 1716).

While the example transactions set forth above are described in general terms, the particular nature of data flow to and from the appropriate memory locations within the card may be apparent to those skilled in the art.

In another exemplary embodiment of the present invention, a smartcard transaction system 2400 may be configured with one or more biometric scanners, processors and/or systems. FIG. 24 illustrates an exemplary smartcard transaction system 2400 in accordance with the present invention, wherein exemplary components for use in completing a smartcard transaction using travel-related information are depicted. System 2400 may include smartcard 100 having IC 110. Smartcard 100 may also be configured with a biometric sensor 2204, described in further detail herein. System 2400 may also comprise a smartcard reader 2500 configured to communicate with smartcard 100 and access point 15. Smartcard reader 2500 may be configured with a biometric sensor 2430, described in further detail herein. Smartcard 100 may communicate with enterprise network 1114 and/or network 19 through smartcard reader 2500.

A biometric system may include one or more technologies, or any portion thereof, to facilitate recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. Certain of these technologies will be described in greater detail herein. Moreover, while some of the examples discussed herein may include a particular biometric system or sample, the invention contemplates any of the biometrics discussed herein in any of the embodiments.

The biometric system may be configured as a security system and may include a registration procedure in which a user of transaction instrument (e.g., smartcard 100) proffers a sample of his fingerprints, DNA, retinal scan, voice, and/or other biometric sample to an authorized sample receiver (ASR). An ASR may include a local database, a remote database, a portable storage device, a host system, an issuer system, a merchant system, a smartcard issuer system, an employer, a financial institution, a non-financial institution, a loyalty point provider, a company, the military, the government, a school, a travel entity, a transportation authority, a security company, and/or any other system or entity that may be authorized to receive and store biometric samples and associate the samples with specific biometric databases and/or transaction instruments (e.g., smartcards 100). As used herein, a user of a smartcard, cardmember, or any similar phrase may include the person or device holding or in possession of the smartcard, or it may include any person or device that accompanies or authorizes the smartcard owner to use the smartcard.

Figure 23:
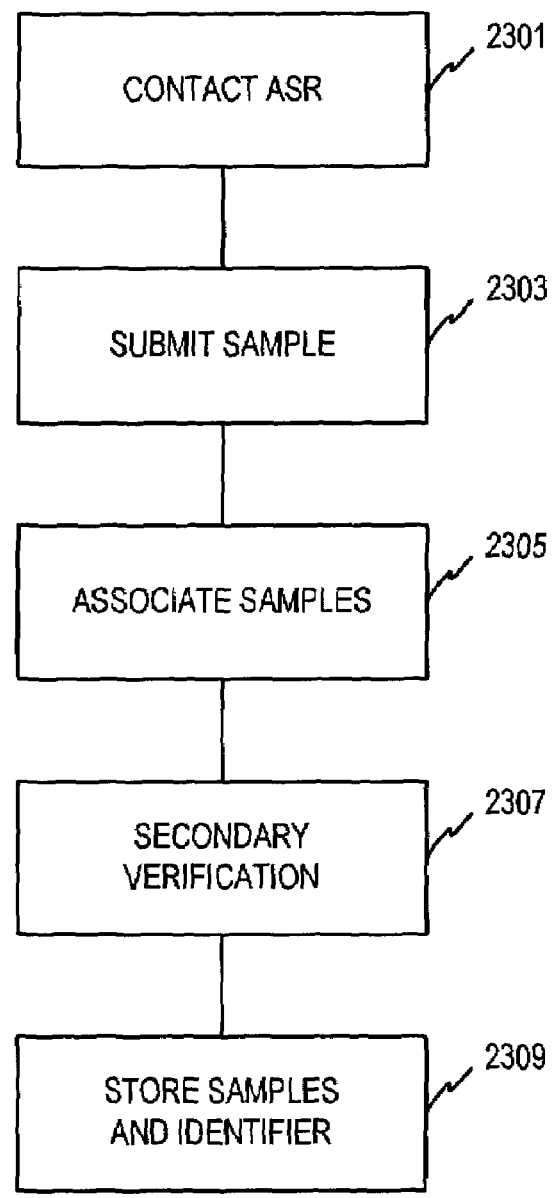
FIG. 23 is a depiction of an exemplary biometrics process in accordance with the present invention.

FIG. 23 illustrates an exemplary registration procedure in accordance with the present invention. In one embodiment, a cardmember may contact an ASR to submit one or more biometric samples to an ASR (Step 2301). The cardmember may contact the ASR and submit a sample in person, through a computer and/or Internet, through software and/or hardware, through a third-party biometric authorization entity, through a kiosk and/or biometric registration terminal, and/or by any other direct or indirect means, communication device or interface for a person to contact an ASR.

A cardmember may then proffer a biometric sample to the ASR (step 2303). As used herein, a biometric sample may be any one or more of the biometric samples or technologies, or portion thereof, described herein or known in the art. By proffering one or more biometric samples, a biometric may be scanned by at least one of a retinal scan, iris scan, fingerprint scan, hand print scan, hand geometry scan, voice print scan, vascular scan, facial and/or ear scan, signature scan, keystroke scan, olfactory scan, auditory emissions scan, DNA scan, and/or any other type of scan to obtain a biometric sample. Upon scanning the sample, the system may submit the scanned sample to the ASR in portions during the scan, upon completing the scan or in batch mode after a certain time period. The scanned sample may include a hardcopy (e.g., photograph), digital representation, an analog version or any other configuration for transmitting the sample. The ASR receives the sample and the ASR may also receive copies of a cardmember's biometric data along with the sample or at a different time (or within a different data packet) from receiving the sample.

The ASR and/or cardmember may correlate and/or register the sample with cardmember information to create a data packet for the sample and store the data packet in digital and/or any other storage medium known in the art. As used herein, a data packet may include the digitized information relating to at least one of a biometric sample, a registered biometric sample, a stored biometric sample, a proffered biometric, a proffered biometric sample, cardmember information, smartcard information and/or any other information. The terms "data packet," "biometric sample," and "sample" may be used interchangeably. As used herein, registered samples may include samples that have been proffered, stored and associated with cardmember information. By storing the data packet in digital format, the ASR may digitize any information contained in one of the biometric scans described herein. By storing the data packet in any storage medium, the ASR may print and/or store any biometric sample. Hardcopy storage may be desirable for back-up and archival purposes.

The biometric sample may also be associated with user information to create a data packet (step 2305). The sample may be associated with user information at any step in the process such as, for example, prior to submission, during submission and/or after submission. In one embodiment, the user may input a PIN number or zip code into access point 15, then scan the biometric to create the biometric sample. The local access point may associate the biometric sample data with the PIN and zip code, then transmit the entire packet of information to the ASR. In another embodiment, the access point may facilitate transmitting the sample to an ASR, and during the transmission, the sample may be transmitted through a third system which adds personal information to the sample.

The information associated with the biometric sample may include any information such as, for example, cardmember information, smartcard 100 information, smartcard 100 identifier information, smartcard 100 issuer information, smartcard 100 operability information, and/or smartcard 100 manufacturing information. Smartcard 100 information may be not limited to smartcard chip information and may include information related to any transaction instrument such as transponders, credit cards, debit cards, merchant-specific cards, loyalty point cards, cash accounts and any other transaction instruments and/or accounts. The cardmember information may also contain information about the user including personal information—such as name, address, and contact details; financial information—such as one or more financial accounts associated with the cardmember; loyalty point information—such as one or more loyalty point accounts (e.g., airline miles, charge card loyalty points, frequent diner points) associated with the cardmember; and/or non-financial information—such as employee information, employer information, medical information, family information, and/or other information that may be used in accordance with a cardmember.

For example, a cardmember may have previously associated a credit card account, a debit card account, and a frequent flier account with his biometric sample which may be stored at an ASR. Later, when cardmember desires to purchase groceries, cardmember may submit his biometric sample while using smartcard 100 for the purchase at access point 15. Access point 15 may facilitate sending the biometric sample to the ASR such that the ASR authorizes the biometric sample and checks a look-up table in the ASR database to determine if any information may be associated with the sample. If information (e.g., financial accounts) may be associated with the sample, the ASR may transmit the information to the Access point. The Access point may then present cardmember with a list of the three accounts associated with the biometric sample. Cardmember and/or a merchant may then chose one of the accounts in order to continue and finalize the transaction.

In another embodiment, cardmember may associate each account with a different biometric sample. For example, during registration, cardmember may submit a sample of his right index fingerprint, and request that the system primarily associate this sample with a particular credit card account. Cardmember may additionally submit a sample of his left index fingerprint and request that the system primarily associate the sample with a particular debit account. Additionally, cardmember may submit his right thumbprint and request that the system primarily associate that sample with a particular frequent flier account. By "primarily" associating a sample with an account, the system initially associates the sample with that account. For example, cardmember submitting his right index fingerprint for a financial transaction may have money for the transaction taken from his credit card account. Cardmember may additionally specify which accounts should be secondarily associated with a sample. For example, cardmember may have a debit card account secondarily associated with his right index fingerprint. As a result, if cardmember submits his right index fingerprint for a transaction, and the primary account associated with the sample is overdrawn or unavailable, the secondary account may be accessed in order to further the transaction.

While primary and secondary account association are described herein, any number of accounts may be associated with a sample. Moreover, any hierarchy or rules may be implemented with respect to the association. For example, the cardmember may instruct the system to access a debit card account when it receives a right index fingerprint sample, the purchase qualifies for loyalty points with a certain airline and the purchase amount is less than $50. The cardmember may additionally instruct the system to access a credit card account if it receives a right index fingerprint sample, the purchase does not qualify for airline miles and the purchase amount is greater than $50. Further, while fingerprint samples are discussed herein, any biometric sample may have one or more accounts associated with it and may be used to facilitate a transaction using any of the routines discussed herein.

The ASR and/or cardmember may associate a specific smartcard 100 identifier with the biometric sample by any method known in the art for associating an identifier (e.g., through the use of software, hardware and/or manual entry.) The ASR may additionally verify the cardmember and/or smartcard 100 by using one or more forms of the user's secondary identification (step 2307). For example, the ASR may verify the cardmember by matching the smartcard information to information retrieved from scanning information from a cardmember's driver's license. The ASR may verify smartcard 100 by contacting the vendor of smartcard 100 to confirm that smartcard 100 was issued to a specific cardmember. In another embodiment, the ASR may activate smartcard 100 during the registration procedure to confirm that the smartcard 100 smartcard chip identifier and other information may be properly associated with the cardmember and the cardmember's specific biometric samples. The ASR may additionally employ one or more verification methods to confirm that the biometric sample belongs to the user, such as, for example, the ASR may request from the user demographic information, further biometric samples and/or any other information. As used herein, "confirm," "confirmation" or any similar term includes verifying or substantially verifying the accuracy, existence, non-existence, corroboration, and/or the like of the information, component, or any portion thereof. The ASR may additionally employ one or more additional processing methods in order to facilitate association of a biometric sample. As used herein, the term processing may include scanning, detecting, associating, digitizing, printing, comparing, storing, encrypting, decrypting, and/or verifying a biometric and/or a biometric sample, or any portion thereof.

Upon association, authentication and/or verification of the biometric sample and smartcard 100, the system may create a data packet store the data packet and smartcard 100 identifier (step 2309) in one or more databases on and/or in communication with system 2400 via a network, server, computer, or any other means of communicating as described herein. The database(s) may be any type of database described herein. For example, a biometric sample stored on smartcard 100 may be stored in EEPROM 212. The database(s) may be located at or operated by any of the entities discussed herein such as, for example, the ASR and/or by a third-party biometric database operator.

The information stored in the database may be sorted or stored according to one or more characteristics associated with the sample in order to facilitate faster access to the stored sample. For example, fingerprint samples may be stored in a separate database than voice prints. As another example, all fingerprints with certain whirl patterns may be stored in a separate sub-database and/or database from fingerprints with arch patterns.

The biometric samples may also be stored and/or associated with a personal identification number (PIN) and/or other identifier to facilitate access to the sample. The PIN may be cardmember selected or randomly assigned to the biometric sample. The PIN may consist of any characters such as, for example, alphanumeric characters and/or foreign language characters.

The system may further protect the samples by providing additional security with the sample. The security may include, for example, encryption, decryption, security keys, digital certificates, firewalls and/or any other security methods known in the art and discussed herein. One or more security vendors may utilize the security methods to store and/or access the biometric samples. The present invention anticipates that storage of the biometric samples may be such that a sample may be first encrypted and/or stored under a security procedure, such that the sample may only be accessed by a vendor with the proper level of access or security which corresponds to or provides access to the stored sample. The samples may be accessible by certain vendors such as, for example, smartcard 100 transaction account provider system, an issuer system, a merchant system, a smartcard issuer system, an employer, a financial institution, a non-financial institution, a loyalty-point provider, a company, the military, the government, a school, a travel entity, a transportation authority, and/or a security company.

Figure 22:
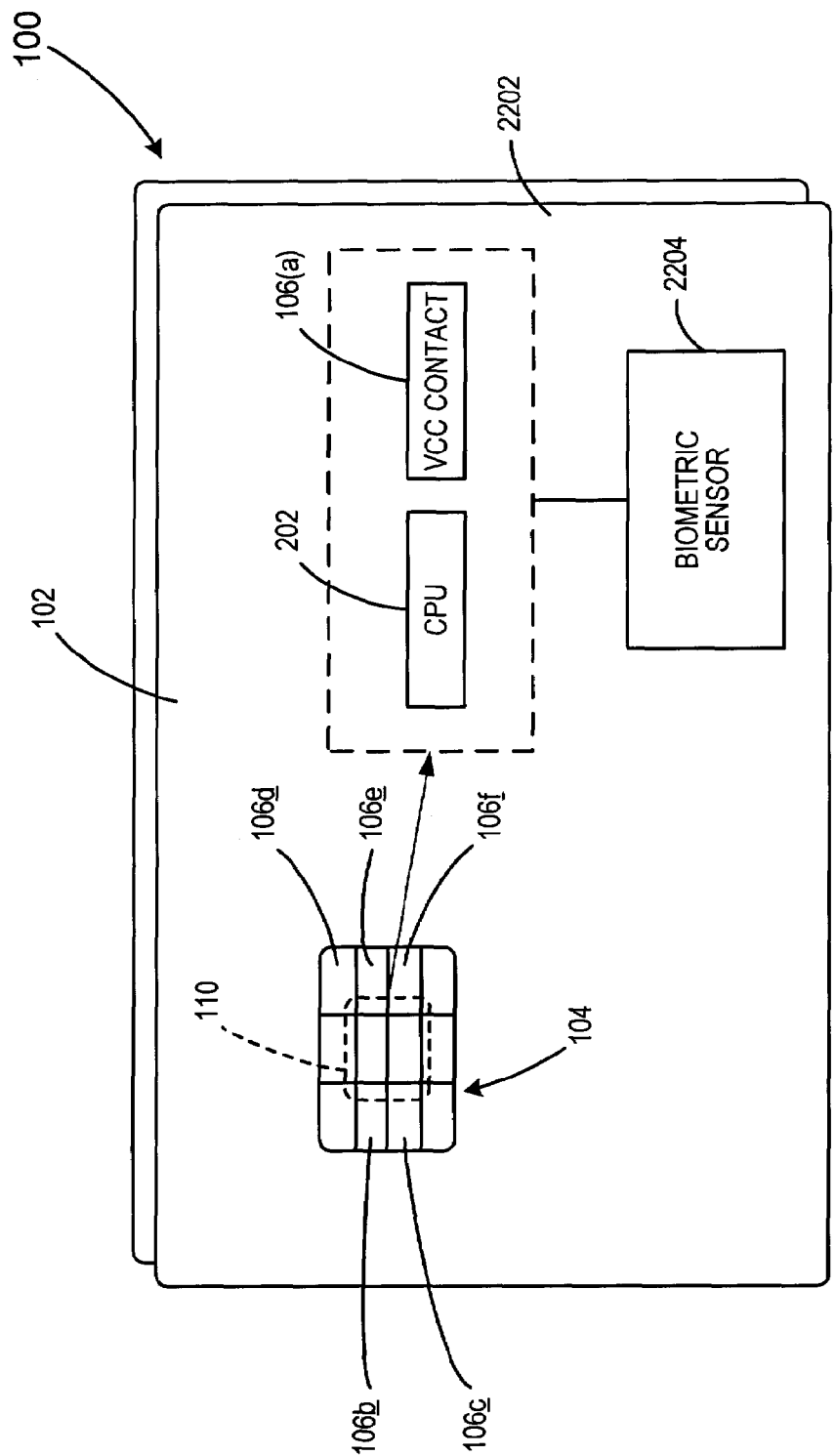
FIG. 22 is another schematic illustration of an exemplary smartcard in accordance with the present invention.

The smartcard of the invention may include a particular security system wherein the security system incorporates a particular biometric system. As shown in FIG. 22, smartcard 100 may include a biometric security system 2202 configured for facilitating biometric security using, for example, fingerprint samples. As used herein, fingerprint samples may include samples of one or more fingerprints, thumbprints, palm prints, footprints, and/or any portion thereof. Biometric security system 2202 may include a biometric sensor 2204 which may be configured with a sensor and/or other hardware and/or software for acquiring and/or processing the biometric data from the person such as, for example, optical scanning, capacitance scanning, or otherwise sensing the portion of cardmember. In one embodiment, biometric sensor 2204 of the security system 2202 may scan a finger of a cardmember in order to acquire his fingerprint characteristics into smartcard 100. Biometric sensor 2204 may be in communication with integrated circuit 110 such that IC 110 receives the fingerprint information and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

In one exemplary application of smartcard 100 incorporating biometric security system 2202, the user may place his finger on the biometric sensor to initiate the mutual authentication process between smartcard 100 and smartcard reader 2500, and/or to provide verification of the user's identity. Smartcard 100 may digitize the fingerprint and compare it against a digitized fingerprint stored in a database (e.g., security EEPROM 212) included on smartcard 100. The fingerprint information may additionally be compared with information from one or more third-party databases communicating with smartcard 100 through any communication software and/or hardware, including for example, smartcard reader 2500, a Universal Serial Bus (USB) connection, a wireless connection, a computer, a network and/or any other means for communicating. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. As used herein, compare, comparison and similar terms may include determining similarities, differences, existence of elements, non-existence of elements and/or the like.

CPU 202 may facilitate the local comparison to authenticate the biometric and validate the information. Any of the embodiments may alternatively or additionally include remote comparisons performed or controlled by one or more third-party security vendors. One or more comparison techniques and/or technologies may be used for comparisons. For example, for fingerprint comparisons, CPU 202 may utilize an existing database to compare fingerprint minutia such as, for example, ridge endings, bifurcation, lakes or enclosures, short ridges, dots, spurs and crossovers, pore size and location, Henry System categories such as loops, whorls, and arches, and/or any other method known in the art for fingerprint comparisons.

Smartcard 100 may additionally be configured with secondary security procedures to confirm that fake biometric samples may be not being used. For example, to detect the use of fake fingers, smartcard 100 may be further configured to measure blood flow, to check for correctly aligned ridges at the edges of the fingers, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors, eyeball pressure sensors and/or any other procedures known in the art for authenticating the authenticity of biometric samples.

After verifying the biometric information, smartcard 100 and smartcard reader 2500 may begin authentication, and the transaction may proceed accordingly. However, the invention contemplates that the verification of biometric information may occur at any point in the transaction such as, for example, after the mutual authentication. At any point in the transaction, the system may additionally request cardmember to enter a PIN and/or other identifier associated with the transaction account and/or biometric sample to provide further verification of cardmember's identification. As part of the transaction, cardmember payer may be requested to select from one of the financial accounts, loyalty accounts, credit accounts, debit account, and/or other accounts associated with the biometric sample. The user may be presented with a list of account options on a display associated with smartcard reader 2500, smartcard 100, a third-party security device and/or any other financial or transaction device association with a transaction. In another embodiment, a payee may select one of the accounts. For example, a department store payee may manually and/or automatically select a department store issued account, if available, for a transaction.

In another exemplary embodiment, biometric security system 2202 may be configured for facilitating biometric security using facial recognition or recognition of any other body part or object. As discussed herein, facial recognition may include recognition of any facial features obtained through a facial scan such as, for example, the eyes, nose, cheeks, jaw line, forehead, chin, ear features, head shape, hairline, neck features, shoulder height, forehead slope, lip shape, distance between the ears and/or any portion thereof. Biometric security system 2202 may include a biometric sensor 2204 which may be configured with a video camera, optical scanner, imaging radar, ultraviolet imaging and/or other hardware and/or software for acquiring the biometric data from the person such as, for example video scanning, optical scanning or otherwise sensing any portion of cardmember. In one embodiment, biometric sensor 2204 of the security system 2202 may scan the face of a cardmember in order to acquire his facial characteristics into smartcard 100. Biometric sensor 2204 may be in communication with IC 110 such that sensor 2204 receives the facial information and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

In one exemplary application of smartcard 100 incorporating biometric security system 2202, system 2202 may scan the facial features of the cardmember to initiate the mutual authentication process between smartcard 100 and smartcard reader 2500, and/or to provide verification of the user's identity. Security system 2202 may be configured such that cardmember may stand at least two-feet away from sensor 2204. Additionally, sensor 2204 may be configured to detect facial features of a user turned at least 30 degrees toward the camera.

Smartcard 100 may digitize the facial scan and compare it against a digitized facial scan stored in a database (e.g., security EEPROM 212) included on smartcard 100. The facial scan information may additionally be compared with information from one or more third-party databases communicating with smartcard 100 through any communication software and/or hardware, including for example, smartcard reader 2500, a USB connection, a wireless connection, a computer, a network and/or any other means for communicating. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples.

CPU 202 may facilitate the local comparison to authenticate the biometric and may validate the information. Any of the embodiments may alternatively or additionally include remote comparisons performed or controlled by one or more third-party security vendors. One or more comparison techniques and/or technologies may be used for comparisons. For example, for facial recognition, CPU 202 may utilize an existing database to compare nodal points such as the distance between the eyes, the width of the nose, the jaw line, and the depth of the user's eye sockets. While only some types of nodal points are listed, the present invention recognizes that it is known that there are over 80 different nodal points on a human face that may be used for comparison in the present invention. Additionally, third-party devices such as facial recognition software and/or hardware systems may be used to facilitate facial recognition, such as the systems developed by Viisage, Imagis, and Identix which employ complex algorithms that facilitate both searching facial and/or ear scans and adjusting stored data based on eyewear, facial hair, and other changes in outward facial and/or ear appearance.

Smartcard 100 may additionally be configured with secondary security procedures to confirm that fake biometric samples may be not being used. For example, to detect the use of fake facial features, smartcard 100 may be further configured to measure blood flow, to detect a thermal pattern associated with facial features, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors and/or any other procedures known in the art for authenticating the authenticity of biometric samples. After verifying the biometric information, smartcard 100 and smartcard reader 2500 may begin authentication by any of the methods described herein.

In another exemplary embodiment, biometric security system 2202 may be configured for facilitating biometric security using voice recognition. As discussed herein, voice recognition may include recognition of voice and/or speaker features such as, phonated excitation, whispered excitation, frication excitation, compression, vibration, parametric waveforms, tone, pitch, dialect, annunciation, and/or any portion thereof. As discussed herein, these voice recognition features may be collectively referred to as a "voice print." Biometric security system 2202 may include a biometric sensor 2204 which may be configured with an audio capture device such as a microphone, telephone, cellular phone, computer, speaker and/or other hardware and/or software for acquiring the biometric data from the person such as, for example auditory scanning, recording or otherwise sensing the portion of cardmember.

In one exemplary application of smartcard 100 incorporating biometric security system 2202, system 2202 may capture the voice print of the cardmember to initiate the mutual authentication process between smartcard 100 and smartcard reader 2500, and/or to provide verification of the user's identity. In one embodiment, biometric sensor 2204 of the security system 2202 may capture a voice print, when a user recites, for example, a pass phrase or audible PIN. Biometric sensor 2204 may be in communication with IC 110 such that sensor 2204 receives the voice print and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the voice print and compare it against a digitized voice print stored in a database (e.g., security EEPROM 212) included on smartcard 100. The voice print information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

One or more comparison techniques and/or technologies may be used for comparisons. For example, for voice recognition, CPU 202 may utilize an existing database to compare the voice print by comparing voice print waveforms in the time domain, by comparing energy content in the voice prints across the frequency domain, by the use of stochastic models and/or template models, and/or by any other voice recognition method known in the art. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as voice recognition software and/or hardware systems to facilitate voice print comparisons, such as, for example SAFLINK and Voice Security Systems.

Smartcard 100 and/or any other third-party security vendor system used in connection with smartcard 100 may additionally be configured with secondary security procedures to confirm that fake biometric samples are not being used. For example, to detect the use of a recorded voice, system 2202 may be further configured to detect audio noise associated with an electronic device and/or any other secondary procedure to thwart biometric security fraud. After verifying the biometric information, smartcard 100 and smartcard reader 2500 may begin authentication by the methods described herein.

In another exemplary embodiment of the present invention, biometric security system 2202 may be configured for facilitating biometric security using signature recognition. As discussed herein, signature recognition may include recognition of the shape, speed, stroke, stylus pressure, timing information, character height and width and/or other signature information and/or any portion thereof during the act of signing. As discussed herein, these signature recognition features may be collectively referred to as a "signature scan." Biometric security system 2202 may include a biometric sensor 2204 which may be configured with an LCD screen, digitizing tablet and/or other hardware and/or software that facilitates digitization of biometric data from the person such as, for example signature scanning, recording or otherwise sensing the signature of cardmember.

In one exemplary application of smartcard 100 incorporating biometric security system 2202, system 2202 may capture the signature scan of the cardmember to initiate the mutual authentication process between smartcard 100 and smartcard reader 2500, and/or to provide verification of the user's identity. In one embodiment, biometric sensor 2204 of the security system 2202 may capture a signature scan, when a user signs, for example, his name or a specified word or phrase. Biometric sensor 2204 may be in communication with IC 110 such that sensor 2204 receives the signature scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the signature scan and compare it against a digitized signature scan stored in a database (e.g., security EEPROM 212) included on smartcard 100. The signature scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for voice recognition, CPU 202 may utilize an existing database to compare the features of a signature scan by comparing graphs, charts, and or other data relating to shape, speed, stroke, stylus pressure, timing information, character height and width and/or by any other signature recognition data. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as signature recognition software and/or hardware systems to facilitate signature scan comparisons, such as, for example CyberSIGN, LCI Computer Group, and Xenetek.

Smartcard 100 and/or any other third-party security vendor system used in connection with smartcard 100 may additionally be configured with secondary security procedures to confirm that fake biometric samples are not being used. For example, to detect the use of a false signature device, system 2202 may be further configured to detect a thermal pattern associated with a human hand and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using vascular pattern recognition. As discussed herein, vascular pattern may include recognition of structures, depths, and other biometric reference points of arterial tissues, vein tissues, capillary tissues, epithelial tissues, connective tissues, muscle tissues, nervous and/or other inner tissues and/or any portion thereof. As discussed herein, these vascular pattern features may be collectively referred to as a "vascular scan." Biometric security system 2202 may include a biometric sensor 2204 which may be configured with an optical scanner, x-ray, ultrasound, computed topography, thermal scanner and/or other hardware and/or software that facilitates capture of biometric data from the person such as, for example scanning, detecting or otherwise sensing a vascular pattern of cardmember.

In one exemplary application of smartcard 100 incorporating biometric security system 2202, system 2202 may capture the vascular scan of the cardmember to initiate the mutual authentication process between smartcard 100 and smartcard reader 2500, and/or to provide verification of the user's identity. In one embodiment, biometric sensor 2204 of the security system 2202 may capture a vascular scan, when a user places his hand in front of an optical scanner. Biometric sensor 2204 may be in communication with IC 110 such that sensor 2204 receives the vascular scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the vascular scan based on biometric reference points and compare it against a digitized vascular scan stored in a database (e.g., security EEPROM 212) included on smartcard 100. The vascular scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for vascular pattern recognition, CPU 202 may utilize an existing database to compare the vascular scan by comparing biometric reference points, vascular coordinates, vascular and/or tissue lengths, widths and depths; blood pressure including waveforms, dicrotic notches, diastolic pressure, systolic pressure, anacrotic notches and pulse pressure, and/or any other characteristic of vascular and/or tissue patterns. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as vascular pattern recognition software and/or hardware systems to facilitate vascular scan comparisons, such as, for example VEID International, Identica and ABT Advanced Biometric Technologies.

Smartcard 100 and/or any other third-party security vendor system used in connection with smartcard 100 may additionally be configured with secondary security procedures to confirm that fake biometric samples are not being used. For example, to detect the use of a false vascular patterns, system 2202 may be further configured to detect a thermal pattern associated with vascular patterns and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using DNA biometrics. As discussed herein, DNA biometrics may include recognition of structures, gene sequences, and other genetic characteristics of skin tissue, hair tissue, and/or any other human tissue and/or any portion thereof containing genetic information. As discussed herein, these genetic features may be collectively referred to as a "DNA scan." Biometric security system 2202 may include a biometric sensor 2204 which may be configured with an infrared optical sensor, a chemical sensor and/or other hardware and/or software that facilitates capture of biometric data from the person such as, for example scanning, detecting or otherwise sensing a DNA scan of cardmember.

In one exemplary application of smartcard 100 incorporating biometric security system 2202, system 2202 may capture the DNA scan of the cardmember to initiate the mutual authentication process between smartcard 100 and smartcard reader 2500, and/or to provide verification of the user's identity. In one embodiment, biometric sensor 2204 of the security system 2202 may capture a DNA scan, when a user submits genetic material to sensor 2204. Biometric sensor 2204 may be in communication with IC 110 such that sensor 2204 receives the DNA scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the DNA scan based on genetic information reference points and compare it against a digitized DNA scan stored in a database (e.g., security EEPROM 212) included on smartcard 100. The DNA scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for DNA recognition, CPU 202 may utilize an existing database to compare the DNA scan by comparing nucleotides, code sequences, regulatory regions, initiation and stop codons, exon/intron borders, and/or any other characteristics of DNA. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as DNA recognition software and/or hardware systems to facilitate DNA scan comparisons, such as, for example Applied DNA Sciences.

Smartcard 100 and/or any other third-party security vendor system used in connection with smartcard 100 may additionally be configured with secondary security procedures to confirm that fake biometric samples are not being used. For example, to detect the use false DNA, system 2202 may be further configured to take a DNA sample directly off a user and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using hand geometry biometrics. As discussed herein, hand geometry biometrics may include recognition of hand geometry parameters, such as, for example, hand shape, finger length, finger thickness, finger curvature and/or any portion thereof. As discussed herein, these hand geometry features may be collectively referred to as a "hand geometry scan." Biometric security system 2202 may include a biometric sensor 2204 which may be configured with an infrared optical sensor, a three-dimensional imaging system and/or other hardware and/or software that facilitates capture of biometric data from the person such as, for example scanning, detecting or otherwise sensing a hand geometry scan of cardmember.

In one exemplary application of smartcard 100 incorporating biometric security system 2202, system 2202 may capture the hand geometry scan of the cardmember to initiate the mutual authentication process between smartcard 100 and smartcard reader 2500, and/or to provide verification of the user's identity. In one embodiment, biometric sensor 2204 of the security system 2202 may capture a hand geometry scan, when a user places his hand in front of an optical scanner. Biometric sensor 2204 may be in communication with IC 110 such that sensor 2204 receives the hand geometry scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the hand geometry scan based on hand geometry parameters and compare it against a digitized hand geometry scan stored in a database (e.g., security EEPROM 212) included on smartcard 100. The hand geometry scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for hand geometry recognition, CPU 202 may utilize an existing database to compare hand shape, finger length, finger thickness, finger curvature and/or any other of the 90 different hand geometry parameters known in the art. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as hand geometry recognition software and/or hardware systems to facilitate hand geometry scan comparisons, such as, for example IR Recognition Services and Human Recognition Services.

Smartcard 100 and/or any other third-party security vendor system used in connection with smartcard 100 may additionally be configured with secondary security procedures to confirm that fake biometric samples are not being used. For example, to detect the use of false hands, system 2202 may be further configured to measure blood flow, to detect body heat and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using auditory emissions biometrics. As discussed herein, auditory emissions biometrics may include emissions that an ear generates when stimulated by sound, such as vibrations and reverberated sound waves and/or any portion thereof. As discussed herein, these auditory emissions features may be collectively referred to as an "auditory emissions scan." Biometric security system 2202 may include a biometric sensor 2204 which may be configured with an infrared optical sensor, an auditory sensor, an auditory generator and/or other hardware and/or software that facilitates the capture of biometric data from the person such as, for example sound generating, scanning, detecting or otherwise sensing an auditory emissions scan of cardmember.

In one exemplary application of smartcard 100 incorporating biometric security system 2202, system 2202 may capture the auditory emissions scan of the cardmember to initiate the mutual authentication process between smartcard 100 and smartcard reader 2500, and/or to provide verification of the user's identity. In one embodiment, biometric sensor 2204 of the security system 2202 may capture an auditory emissions scan, when a user hears an auditory stimulant and the user's auditory emissions may be detected by biometric sensor 2204. Biometric sensor 2204 may be in communication with IC 110 such that sensor 2204 receives the auditory emissions scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the auditory emissions scan based on emissions waveforms and compare it against a digitized auditory emissions scan stored in a database (e.g., security EEPROM 212) included on smartcard 100. The auditory emissions scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for auditory emissions recognition, CPU 202 may utilize an existing database to compare emissions difference in frequency, wavelength, and/or other characteristics between the transmitted and reverberated sound waves. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as auditory emissions recognition software and/or hardware systems to facilitate auditory emissions scan comparisons, such as, for example those developed by the University of Southampton.

Smartcard 100 and/or any other third-party security vendor system used in connection with smartcard 100 may additionally be configured with secondary security procedures to confirm that fake biometric samples are not being used. For example, to detect the use of false auditory emissions scans, system 2202 may be further configured to detect electronic noise associated with a device producing electronic auditory emissions and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using olfactory biometrics. As discussed herein, olfactory biometrics may include odorants that a body generates when odor evaporates from and/or any portion thereof. As discussed herein, these odorants may be collectively referred to as a "smellprint." Biometric security system 2202 may include a biometric sensor 2204 which may be configured with an electronic sensor, a chemical sensor, and/or an electronic or chemical sensor configured as an array of chemical sensors, wherein each chemical sensor may detect a specific odorants, or smell. In another embodiment, biometric sensor 2204 may be configured as a gas chromatograph, spectrometer, conductivity sensor, piezoelectric sensor and/or other hardware and/or software that facilitates the capture of biometric data from the person such as, for example, scanning, detecting or otherwise sensing a smellprint of cardmember.

In one exemplary application of smartcard 100 incorporating biometric security system 2202, system 2202 may capture the smellprint of the cardmember to initiate the mutual authentication process between smartcard 100 and smartcard reader 2500, and/or to provide verification of the user's identity. In one embodiment, biometric sensor 2204 of the security system 2202 may capture a smellprint, when a user stands within at least two feet of sensor 2204. Biometric sensor 2204 may be in communication with IC 110 such that sensor 2204 receives the smellprint and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the smellprint and compare it against a digitized smellprint stored in a database (e.g., security EEPROM 212) included on smartcard 100. The smellprint information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for smellprints, CPU 202 may utilize an existing database to compare the difference in molecular structures, chemical compounds, temperature, mass differences, pressure, force, and odorants by using statistical, ANN and neuromorphic techniques. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as smellprint recognition software and/or hardware systems to facilitate smellprint comparisons, such as, for example those developed by Company Mastiff Electronic Systems.

Smartcard 100 and/or any other third-party security vendor system used in connection with smartcard 100 may additionally be configured with secondary security procedures to confirm that fake biometric samples are not being used. For example, to detect the use of a false odorant, system 2202 may be further configured to detect man-made smells, abnormal odorants, body heat and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using keystroke/typing recognition biometrics. As discussed herein, keystroke/typing recognition biometrics may include recognition of the duration of keystrokes, latencies between keystrokes, inter-keystroke times, typing error frequency, force keystrokes and/or any portion thereof. As discussed herein, these features may be collectively referred to as a "keystroke scan." Biometric security system 2202 may include a biometric sensor 2204 which may be configured with an electronic sensor, an optical sensor, a keyboard, and/or other hardware and/or software that facilitates the capture of biometric data from the person such as, for example, scanning, detecting or otherwise sensing a keystroke scan of cardmember. A keyboard may include any type of input device, such as, for example, flat electronic pads with labels as keys, touch screens, and/or any other types of input devices.

In one exemplary application of smartcard 100 incorporating biometric security system 2202, system 2202 may capture the keystroke scan of the cardmember to initiate the mutual authentication process between smartcard 100 and smartcard reader 2500, and/or to provide verification of the user's identity. In one embodiment, biometric sensor 2204 of the security system 2202 may capture a keystroke scan, when a user types, for example, a PIN or pass phrase into a keyboard configured with sensor 2204. Biometric sensor 2204 may be in communication with IC 110 such that sensor 2204 receives the keystroke scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the keystroke scan based on keystroke characteristics and compare the scan against a digitized keystroke scan stored in a database (e.g., security EEPROM 212) included on smartcard 100. The keystroke scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for keystroke scans, CPU 202 may utilize an existing database to compare the behavioral, temporal and physical characteristics associated with keystrokes. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as keystroke scan recognition software and/or hardware systems to facilitate keystroke scan comparisons, such as, for example those developed by BioPassword® by BioNet Systems, LLC.

Smartcard 100 and/or any other third-party security vendor system used in connection with smartcard 100 may additionally be configured with secondary security procedures to confirm that fake biometric samples are not being used. For example, to detect the use of a false keystroke, system 2202 may be further configured to detect body heat and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using iris scan biometrics. As discussed herein, iris scan biometrics may include recognition of characteristics of the colored tissues surrounding the pupil, such as the rings, furrows and freckles and/or any portion thereof. As discussed herein, these characteristics may be collectively referred to as an "iris scan." Biometric security system 2202 may include a biometric sensor 2204 which may be configured with a video camera, an optical scanner, a digital camera, a charge coupled device and/or other hardware and/or software that facilitates the capture of biometric data from the person such as, for example, scanning, detecting or otherwise sensing an iris scan of cardmember.

In one exemplary application of smartcard 100 incorporating biometric security system 2202, system 2202 may capture the iris scan of the cardmember to initiate the mutual authentication process between smartcard 100 and smartcard reader 2500, and/or to provide verification of the user's identity. In one embodiment, biometric sensor 2204 of the security system 2202 may capture an iris scan, when a user uses sensor 2204 to scan his iris while he may be up to five feet away from sensor 2204. Sensor 2204 may scan the user's iris through contacts, sunglasses, and/or any other type of eye glasses. Biometric sensor 2204 may be in communication with IC 110 such that sensor 2204 receives the iris scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the iris scan based on iris characteristics and compare the scan against a digitized iris scan stored in a database (e.g., security EEPROM 212) included on smartcard 100. The iris scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for iris scans, CPU 202 may utilize an existing database to compare the surface patterns of the iris by localizing the boundaries and the eyelid contours of the iris and creating a phase code for the texture sequence in the iris. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as iris scan recognition software and/or hardware systems to facilitate iris scan comparisons, such as, for example those developed by Iridian, LG Electronics and BioCom.

Smartcard 100 and/or any other third-party security vendor system used in connection with smartcard 100 may additionally be configured with secondary security procedures to confirm that fake biometric samples are not being used. For example, to detect the use of a false iris, system 2202 may be further configured to vary the light shone into the eye to watch for pupil dilation, to detect body heat and/or any other secondary procedure to thwart biometric security fraud. After verifying the biometric information, smartcard 100 and smartcard reader 2500 may begin authentication by the methods described herein.

In another exemplary embodiment, biometric security system 2202 may be configured for facilitating biometric security using retinal scanning biometrics. As discussed herein, retinal scanning biometrics may include recognition of characteristics of the reflected retinal pattern of the eye, such as the location, structure, size, and shape of blood vessels and/or any portion thereof. As discussed herein, these characteristics may be collectively referred to as a "retinal scan." Biometric security system 2202 may include a biometric sensor 2204 which may be configured with low-intensity light source, such as an infrared source, an optical coupler and/or other hardware and/or software that facilitates the capture of biometric data from the person such as, for example, scanning, detecting or otherwise sensing a retinal scan of cardmember.

In one exemplary application of smartcard 100 incorporating biometric security system 2202, system 2202 may capture the iris scan of the cardmember to initiate the mutual authentication process between smartcard 100 and smartcard reader 2500, and/or to provide verification of the user's identity. In one embodiment, biometric sensor 2204 of the security system 2202 may capture a retinal scan, when a sensor 2204 shines a light source into the user's retina and detects the reflected retina pattern. Sensor 2204 may detect a user's retinal pattern when the user may be up to five feet away from sensor 2204. Biometric sensor 2204 may be in communication with IC 110 such that sensor 2204 receives the retinal scan and transmits a signal to CPU 202 to facilitate activating the operation of smartcard 100. A power source (e.g., VCC contact 106(*a*)) may be in communication with biometric sensor 2204 and IC 110 to provide the desired power for operation of the biometric security system components.

Smartcard 100 may digitize the retinal scan based on retinal characteristics and compare the scan against a digitized iris scan stored in a database (e.g., security EEPROM 212) included on smartcard 100. The retinal scan information may additionally be compared with information from one or more third-party databases communicating with smartcard 100 through any communication software and/or hardware, including for example, smartcard reader 2500, a USB connection, a wireless connection, a computer, a network and/or any other means for communicating. CPU 202 may facilitate the local comparison to authenticate the biometric and validate the information. Any of the embodiments may alternatively or additionally include remote comparisons performed or controlled by one or more third-party security vendors.

For example, for retinal scans, CPU 202 may utilize an existing database to compare the blood vessel patterns of the retina by comparing stored and detected retinal patterns. This transfer of information may include use of encryption, decryption, security keys, digital certificates and/or other security devices to confirm the security of the sample. Smartcard 100 may additionally communicate with third-party databases to facilitate a comparison between smartcard 100 identifier and other smartcard identifiers stored with the biometric samples. Further, the present invention anticipates use of one or more third-party devices such as retinal scan recognition software and/or hardware systems to facilitate keystroke scan comparisons, such as, for example those developed by EyeKey and Retinal Technologies.

Smartcard 100 and/or any other third-party security vendor system used in connection with smartcard 100 may additionally be configured with secondary security procedures to confirm that fake biometric samples are not being used. For example, to detect the use of a false retina, system 2202 may be further configured to vary the light shone into the eye to watch for pupil dilation, to detect body heat and/or any other secondary procedure to thwart biometric security fraud. After verifying the biometric information, smartcard 100 and smartcard reader 2500 may begin authentication by the methods described herein.

Additionally, smartcard 100 may be configured with a security verification mechanism to verify whether the sampled biometric and/or related information is staying on smartcard 100 and/or reader 2500. The security verification mechanism may be used to safeguard biometric information from getting lost and/or compromised on the host system.

Figure 25:
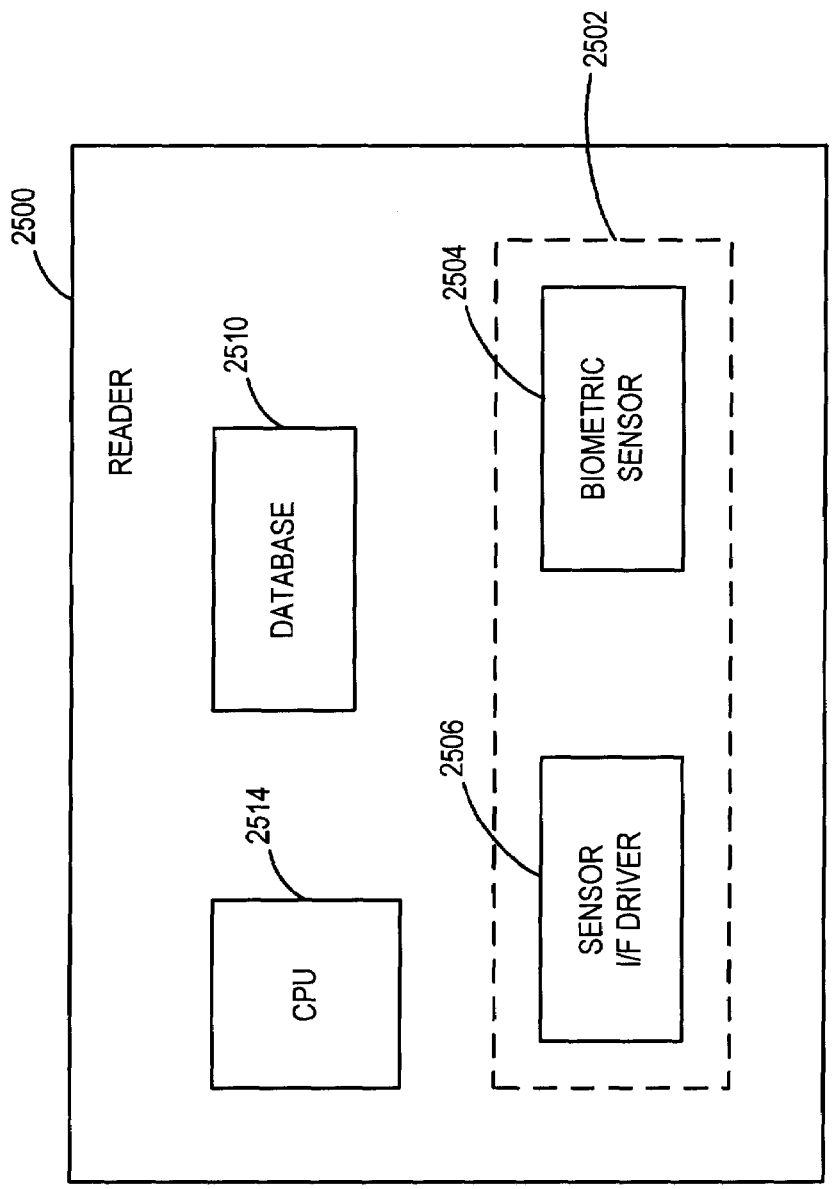
FIG. 25 is a schematic illustration of an exemplary smartcard reader in accordance with the present invention.

In an additional or alternate embodiment, smartcard reader 2500 may include one or more security system, wherein the security system incorporates one or more biometric system. As shown in FIG. 25, smartcard reader 2500 includes a biometric security system 2502 configured for facilitating biometric security using a biometric sample. Biometric security system 2502 may include a biometric sensor 2504 which may be configured with a sensor, video camera, digital camera, optical scanner, light source and/or other hardware and/or software for acquiring biometric data form the person such as, for example, optical scanning, chemical sensing, or otherwise detecting the portion of cardmember. Biometric sensor 2504 may be in communication with a sensor interface/driver 2506 such that sensor interface 2506 receives biometric information and transmits a signal to CPU 202 to facilitate activating the operation of smartcard 100.

In one exemplary application of smartcard reader 2500 including biometric security system 2502, the user may submit a biometric sample to the biometric sensor to initiate the mutual authentication process between smartcard 100 and smartcard reader 2500, and/or to provide verification of the user's identity. Smartcard reader 2500 may digitize the sample and compare it against a digitized biometric sample stored in a database (e.g., database 2510) included on smartcard reader 2500. The biometric sample information may additionally be compared with information from one or more third-party databases communicating with smartcard 100 through any communication software and/or hardware, including for example, smartcard 100, a USB connection, a wireless connection, a computer, a network and/or any other means for communicating. The transfer of information may include use of encryption decryption, security keys, digital certificates and/or other security devices to confirm the security of the sample. Smartcard reader 2500 may additionally communicate with third-party databases to facilitate a comparison between smartcard 100 identifier and other smartcard identifiers stored with the biometric samples.

A smartcard reader CPU 2514 may facilitate the local comparison to authenticate the biometric sample and may validate the information. Reader CPU 2514 may be configured in a manner similar to that of CPU 202. Any of the embodiments may alternatively or additionally include remote comparisons performed or controlled by third-party security vendors in any way known in the art for comparing biometric data.

Smartcard reader 2500 may also be configured with secondary security procedures biometric to confirm that fake biometric samples are not being used. For example, smartcard reader 2500 may be further configured to measure blood flow, body heat and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, and/or any other procedures known in the art for authenticating the authenticity of biometric samples. After verifying the biometric information, smartcard 100 and smartcard reader 2500 may begin authentication, and the transaction may proceed accordingly.

Additionally, CPU 2514 may be configured with a security verification mechanism to verify whether the sampled biometric and/or related information is staying on smartcard 100 and/or reader 2500. The security verification mechanism may be used to safeguard biometric information from getting lost and/or compromised on the host system.

While the biometric safeguard mechanisms describe smartcard 100 and/or smartcard reader 2500 configured with a biometric safeguard mechanism, any part of system 2400 may be equipped with a biometric safeguard system. For example, the invention contemplates receiving a biometric sample only at the reader, only at the smartcard, at both the smartcard and the reader, or at any other combination of location or device. As such, any scanner or database discussed herein may be located within or associated with another device. For example, the smartcard may scan a user biometric, but the database used for comparison may be located within the reader or merchant server. In other embodiments, the biometric security device may be located away from the point of sale device and/or provide other functions. For example, the biometric security device may be located near the item to be purchased or located in any other location within or outside of the merchant. In one embodiment, the biometric security device may be located outside of a jewelry display to allow a user to not only start the authentication process before check-out, but also to allow access to the product within the display case. In this regard, the biometric security device may communicate the information to the point of sale device so access point 15 may verify that the person that entered the jewelry box is the same person that is now buying the jewelry. In another embodiment, any portion of system 2400 may be configured with a biometric security device. The biometric security device may be attached and/or free-standing. Biometric security devices may be configured for local and/or third-party operation. For example, the present invention contemplates the use of third-party fingerprint scanning and security devices such as those made by Interlink Electronics, Keytronic, Identix Biotouch, BIOmetricID, onClick, and/or other third-party vendors.

In yet another embodiment, the database used for comparison may contain terrorist and/or criminal information. As used herein, terrorists and/or criminals may include terrorists, felons, criminals, convicts, indicted persons, insurgents, revolutionaries and/or other offenders. The information may include biometric information, personal information as described herein, arrest records, aliases used, country of residence, affiliations with gangs and terrorist groups, and/or any other terrorist and/or criminal information.

As an example of a secondary security procedure in accordance with the present invention, the biometric sensor 2204, 2504 may be configured to allow a finite number of scans. For example, biometric sensor 2204, 2504 may be configured to only accept data from a single scan. As a result, biometric sensor 2204, 2504 may turn off or deactivate smartcard 100 and/or smartcard reader 2500 if more than one scan may be needed to obtain a biometric sample. Biometric sensor 2204, 2504 may also be configured to accept a preset limit of scans. For example, biometric sensor 2204, 2504 may receive three invalid biometric samples before it turns off and/or deactivates smartcard 100 and/or smartcard reader 2500.

The sensor or any other part of system 2400 may also activate upon sensing a particular type or group of biometric samples. The activation may include sending a signal, blinking, audible sound, visual display, beeping, providing an olfactory signal, providing a physical touch signal, and providing a temperature signal to said user and/or the like. For example, if the sensor detects information from a gold card member, the system may display a special offer on access point 15. If the sensor detects a repeat customer, the sensor may signal or notify a manager to approach the customer and thank them for their repeat business. In another embodiment, the system may send a signal to a primary account holder or any other person or device to notify them that the smartcard is being used or that a condition or rule is being violated (e.g., charge above $1000).

Any of the biometric security systems described herein may additionally be configured with a fraud protection log. That is, a biometric security system, such as biometric security system 2204, 2504 may be configured to log all biometric samples submitted on smartcard 100 and/or smartcard reader 2500 and store the log information on databases on and/or communicating with system 2204, 2504. If a new and/or different biometric sample is submitted that differs from the log data, biometric security system 2204, 2504 may employ a security procedure such as deactivation, warning authorities, requesting a secondary scan, and/or any other security procedure.

Biometric security system 2204, 2504 and/or the biometric security system configured with system 2400 may also be configured to obtain a plurality of biometric samples for verification and/or other security purposes. For example, after biometric security system 2202, receives a first biometric sample (e.g., scans one finger,) it may be configured to receive a second biometric sample (e.g., scans a second finger). The first and second biometric samples may be compared with stored biometric samples by any of the methods disclosed herein. The second biometric sample may be the only sample compared with stored biometric samples if the first sample may be unreadable or inadequate.

In yet another exemplary embodiment of the present invention, smartcard 100 may be equipped with a biometric safeguard mechanism. For example, in one exemplary application of smartcard 100, smartcard 100 may use biometric security system 2202 to authorize a transaction that violates an established rule, such as, for example, a purchase exceeding an established per purchase spending limit, a purchase exceeding a preset number of transactions, any portion of a purchase and/or transaction involving non-monetary funds (e.g., paying a portion of the transaction with loyalty points, coupons, airline miles, etc.) and/or any other purchase and/or transaction exceeding a preset or established limit. Cardmember, a third-party issuer system a third-party financial system, a company and/or any other entity or system may establish the preset limits. The limits may be used to prevent fraud, theft, overdrafts, and/or other non-desirable situations associated with financial and non-financial accounts. For example, if smartcard 100 is stolen and the thief tries to make a large purchase with the card, the biometric safeguard mechanism may prevent the purchase until cardmember's identity is verified by biometric means.

For example, smartcard 100 may activate biometric security system 2202 to notify a user a user who is attempting to make a large purchase that the user must provide a biometric sample to verify the user's identity. By notifying, smartcard 100 may be configured to provide an audible signal, visual signal, optical signal, mechanical signal, vibration, blinking, signaling, beeping, providing an olfactory signal, providing a physical touch signal, and providing a temperature signal to said user and/or provide any other notification to a cardmember. Accordingly, cardmember may provide such verification by submitting a biometric sample, for example placing his finger over biometric sensor 2204 and/or any other biometric security devices used in association with smartcard 100. Biometric sensor 2204 may then digitize the biometric sample (e.g., fingerprint) and use the digitized sample for verification by any of the methods described herein. Once cardmember's identity and/or smartcard 100 smartcard chip identifier may be verified, smartcard 100 may provide a transaction authorized signal to CPU 202 (and/or to IC 110) for forwarding to smartcard reader 2500. Smartcard reader 2500 may then provide the transaction authorized signal to Access point 15 in a similar manner as is done with conventional PIN driven systems and Access point 15 may process the transaction under the merchant's business as usual standard. If smartcard 100 has been stolen, then cardmember's identity may not be verified and the transaction may be cancelled. Additionally, one or more further security procedures may be triggered, such as, for example, smartcard 100 may deactivate, smartcard 100 may send a notification to a security vendor, smartcard 100 may be confiscated by the merchant and/or any other security procedures may be used.

In another exemplary embodiment, smartcard reader 2500 may be equipped with a biometric safeguard mechanism. For example, in one exemplary application of smartcard reader 2500, smartcard reader 2500 may use biometric security system 2502 to authorize a transaction that violates an established rule, such as, for example, a purchase exceeding an established per purchase spending limit, a purchase exceeding a preset number of transactions and/or any other purchase exceeding a preset or established limit. Cardmember, a third-party issuer system a third-party financial system, a company and/or any other entity or system may establish the preset limits. The limits may be used to prevent fraud, theft, overdrafts, and/or other non-desirable situations associated with financial and non-financial accounts. For example, if smartcard 100 is stolen and the thief tries to make a large purchase with the card, the biometric safeguard mechanism may prevent the purchase until cardmember's identity is verified by biometric means.

In one example, where cardmember is using a company-is-sued smartcard 100, smartcard 100 may the have a preset limit of transactions that may be completed before biometric verification is required. If the user exceeds the transaction limit, smartcard reader 2500 may be configured to scan a biometric sample in order to verify the user's identity. Accordingly, the user may provide such verification by submitting a biometric sample, for example submitting a retinal scan to biometric sensor 2504. Smartcard reader 2500 may then digitize the biometric sample (e.g., retinal pattern) and use the digitized sample for verification by any of the methods described herein. Once cardmember's identity and/or smartcard 100 smartcard chip identifier may be verified, smartcard reader 2500 may receive a transaction authorized signal from a security vendor authorized to give such a signal. Smartcard reader 2500 may then provide the transaction authorized signal to Access point 15 in similar manner as is done with conventional PIN driven systems and Access point 15 may process the transaction under the merchant's business as usual standard.

While the biometric safeguard mechanisms described herein use fingerprint scanning and retinal scanning for biometric sample verification for exemplification, any biometric sample may be submitted for verification, authorization and/or any other safeguard purpose. For example the present invention contemplates the use of voice recognition, facial and/or ear recognition, signature recognition, vascular patterns, DNA sampling, hand geometry, auditory emissions recognition, olfactory recognition, keystroke/typing recognition, iris scans, and/or any other biometric known in the art.

In another exemplary embodiment of the present invention, one or more biometric samples may be used to sign and/or encrypt information. For example, smartcard 100 and/or reader 2500 may be configured to receive a biometric sample from a user. The sample may then be digitized and used, for example, as a variable in an encryption calculation to secure data. If the user wants to retrieve the encrypted data, the user must submit the relevant biometric sample and have it authenticated by any of the methods described herein. Once the biometric sample is authenticated, the data will be decrypted for access.

Similarly, a biometric may be used as both a private key and a public key for encryption purposes. In one exemplary embodiment, an entity may use stored biometric sample information to encrypt data in a manner similar to a public key. The data may then be configured such that it is only accessible by a real biometric sample, for example, by a user proffering a fingerprint sample at a reader. Upon verification of the real biometric sample, the data may be decrypted and/or retrieved.

While the exemplary embodiments describe herein make reference to identification, authentication and authorization processes, it should be understood that the biometric security systems and methods described herein may be used for identification purposes only, authentication purposes only, and/or authorization purposes only. Similarly, any combination of identification, authentication and/or authorization systems and methods may be used in conjunction with the present invention.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a nonexclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A method for registering biometric information for use in a smartcard system having a biometric security device, said method comprising: communicating with a smartcard, wherein said smart card comprises a common application and a second application, said second application storing travel-related information associated with a cardholder, said second application comprising a common file structure and a partner file structure; receiving a first proffered biometric sample and a second proffered biometric sample at a sample receiver, wherein said first proffered biometric sample is a different type of biometric sample from said second proffered biometric sample, and wherein said first proffered biometric sample and said second proffered biometric sample are from the same user, and wherein said first proffered biometric sample is required to access said common file structure and said second proffered biometric sample is required to access said partner file structure; verifying said first proffered biometric sample and a second proffered biometric sample; generating data representing said first proffered biometric sample and said second proffered biometric sample; receiving user information and smartcard information at said sample receiver; and associating said first proffered biometric sample and said second proffered biometric sample with said user information and said smartcard information to create a data packet; and enabling write access to a field within said partner file structure upon verification of said second proffered biometric sample and upon request by a first partnering organization; denying write access to said field upon request by a second partnering organization; enabling write access for said first partnering organization and said second partnering organization to a field in said common file structure, upon verification of said first proffered biometric sample; transferring common data to facilitate said registration; transferring said travel-related information, information related to said common file structure and information related to said partner file structure to facilitate said registration; storing, by a first enterprise data collection unit, update registrations and pending registrations associated with said smartcard and a first enterprise, wherein said first enterprise data collection unit is associated with a first enterprise; storing, by a second enterprise data collection unit, update registrations and pending registrations associated with said smartcard and a second enterprise, wherein said second enterprise data collection unit is associated with a second enterprise; interfacing with said smartcard and said first and second enterprise data collection units, at an access point; storing, by a card object database system coupled to said first and second enterprise data collection units, said smartcard information in accordance with said update registrations and said pending registrations, wherein said smartcard information includes a card object having an application; routing, by an update logic system, said smartcard information from said first and second enterprise data collection units to said access point in order to effect synchronization of said smartcard information associated with said smartcard and said card object database system; and, activating, by said verification device, said update logic system upon verification of said first proffered biometric sample and said second biometric sample.

2. The method of claim 1, wherein said step of receiving said first proffered biometric sample and said second proffered biometric sample at said sample receiver includes said sample receiver contacting at least one of a computer, Internet, software, hardware, a third-party biometric entity, a kiosk, a biometric registration terminal, and a communication device.

3. The method of claim 1, further comprising using data representing said first proffered biometric sample and said second proffered biometric sample as a variable in an encryption calculation to secure data related to said registration.

4. The method of claim 1, wherein said step of associating said first proffered biometric sample and said second proffered biometric sample with said user information and said smartcard information further includes associating said first proffered biometric sample and said second proffered biometric sample with at least one of: personal information, credit card information, debit card information, savings account information, membership information, PayPal account information, Western Union Account information, electronic bill payment information, automatic bill payment information and loyalty point information.

5. The method of claim 1, further comprising using said data representing said first proffered biometric sample and said second proffered biometric sample as at least one of a private key, a public key, and a message authentication code to facilitate registration security measures.

6. The method of claim 1, further comprising using said data representing said first proffered biometric sample and said second proffered biometric sample in generating a message authentication code and as at least one of a private key and a public key.

7. The method of claim 1, wherein said step of associating said first proffered biometric sample and said second proffered biometric sample with said user information and said smartcard information includes associating said first proffered biometric sample and said second proffered biometric sample with a different one of: personal information, charge card information, credit card information, debit card information, savings account information, membership information, PayPal account information, Western Union Account information, electronic bill payment information, automatic bill payment information and loyalty point information.

8. The method of claim 1, wherein said step of associating said first proffered biometric sample and said second proffered biometric sample with said user information and said smartcard information includes primarily associating said first proffered biometric sample with a first user information, wherein said first user information comprises at least one of personal information, credit card information, charge card information, debit card information, savings account information, membership information, PayPal account information, Western Union Account information, electronic bill payment information, automatic bill payment information and loyalty point information, and secondarily associating said second proffered biometric sample with a second user information, wherein said second user information comprises at least one of personal information, credit card information, charge card information, debit card information, savings account information, membership information, PayPal account information, Western Union Account information, electronic bill payment information, automatic bill payment information and loyalty point information, wherein said second user information is different than said first user information.

9. The method of claim 1, wherein said step of associating said first proffered biometric sample and said second proffered biometric sample with said user information and said smartcard information includes associating a said first proffered biometric sample with a first user information, wherein said first user information comprises at least one of personal information, credit card information, charge card information, debit card information, savings account information, membership information, PayPal account information, Western Union Account information, electronic bill payment information, automatic bill payment information and loyalty point information, and facilitating registration of said second proffered biometric sample by associating said second proffered biometric sample with a second user information, wherein said second user information comprises at least one of personal information, credit card information, charge card information, debit card information, savings account information, membership information, PayPal account information, Western Union Account information, electronic bill payment information, automatic bill payment information and loyalty point information.

10. The method of claim 1, wherein said step of associating said first proffered biometric sample and said second proffered biometric sample with said user information and said smartcard information includes associating said first proffered biometric sample with a first user information, wherein said first user information comprises at least one of personal information, credit card information, charge card information, debit card information, savings account information, membership information, PayPal account information, Western Union Account information, electronic bill payment information, automatic bill payment information and loyalty point information, and associating said second proffered biometric sample with a second user information, wherein said second user information comprises at least one of personal information, charge card information, credit card information, debit card information, savings account information, membership information, PayPal account information, Western Union Account information, electronic bill payment information, automatic bill payment information and loyalty point information, wherein said second user information is different than said first user information.

11. The method of claim 1, wherein said step of associating said first proffered biometric sample and said second proffered biometric sample with said user information and said smartcard information includes associating a plurality of proffered biometric samples with user information, wherein each proffered biometric sample is associated with different user information.

12. The method of claim 1, further comprising verifying said first proffered biometric sample and said second proffered biometric sample using a secondary identification by facilitating the use of a secondary security procedure.

13. The method of claim 1, further comprising using said data representing said first proffered biometric sample and said second proffered biometric sample to facilitate substantially simultaneous access to goods and initiation of authentication for a subsequent purchase of said goods.

14. The method of claim 1, wherein said step of receiving said first proffered biometric sample and said second proffered biometric sample at said sample receiver includes receiving said first proffered biometric sample and said second proffered biometric sample at least one of: a local database, a remote database, a portable storage device, a host system, an issuer system, a merchant system, a fob issuer system, an employer, a financial institution, a non-financial institution, a loyalty point provider, a company, the military, the government, a school, a travel entity, a transportation authority, a POS and a security company.

15. The method of claim 1, wherein said step of receiving said first proffered biometric sample and said second proffered biometric sample includes receiving at least one of: a retinal scan, an iris scan, a fingerprint scan, a hand print scan, a hand geometry scan, a voice print scan, a vascular scan, a facial scan, an ear scan, a signature scan, a keystroke scan, an olfactory scan, an auditory emissions scan, and a DNA scan.

16. The method of claim 1, wherein said step of associating said first proffered biometric sample and said second proffered biometric sample with said user information and said smarteard information includes associating a preset transaction limit with said first proffered biometric sample and said second proffered biometric sample and at least one of a charge card account, credit card account, debit card account, savings account, private label account and loyalty point account.

17. The method of claim 1, wherein said user information comprises user preferences relating to at least one of rental cars, hotel reservations, and air travel and said data packet is stored in said first partner file structure.

18. The method of claim 1, wherein said first proffered biometric sample and said second proffered biometric sample is associated with at least two accounts, wherein each of said at least two accounts includes at least one of: a charge card account, a credit card account, a debit card account, a savings account, a private label account and a loyalty point account.

19. The method of claim 17, further comprising writing to at least one of said partner file structure and said common file structure to program said smartcard as a room key, upon verification of said first proffered biometric sample and said second proffered biometric sample.

20. The method of claim 16, wherein said preset transaction limit comprises at least one of a maximum transaction amount, minimum transaction amount, maximum number of transactions within a time period, maximum number of transactions, use by certain merchants, temporal limitation, geographic limitation, and use of non-monetary funds.

21. The method of claim 1, further comprising securely routing, by an update logic system, card information between said enterprise data synchronization interface and said enterprise data collection units, wherein said update logic system is coupled to an enterprise data synchronization interface, and communicating, by said enterprise network, with said access point, wherein said enterprise data synchronization interface is coupled to said enterprise network.

22. The method of claim 21, further comprising, by a secure support client server, communicating with said access point, and adaptively providing communication functionality in accordance with the communication functionality available at said access point.

23. The method of claim 22, further comprising:
communicating, by a key system, with a security server and supplying a key in response to a request from said security server, wherein said key system is associated with said application;
receiving, by a personalization utility, said card object and communicating with said security server;
adding, by said personalization utility, said key to said card object;
accepting, by a card management system, a card request and communicating said card request to said personalization utility; and
communicating, by a gather application module, with said card management system and gathering application information from a first database and a second database in accordance with said card request, wherein said first database is associated with said first enterprise, and said second database is associated with said second enterprise.

24. The method of claim 1, further comprising displaying a first plurality of financial accounts upon verification of said first proffered biometric sample, and displaying a second plurality of financial accounts upon verification of said second biometric sample, wherein said first plurality of financial accounts include different financial accounts than said second plurality of financial accounts.

25. The method of claim 1, further comprising associating a first set of rules with said first proffered biometric sample and displaying a first plurality of financial accounts upon verification of said first proffered biometric sample and said first set of rules, and associating a second set of rules with said second proffered biometric sample and displaying a second plurality of financial accounts upon verification of said second biometric sample and said second set of rules, wherein said first plurality of financial accounts include different financial accounts than said second plurality of financial accounts.

* * * * *